US008282488B2

(12) United States Patent
Walker et al.

(10) Patent No.: US 8,282,488 B2
(45) Date of Patent: Oct. 9, 2012

(54) METHOD AND APPARATUS FOR OUTPUTTING A MESSAGE AT A GAME MACHINE

(75) Inventors: Jay S. Walker, Ridgefield, CT (US); James A. Jorasch, Stamford, CT (US); Russell P. Sammon, San Francisco, CA (US); Stephen C. Tulley, Fairfield, CT (US); Steven M. Santisi, Ridgefield, CT (US)

(73) Assignee: IGT, Reno, NV (US)

( * ) Notice: Subject to any disclaimer, the term of this patent is extended or adjusted under 35 U.S.C. 154(b) by 2020 days.

(21) Appl. No.: 10/685,143

(22) Filed: Oct. 14, 2003

(65) Prior Publication Data

US 2004/0127284 A1 Jul. 1, 2004

Related U.S. Application Data

(60) Provisional application No. 60/418,397, filed on Oct. 11, 2002.

(51) Int. Cl.

| | |
|---|---|
| ***A63F 9/24*** | (2006.01) |
| ***A63F 13/00*** | (2006.01) |
| *G06F 7/08* | (2006.01) |

(52) U.S. Cl. ................ 463/41; 463/40; 463/42; 463/16; 463/20; 463/25; 273/138.1; 273/143 R; 705/14.12

(58) Field of Classification Search ................ 463/9–13, 463/16–20, 40–42, 25, 30; 273/138.1, 143 R; 705/14; 235/380, 381

See application file for complete search history.

(56) References Cited

U.S. PATENT DOCUMENTS

| | | | | |
|---|---|---|---|---|
| 4,695,053 | A * | 9/1987 | Vazquez et al. | 463/18 |
| 4,760,527 | A * | 7/1988 | Sidley | 463/13 |
| 5,290,033 | A * | 3/1994 | Bittner et al. | 463/25 |
| 5,429,361 | A * | 7/1995 | Raven et al. | 463/25 |
| 5,611,730 | A * | 3/1997 | Weiss | 463/20 |
| 5,971,849 | A * | 10/1999 | Falciglia | 463/16 |
| 6,089,975 | A * | 7/2000 | Dunn | 463/16 |
| 6,113,495 | A * | 9/2000 | Walker et al. | 463/42 |
| 6,126,541 | A * | 10/2000 | Fuchs | 463/13 |
| 6,139,431 | A * | 10/2000 | Walker et al. | 463/20 |
| 6,176,781 | B1 * | 1/2001 | Walker et al. | 463/13 |
| 6,227,446 | B1 * | 5/2001 | Haney et al. | 235/379 |
| 6,270,411 | B1 * | 8/2001 | Gura et al. | 463/20 |
| 6,302,790 | B1 * | 10/2001 | Brossard | 463/20 |
| 6,409,602 | B1 * | 6/2002 | Wiltshire et al. | 463/42 |

(Continued)

FOREIGN PATENT DOCUMENTS

GB 2393554 A * 3/2004

*Primary Examiner* — Melba Bumgarner
*Assistant Examiner* — Frank M Leiva
(74) *Attorney, Agent, or Firm* — Neal, Gerber & Eisenberg LLP

(57) ABSTRACT

The invention allows a casino, or other entity, via a game machine, to provide relevant information at appropriate times, and/or in response to appropriate events, to players using the game machine. A dynamic and flexible system adapted to interact with players on an individual basis by aiding in the management, determination, distribution, and delivery of promotional, inspirational, instructive, informational, communicative, incentive, and other types of messages, is provided. Various methods are provided to ensure that receiving messages at a game machine enhances a player's overall gaming experience by selectively outputting helpful and desirable messages to players while minimizing interference with the players' gaming and to avoid overwhelming players with unsolicited, unwanted, and/or irrelevant messages.

5 Claims, 18 Drawing Sheets

U.S. PATENT DOCUMENTS

| | | | | |
|---|---|---|---|---|
| 6,942,574 | B1 * | 9/2005 | LeMay et al. | 463/41 |
| 6,942,576 | B2 * | 9/2005 | Holt | 473/2 |
| 2003/0064769 | A1 * | 4/2003 | Muir | 463/16 |
| 2003/0064782 | A1 | 4/2003 | Beaulieu et al. | 463/20 |
| 2005/0096125 | A1 | 5/2005 | LeMay et al. | |

* cited by examiner

308

| PLAYER IDENTIFIER 400 | NAME 402 | COMP POINTS 404 | CURRENT ACTIVITY 406 | NOTES 408 |
|---|---|---|---|---|
| PLAYER-1-02834555 | ANNE RED | 1,846 POINTS | OPERATING SLOT MACHINE #12 | ENJOYS TRAVELLING, HAS VISITED MEXICO THREE TIMES IN LAST YEAR |
| PLAYER-2-02834555 | JEFF YELLOW | 8,902 POINTS | OPERATING VIDEO POKER MACHINE #57 | AGE 66, RETIRED MECHANICAL ENGINEER LOVES GADGETS |
| PLAYER-3-02834555 | JIM BLUE | 579 POINTS | OPERATING SLOT MACHINE #81 | AGE 50, AVID READER OF SCIENCE FICTION BOOKS AND COMIC BOOKS |
| PLAYER-4-02834555 | ANONYMOUS | N/A | OPERATING SLOT MACHINE #175 | N/A |
| PLAYER-5-02834555 | JOHN GREEN | 2,984 POINTS | OPERATING COMP KIOSK #82 | JUST BOUGHT A NEW HOUSE, HAS A SIX MONTH OLD BABY |
| PLAYER-6-02834555 | MARY PURPLE | 3,371 POINTS | PLAYING AT BLACKJACK TABLE #23, POSITION #2 | AGE 25, ENJOYS MOUNTAIN BIKING, DRIVES A 1983 TOYOTA TERCEL |

FIG. 4

310

| PROMOTIONAL MESSAGE IDENTIFIER 500 | PROMOTIONAL MESSAGE 502 |
|---|---|
| PROMO-1-85923475 | "GET TWO STEAK DINNERS FOR THE PRICE OF ONE AT ALICE'S RESTAURANT" |
| PROMO-2-85923475 | "ACME LAUNDRY DETERGENT IS OFFERING A FREE ONE-YEAR SUPPLY OF LAUNDRY DETERGENT TO THE NEXT PERSON TO WIN A JACKPOT ON A RASCALLY RABBIT SLOT MACHINE" |
| PROMO-3-85923475 | "BUY THIS TRAVEL ALARM CLOCK FOR ONLY $9.99" <INCLUDES PICTURE OF ALARM CLOCK AND LIST OF FEATURES> |
| PROMO-4-85923475 | "CONGRATULATIONS! YOU QUALIFY FOR A 20% DISCOUNT ON TICKETS TO THE CHAMPIONSHIP BOXING MATCH TONIGHT. WOULD YOU LIKE TO BUY TICKETS?" |
| PROMO-5-85923475 | "WOULD YOU LIKE TO SIGN UP FOR A FREE 3-MONTH SUBSCRIPTION TO 'AUTOMOBILE FUN' MAGAZINE?" |
| PROMO-6-85923475 | "WOULD YOU LIKE TO ACTIVATE AUTO-PLAY MODE FOR A COST OF ONLY 5 COINS?" |
| PROMO-7-85923475 | "WOULD YOU LIKE TO PURCHASE A HOTEL ROOM FOR TONIGHT FOR 500 COMP POINTS? |

FIG. 5

312

| INSTRUCTIVE MESSAGE IDENTIFIER 600 | INSTRUCTIVE MESSAGE 602 |
|---|---|
| INSTR-1-642985152 | "PRESS AND HOLD THE SPIN BUTTON FOR TEN SECONDS TO ACTIVATE 'AUTO-PLAY' MODE" |
| INSTR-2-642985152 | "IF YOU BET 3 COINS PER SPIN, THEN YOU GET TO USE AN IMPROVED PAYOUT TABLE WITH A BIGGER MAXIMUM JACKPOT" |
| INSTR-3-642985152 | "IF YOU CRACK OPEN AN EGG WITH AN ALLIGATOR IN IT, THE BONUS ROUND ENDS" |
| INSTR-4-642985152 | "GETTING A STRAIGHT PAYS 4 COINS;<br>GETTING A STRAIGHT FLUSH PAYS 50 COINS" |
| INSTR-5-642985152 | "TO CHECK THE VOICEMAIL IN YOUR HOTEL ROOM, PRESS THE 'CHECK MESSAGES' BUTTON ON THE LEFT SIDE OF THIS GAME MACHINE" |

FIG. 6

314

| STATUS MESSAGE IDENTIFIER 700 | STATUS MESSAGE 702 |
| --- | --- |
| STATUS-1-56189345 | "YOU CURRENTLY HAVE X COMP POINTS" <WHERE X IS FILLED IN BASED ON PLAYER DATABASE> |
| STATUS-2-56189345 | "RED SOX 9, YANKEES 5, BOTTOM OF THE 8TH INNING" |
| STATUS-3-56189345 | "BALANCE BONUS IS ENABLED. YOU WILL EARN 1 COIN FOR EVERY 15 MINUTES THAT YOU KEEP YOUR CREDIT BALANCE ABOVE 100 COINS." |
| STATUS-4-56189345 | "YOUR TABLE FOR TWO AT BILL'S RESTAURANT IS READY" |
| STATUS-5-56189345 | "YOU HAVE EARNED ENOUGH COMP POINTS TO RECEIVE A HOTEL ROOM." |

FIG. 7

316

| HYPOTHETICAL INFORMATION MESSAGE IDENTIFIER 800 | HYPOTHETICAL INFORMATION MESSAGE 802 |
|---|---|
| HYP-1-093275126 | "IF YOU HAD ONLY BET 1 COIN INSTEAD OF 3 COINS LAST SPIN, YOU WOULD HAVE ONLY WON 10 COINS INSTEAD OF 40." |
| HYP-2-093275126 | "IF YOU HAD BEEN USING BETTING THE DON'T MODE, YOU WOULD HAVE WON YOUR LAST 5 SPINS." |
| HYP-3-093275126 | "IF YOU HAD BEEN USING A PLAYER TRACKING CARD, YOU WOULD HAVE EARNED 527 COMP POINTS TODAY, ENOUGH FOR A FREE DINNER AT ALICE'S RESTAURANT." |
| HYP-4-093275126 | "IF YOU DIDN'T HAVE GAMBLING LOSS INSURANCE , YOU WOULD HAVE LOST 500 COINS IN THE LAST HOUR." |
| HYP-5-093275126 | "IF YOU HAD BEEN PLAYING IN SPEED PLAY MODE, YOU COULD HAVE WON THIS JACKPOT IN 45 MINUTES INSTEAD OF 1.5 HOURS." |

FIG. 8

318

| ACTIVITY-BENEFIT OFFER IDENTIFIER 900 | ACTIVITY 902 | BENEFIT 904 |
|---|---|---|
| OFF-1-23480923 | PLAY AT LEAST 20 GAMES ON A RASCALLY RABBIT SLOT MACHINE | 5 CREDITS |
| OFF-2-23480923 | SIGN UP FOR 3-MONTH TRIAL SUBCRIPTION TO TRAVEL MAGAZINE | ACTIVATION OF 3D GRAPHICS MODE FOR NEXT 48 HOURS |
| OFF-3-23480923 | PURCHASE A BOOK FROM CONGO.COM DURING THE NEXT 2 WEEKS | DOUBLE JACKPOT VALUES FOR NEXT 100 GAMES |
| OFF-4-23480923 | ANSWER 10 SURVEY QUESTIONS ABOUT HEART DISEASE | ONE FREE GAME |
| OFF-5-23480923 | TEST DRIVE A FORD DURING NEXT MONTH | $5.00 CASH, DISPENSED BY GAME MACHINE |
| OFF-6-23480923 | PURCHASE A BOOK FROM CONGO.COM DURING THE NEXT 2 WEEKS | INSTANT MESSAGING ENABLED ON GAME MACHINES |
| OFF-7-23480923 | SIGN UP FOR A GRAND BANK CREDIT CARD | IMMEDIATE ENTRY INTO BONUS ROUND ON GAME MACHINE |
| OFF-8-23480923 | SIGN UP FOR A GRAND BANK CREDIT CARD | FREE TOASTER OVEN |
| OFF-9-23480923 | TEST DRIVE A FORD AND SIGN UP FOR A GRAND BANK CREDIT CARD | 6 FREE MEALS AT ALICE'S RESTAURANT |

FIG. 9

320

| COMBINATION MESSAGE IDENTIFIER 1000 | COMBINATION MESSAGE 1002 |
|---|---|
| COMBO-1-84151451 | "THE ONLY WAY TO WIN THE MAXIMUM JACKPOT IS BY BETTING 3 COINS PER SPIN. WOULD YOU LIKE TO INCREASE YOUR BET SIZE TO 3 COINS PER SPIN?" |
| COMBO-2-84151451 | "YOUR PLANE FLIGHT TO RETURN HOME TO CLEVELAND LEAVES IN 3 HOURS. WOULD YOU LIKE TO CHECK IF YOU CAN CATCH A LATER FLIGHT?" |
| COMBO-3-84151451 | "YOUR CONTRACT FOR DOUBLE PAYOUTS WILL EXPIRE IN 5 MINUTES. IF YOU AGREE TO SWITCH YOUR LONG DISTANCE TELEPHONE PROVIDER, THEN YOUR CONTRACT FOR DOUBLE PAYOUTS WILL BE EXTENDED FOR AN ADDITIONAL 15 MINUTES. |
| COMBO-4-84151451 | "YOUR DINNER RESERVATION IS READY. WOULD YOU LIKE TO ACTIVATE AUTO-PLAY MODE TO OPERATE THIS GAME MACHINE WHILE YOU ARE AT DINNER?" |
| COMBO-5-84151451 | "IF YOU HAD BEEN PLAYING A GOLDEN EGG VIDEO POKER MACHINE, YOU WOULD HAVE WON $39 LAST HOUR. WOULD YOU LIKE TO CHANGE THIS SLOT MACHINE INTO A GOLDEN EGG SLOT MACHINE?" |

FIG. 10

322A

| TRIGGER CONDITION FOR OUTPUTTING MESSAGE 1100A | MESSAGE(S) TO OUTPUT 1102A |
|---|---|
| (END_OF_GAME) AND (PRIORITY_OF_NEXT_MESSAGE_IN_QUEUE >= 300) | NEXT MESSAGE IN QUEUE |
| (PLAYER_EARNS_COMP_POINTS) AND (NEW_NUMBER_OF_COMP_POINTS > 2000) AND NOT(MESSAGE_ALREADY_OUTPUT (STATUS-5-56189345)) | STATUS-5-56189345 |
| (BONUS_ROUND_OVER) AND (HATCH_EGG_BUTTON_PRESSED_AFTER_ROUND_OVER > 3 TIMES) | INSTR-3-642985152 |
| (PLAYER_CASHES_OUT_OF_GAME_MACHINE) | NEXT 3 MESSAGES IN QUEUE |
| (PLAYER_IS (PLAYER-2-02834555)) AND (DATE = 7/15/2002) AND (TIME_OF_DAY = 3:05PM) | COMBO-2-84151451 |
| (PLAYER_WINS_PRIZE) AND (PRIZE_VALUE >= 100 COINS) | ANY PROMOTIONAL MESSAGE |
| (GAMES_PLAYED_WITHOUT_ENTRY_INTO_BONUS_ROUND = 100) AND (NOT (MESSAGE_ALREADY_OUTPUT (OFF-7-23480923)) OR (MESSAGE_IN_QUEUE (OFF-8-23480923))) | OFF-7-23480923 |

FIG. 11A

322B

| TRIGGER CONDITION FOR OUTPUTTING MESSAGE 1100B | MESSAGE(S) TO OUTPUT 1102B |
|---|---|
| (TIME_SINCE_LAST_MESSAGE_OUTPUT = 15 MINUTES) | NEXT MESSAGE IN QUEUE |
| (NEARBY_PLAYER_WINS_JACKPOT) | OFF-3-23480923 |
| (COMMUNICATION_MESSAGE_TO_PLAYER_INCLUDES_TEXT ("CAR")) | PROMO-5-85923475 |
| (PLAYER_MAKES_DINNER_RESERVATION_AT_ALICES_RESTAURANT) | OFF-9-23480923 AND HYP-3-093275126 |
| (TIME = 10:00PM) AND (HOTEL_OCCUPANCY_RATE < 50%) AND (PLAYER_NOT_STAYING_AT_HOTEL) AND (NUMBER_OF_COMP_POINTS > 500) | PROMO-7-85923475 |
| (COMMUNICATION_MESSAGE_RECEIVED) AND NOT(CURRENTLY_IN_BONUS_ROUND) | ANY COMMUNICATION MESSAGES RECEIVED |

FIG. 11B

324

| MESSAGE IDENTIFIER 1200 | TEXT REPRESENATION AVAILABLE? 1202 | SPANISH TEXT REPRESENATION AVAILABLE? 1204 | AUDIO REPRESENTATION AVAILABLE? 1206 | SPANISH AUDIO REPRESENTATION AVAILABLE? 1208 |
|---|---|---|---|---|
| PROMO-1-85923475 | YES | YES | YES | NO |
| INSTR-5-642985152 | NO | NO | YES | YES |
| STATUS-2-56189345 | YES | YES | NO | YES |
| HYP-1-093275126 | YES | NO | YES | NO |
| OFF-5-23480923 | YES | YES | YES | YES |
| COMBO-3-84151451 | NO | YES | NO | NO |

FIG. 12

326

| MESSAGE FORMATTING DATABASE FOR PLAYER-1-02834555 | | | | |
|---|---|---|---|---|
| MESSAGE CATEGORY 1300 | TYPE OF PARTITION OR WINDOW 1302 | COLOR OF MESSAGE BORDER 1304 | MESSAGE TITLE 1308 | SOUND UPON OUTPUT 1310 |
| FEATURES ON GAME MACHINES | HEADER | GREEN | "FEATURES" | BEEP |
| COMMUNICATION MESSAGES FROM SKIBUM@AOL.COM | MESSAGING WINDOW | LIGHT BLUE | "SKIBUM SAYS:" | TELEPHONE RING |
| ALL OTHER COMMUNICATION MESSAGES | MESSAGING WINDOW | DARK BLUE | NONE | NONE |
| HOTEL, RESTAURANT, AND TRAVEL MESSAGES | POP-UP WINDOW | RED | TIME OF DAY | PARROT SQUAWK |
| SPORTS SCORES | SCROLLING FOOTER | N/A | NAME OF SPORT | NONE |
| COMP POINTS | POP-UP WINDOW | RED | CURRENT BALANCE OF COMP POINTS | RINGING BELL MELODY |

FIG. 13

328A

| POSITION IN MESSAGE QUEUE 1400A | MESSAGE TO OUTPUT 1402A | PRIORITY OF MESSAGE 1404A |
|---|---|---|
| 1 | STATUS-4-56189345 | 456 |
| 2 | PROMO-1-85923475 | 289 |
| 3 | INSTR-1-642985152 | 95 |

FIG. 14A

328B

| POSITION IN MESSAGE QUEUE 1400B | MESSAGE TO OUTPUT 1402B | PRIORITY OF MESSAGE 1404B |
|---|---|---|
| 1 | STATUS-4-56189345 | 456 |
| 2 | HYP-3-093275126 | 321 |
| 3 | PROMO-1-85923475 | 289 |
| 4 | INSTR-1-642985152 | 95 |

FIG. 14B

330

| SUPPRESSION CONDITION 1500 | RESULT OF SUPPRESSION 1502 | TRIGGER CONDITION FOR DELAYED OUTPUT (IF APPLICABLE) 1504 |
|---|---|---|
| (CURRENT_GAME_STATE = "BONUS_ROUND") | DELAY UNTIL TRIGGER CONDITION | (BONUS_ROUND_OVER) AND (BONUS_PRIZE_VALUE < 100 COINS) |
| (NUMBER_OF_MESSAGES_IN_LAST_15_MINUTES > 5) | DELAY UNTIL TRIGGER CONDITION | (TIME_SINCE_LAST_MESSAGE_OUTPUT = 15 MINUTES) |
| PLAYER_DOES_NOT_SPEAK (MESSAGE_LANGUAGE (CURRENT_MESSAGE)) | CANCEL MESSAGE | N/A |
| ((CURRENT_TIME - LOGON_TIME) < 5 MINUTES) AND (CREDIT_BALANCE > 10 CREDITS)) | DELAY UNTIL TRIGGER CONDITION | (CREDIT_BALANCE <= 10 CREDITS) OR (AVERAGE_RATE_OF_PLAY < 6 GAMES/ MINUTE) |
| ((ALREADY_OUTPUT_TO_PLAYER (CURRENT_MESSAGE)) OR (ALREADY_OUTPUT_TO_PLAYER (MESSAGES_SIMILAR_TO (CURRENT_MESSAGE))) | CANCEL MESSAGE | N/A |
| (AVERAGE_RATE_OF_PLAY > 10 COINS/MINUTE) | DELAY UNTIL TRIGGER CONDITION | (TIME_BETWEEN_SPINS > 8 SECONDS) |
| (DO_NOT_DISTURB_BUTTON_PRESSED) AND (MESSAGE_PRIORITY < 200) | PUT MESSAGE IN QUEUE | N/A |
| MICROPHONE_ON_GAME_MACHINE_SENSES (PLAYER_IS_SPEAKING) | DELAY UNTIL TRIGGER CONDITION | (SPIN_BUTTON_PRESSED) |

FIG. 15

332

| MESSAGE THAT WAS OUTPUT 1600 | RECIPIENT OF MESSAGE 1602 | TIME WHEN MESSAGE WAS OUTPUT 1604 | PLAYER'S RESPONSE TO MESSAGE (IF ANY) 1606 |
|---|---|---|---|
| PROMO-1-85923475 | PLAYER-1-02834555 | 8/16/01 1:47PM | N/A |
| OFF-3-23480923 | PLAYER-2-02834555 | 8/16/01 1:50PM | OFFER ACCEPTED |
| HYP-3-093275126 | PLAYER-3-02834555 | 8/16/01 2:01PM | PLAYER SIGNS UP FOR PLAYER TRACKING CARD |
| STATUS-1-56189345 | PLAYER-4-02834555 | 8/16/01 2:03PM | N/A |
| PROMO-7-85923475 | PLAYER-4-02834555 | 8/16/01 2:03PM | PLAYER PURCHASES HOTEL ROOM FOR THE NIGHT |
| COMBO-4-84151451 | PLAYER-5-02834555 | 8/16/01 2:05PM | "NO, THANK YOU" |
| INSTR-4-642985152 | PLAYER-2-02834555 | 8/16/01 2:09PM | N/A |

FIG. 16

METHOD AND APPARATUS FOR OUTPUTTING A MESSAGE AT A GAME MACHINE

RELATED APPLICATIONS

The present application claims priority to commonly-owned, U.S. Provisional Patent Application No. 60/418,397 filed Oct. 11, 2002, entitled "METHOD AND APPARATUS FOR OUTPUTTING A MESSAGE AT A GAMING DEVICE" which is incorporated herein by reference in its entirety for all purposes.

The present application is related to the following commonly-owned, co-pending U.S. patent applications:

(i) U.S. patent application Ser. No. 09/603,677, filed Jun. 26, 2000, entitled "METHOD AND APPARATUS FOR SELECTING A SUPPLEMENTAL PRODUCT TO OFFER FOR SALE DURING A TRANSACTION", the entirety of which is incorporated by reference herein for all purposes;

(ii) U.S. patent application Ser. No. 09/993,228, filed Nov. 14, 2001, entitled "METHOD AND APPARATUS FOR DYNAMIC RULE AND/OR OFFER GENERATION", the entirety of which is incorporated by reference herein for all purposes;

(iii) U.S. patent Reissue application Ser. No. 10/222,523, filed Aug. 16, 2002, entitled "GAMING DEVICE FOR OPERATING IN A REVERSE PAYOUT MODE AND A METHOD OF OPERATING SAME", the entirety of which is incorporated by reference herein for all purposes;

(iv) U.S. patent application Ser. No. 09/879,299, filed Jun. 12, 2001, entitled "SYSTEM AND METHOD FOR AUTOMATED PLAY OF MULTIPLE GAMING DEVICES", the entirety of which is incorporated by reference herein for all purposes;

(v) U.S. patent application Ser. No. 10/121,243, filed Apr. 11, 2002, entitled "METHODS AND SYSTEMS FOR FACILITATING PLAY AT A GAMING DEVICE BY MEANS OF THIRD PARTY OFFERS", the entirety of which is incorporated by reference herein for all purposes;

(vi) U.S. patent application Ser. No. 10/419,304 filed Apr. 18, 2003, entitled "GAMING DEVICE METHODS AND APPARATUS EMPLOYING MODIFIED PAYOUTS", the entirety of which is incorporated by reference herein for all purposes;

(vii) U.S. patent application Ser. No. 10/417,436 filed Apr. 16, 2003, entitled "METHOD AND APPARATUS FOR OPTIMIZING THE RATE OF PLAY OF A GAMING DEVICE", the entirety of which is incorporated by reference herein for all purposes;

(viii) U.S. patent application Ser. No. 10/361,201, filed Feb. 7, 2003, entitled "GAMING DEVICE AND METHOD OF OPERATION THEREOF", the entirety of which is incorporated by reference herein for all purposes;

(ix) U.S. patent application Ser. No. 10/414,511 filed Apr. 15, 2003, entitled "METHOD AND APPARATUS FOR BONUS ROUND PLAY", the entirety of which is incorporated by reference herein for all purposes;

(x) U.S. patent application Ser. No. 10/328,116, filed Dec. 20, 2002, entitled "METHOD AND APPARATUS FOR OUTPUTTING OUTCOMES OF A GAMING DEVICE", the entirety of which is incorporated by reference herein for all purposes;

(xi) U.S. patent application Ser. No. 10/254,831, filed Sep. 25, 2002, entitled "METHOD AND APPARATUS FOR LINKED PLAY GAMING", the entirety of which is incorporated by reference herein for all purposes;

(xii) U.S. patent application Ser. No. 10/007,874, filed Nov. 12, 2001, entitled "ELECTRONIC AMUSEMENT DEVICE AND METHOD FOR PROPAGATING A PERFORMANCE ADJUSTMENT SIGNAL", the entirety of which is incorporated by reference herein for all purposes;

(xiii) U.S. patent application Ser. No. 10/322,107, filed Dec. 18, 2002, entitled "FREE LONG DISTANCE CALLS ON SLOT MACHINES", the entirety of which is incorporated by reference herein for all purposes;

(xiv) U.S. patent application Ser. No. 10/419,478, filed Apr. 18, 2003, entitled "METHOD AND APPARATUS FOR ENABLING A PLAYER TO SELECT FEATURES ON A GAMING DEVICE", the entirety of which is incorporated by reference herein for all purposes; and (xv) U.S. patent application Ser. No. 10/420,068, filed Apr. 21, 2003, entitled "METHOD AND APPARATUS FOR MANAGING FEATURES ON A GAMING DEVICE", the entirety of which is incorporated by reference herein for all purposes.

FIELD OF THE INVENTION

The present invention relates to gaming devices. More specifically, the present invention relates to methods and apparatus for providing messages to players at a gaming machine.

BACKGROUND OF THE INVENTION

There are currently over 500,000 slot machines in operation that together generate more than $15 billion in annual revenue for United States casinos. Most casinos generate more than half of their gaming revenues from slot machines and some individual casinos offer three or four thousand slot machines at a single location. In fact, two different casinos in Connecticut each provide more than six thousand gaming devices for players.

The variations of games and features of all the different game machines available at a single casino can be overwhelming to players. In addition, casinos frequently have many opportunities to market to players and recognize that interacting with customers may lead to a more profitable relationship with players. Further, to keep experienced and frequent players interested, casinos continually modify and upgrade game machines. Thus, for a variety of reasons, there is a need for systems and methods to provide information to (or otherwise communicate with) players at game machines.

Currently, casinos will frequently hire hosts and hostesses to cater to players who make large wagers or play frequently. However, this method of communicating with players is typically too costly to implement for all players at a casino.

BRIEF DESCRIPTION OF THE DRAWINGS

FIG. 4 is a table illustrating an example data structure of an example player database 308 as depicted in FIG. 3 for use in some embodiments of the present invention.

FIG. 5 is a table illustrating an example data structure of an example promotional message database 310 as depicted in FIG. 3 for use in some embodiments of the present invention.

FIG. 6 is a table illustrating an example data structure of an example instructive message database 312 as depicted in FIG. 3 for use in some embodiments of the present invention.

FIG. 7 is a table illustrating an example data structure of an example status message database 314 as depicted in FIG. 3 for use in some embodiments of the present invention.

FIG. 8 is a table illustrating an example data structure of an example hypothetical information database 316 as depicted in FIG. 3 for use in some embodiments of the present invention.

FIG. 9 is a table illustrating an example data structure of an example activity benefit offer database 318 as depicted in FIG. 3 for use in some embodiments of the present invention.

FIG. 10 is a table illustrating an example data structure of an example combination message database 320 as depicted in FIG. 3 for use in some embodiments of the present invention.

FIGS. 11A and 11B are tables illustrating an example data structure of example trigger condition databases 322A, 322B for use in some embodiments of the present invention.

FIG. 12 is a table illustrating an example data structure of an example message representation database 324 as depicted in FIG. 3 for use in some embodiments of the present invention.

FIG. 13 is a table illustrating an example data structure of an example message formatting database 326 as depicted in FIG. 3 for use in some embodiments of the present invention.

FIGS. 14A and 14B are a tables illustrating an example data structure of an example message queue database 328 at two different times 328A, 328B for use in some embodiments of the present invention.

FIG. 15 is a table illustrating an example data structure of an example suppression condition database 330 as depicted in FIG. 3 for use in some embodiments of the present invention.

FIG. 16 is a table illustrating an example data structure of an example message history database 332 as depicted in FIG. 3 for use in some embodiments of the present invention.

DETAILED DESCRIPTION OF SOME EMBODIMENTS OF THE INVENTION

Figure 1:
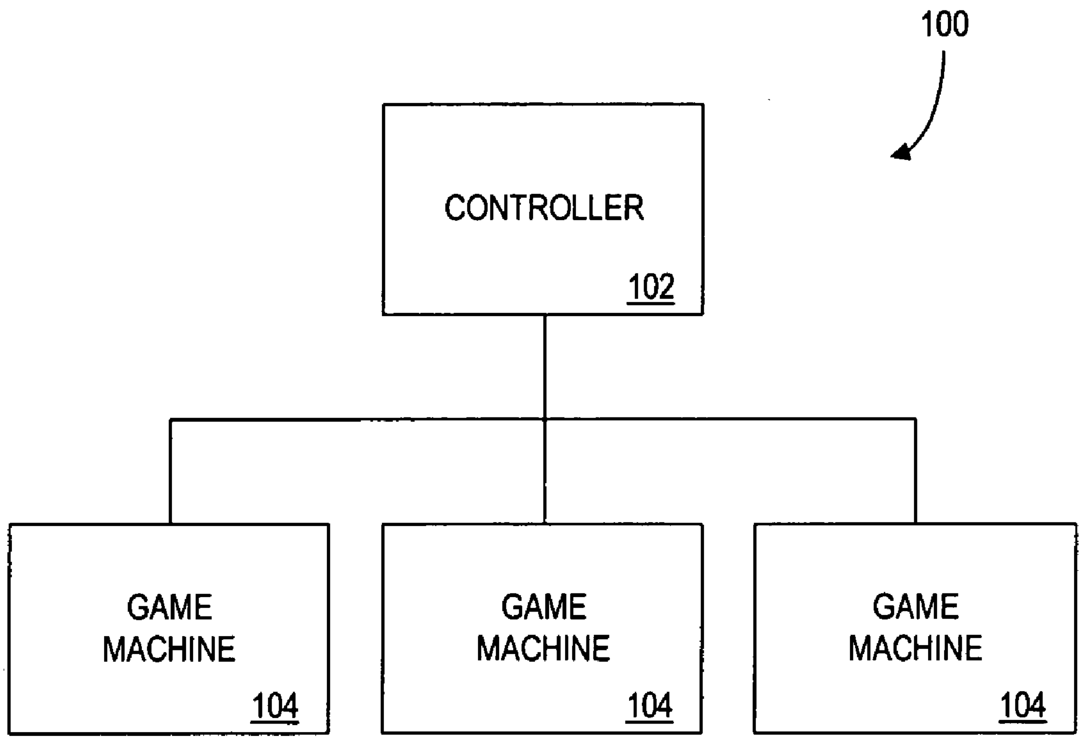
FIG. 1 is a block diagram illustrating an example system 100 according to some embodiments of the present invention.

The disclosed invention overcomes the above and other drawbacks of the prior art by allowing a casino, or other entity, to use a game machine to provide relevant information at appropriate times, and/or in response to appropriate events, to players using a game machine. The present invention provides a dynamic and flexible system adapted to interact with players on an individual basis by aiding in the management, determination, distribution, and delivery of promotional, inspirational, instructive, informational, communicative, incentive, and other types of messages.

Various methods are provided that may be used to ensure that receiving messages at a game machine enhances a player's overall gaming experience. The present invention provides systems and methods useful to selectively output helpful and desirable messages to players while minimizing interference with the player's gaming and to avoid any irritating "spam" effect created by overwhelming players with unsolicited, unwanted, and/or irrelevant messages. The present invention may be used to allow game machines to cater to all players with the same level of service and attention previously provided exclusively to "high rollers" by hosts and hostesses.

A variety of different types of messages may be output at game machines, including promotional messages (e.g., "Sign up for a credit card"), instructive messages (e.g., "Press and hold the spin button for 10 seconds to activate AutoPlay Mode"), and communication messages (e.g., "Hey Alice, how's it going? from Bob"). The present invention may employ a variety of different methods to output a message to a player at a game machine. For example, messages may be output in "pop-up" windows, in sidebars, in different colors, in different fonts, in different languages, via a celebrity voice, or in different media formats (e.g., text, audio, video). Outputting a message to a player may include determining how to output the message to the specific player based on preferences, special needs, or other factors.

In some embodiments, a message may be output to a player based on a trigger condition. For example, a message may be output to a player when a trigger condition occurs, thereby ensuring that the message is output at an appropriate time (e.g., when the player would be interested in viewing the message). Messages may be output based on a variety of different factors, including a player's gaming activities (e.g., what games are played and when), a player's other activities (e.g., arrival and departure from a casino), preferences (e.g., no messages during the first five minutes of gaming at a game machine), other messages (e.g., similar messages, or messages that have been output recently), and other players (e.g., friends of a player).

Other aspects of the present invention include features that may be used to directly enhance a player's experience. For example, messages timed and targeted to make a player aware of opportunities available to him maybe presented using a humorous animated character. Further, other features of the invention help optimize the effectiveness of messages. For example, output of messages may be delayed when a player is busy or would not be interested in receiving a message. In another example, messages may be prioritized so that messages that would be most interesting to a player are output first. In another example, messages may be categorized or sorted for a player so that the player can easily find a message in which he is interested.

The present invention allows a casino, via a game machine, to output appropriate messages in an appropriate way to appropriate players at appropriate times. Various methods are provided for identifying players who would be interested in receiving messages, are likely to accept messages, and/or are/would be valuable customers. Various different types of messages, beneficial to players, casinos, and other parties, may be presented that are relevant and helpful while repetitive, annoying, and irrelevant messages are filtered or suppressed.

In addition, messages may be output in such a manner so as not to interfere with gaming or other activities. This feature of the invention benefits both players and casinos. By providing means to output messages in ways acceptable to players, the present invention avoids distracting players from gaming which may otherwise reduce a casino's revenues.

Messages may be output in such a manner that they attract a player's attention. This may be beneficial to players, casinos, and other interested parties (e.g., subsidizers), because players may pay more attention to messages. By presenting messages only at appropriate times and in a manner a player understands, the present invention avoids annoying or distracting a player who is already occupied, e.g., cognitively engrossed in the middle of a hot streak during game play. Further, with the use of the present invention, players will be able to pay closer attention to messages that are output at the right time. This may be beneficial to players, casinos, and other interested parties (e.g., subsidizers).

The present invention is also beneficial to players in that players may learn about features on game machines. These features may greatly enhance a player's enjoyment of his gaming experience while casinos and/or other parties may receive additional revenues based on the use of these otherwise ignored features. The present invention facilitates proprietors of features to promote the features to players. Such promotional messages may inform players of products or services. Players may learn about products or services that are enjoyable or helpful and they may receive various types of benefits, including discounts, free products or services, gaming-related benefits, and other forms of consideration.

The present invention may allow casinos to earn additional revenues from players and third-party subsidizers, while subsidizers may market products or services to players. Further, instructive messages may inform players about games and game machines which may allow players to improve their game play, increasing their chances of winning a jackpot, and facilitating their enjoyment of the gaming experience. The present invention may alleviate player frustration and/or confusion while operating a game machine. As a result, players may enjoy games more with a better understanding of the games. Likewise, informative status messages and communication messages may be helpful to players. A player may no longer need to stop gaming in order to determine status information or just to communicate with another party (e.g., friends and family members of the player). In addition, casinos and/or other parties may receive additional revenues based on some status messages or the use of communication services.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense, and the scope of the present invention is defined by the appended claims.

A. TERMS

Throughout the description that follows and unless otherwise indicated, the following terms may include and/or encompass the example meanings provided in this section. These terms and illustrative example meanings are provided to clarify the language selected to describe embodiments of the invention both in the specification and in the appended claims.

The terms "player" and "user" shall be synonymous and may refer to any person or entity that plays or operates a game machine.

The terms "game machine," "gaming device," and "gaming machine" shall be synonymous and may refer to any electrical, mechanical, electromechanical, software, combination thereof, and/or other device that may accept a wager, may follow a process to generate an outcome, and may authorize the payment of winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, keno terminals, pachinko machines, video blackjack machines, arcade games, video games, pinball machines, skill crane machines, video lottery terminals, online gaming systems, game consoles, personal computers logged into online gaming sites, gaming device simulations, sports or race betting machine, etc. Gaming devices may or may not be owned and/or maintained by a casino and/or may or may not exist within a casino location. Gaming devices may be activated by a player pressing a spin button (including buttons labeled "bet", "wager", "deal", "start", "go", "hit", and/or the like), pulling a handle, and/or any other method to initiate the generation of an outcome. In some embodiments, game machines may include communications facilities. In embodiments of the invention addressing table game play such as blackjack, craps, roulette, baccarat, Keno, Bingo, and the like, a game machine may be hardware located at the game table suitable for displaying a message to a player.

The term "casino" may refer to the owner of gaming devices, owners' agents, and/or any entity who may profit from players' use of the gaming devices.

The term "casino location" may refer to the physical geographic site, complex, or building where gaming devices owned and/or operated by a casino are located. In the case of an online casino, casino location may refer to the address (e.g., the uniform resource locator (URL)) of the online casino's Web site or facility.

The terms "handle pull" and "spin" shall be synonymous and may refer to an action that initiates a single play at a gaming device. In some embodiments, a handle pull may refer to a single complete game (or hand) or in other embodiments, the term may refer to a play related to a single wager. For example, in video blackjack, a user might play a single game in which he splits a pair of sevens, requiring an additional wager. This single game may be considered to include one or multiple handle pulls in different embodiments.

The terms "controller," "server," and "casino server" shall be synonymous and may refer to any device that may communicate with one or more game machines, one or more third-party servers, one or more remote controllers, one or more player devices, and/or other network nodes, and may be capable of relaying communications to and from each.

The term "user terminal" and "remote controller" shall be synonymous and may refer to any device that may communicate with one or more casino servers, one or more gaming devices, one or more third-party service provider servers, one or more player devices, and/or other network nodes. User terminals may, for example, include personal computers, laptop computers, handheld computers, telephones, kiosks, automated teller machines, gaming devices, game consoles, and/or vending machines. They may include facilities to support secure communications using encryption or the like.

The terms "player device" and "user device" shall be synonymous and may refer to any device owned or used by a user or consumer capable of accessing and/or displaying online and/or offline content. Player devices may communicate with one or more casino servers, one or more gaming devices, one or more third-party service provider servers, one or more user terminals, and/or other network nodes. In some embodiments, player devices may, for example, include gaming devices, personal computers, personal digital assistants, point-of-sale terminals, point-of-display terminals, kiosks, telephones, cellular phones, automated teller machines (ATMs), pagers, and combinations of such devices.

The term "input device" may refer to a device that is used to receive an input. An input device may communicate with or be part of another device such as a point-of-sale terminal, a point-of-display terminal, a user terminal, a server, a player device, a gaming device (e.g., a pressure sensor in a "spin" button on a gaming device), a controller, etc. Some examples of input devices include: a "spin" or "deal" button and/or a handle on a gaming device, a bar-code scanner, a magnetic stripe reader (e.g., to read a player tracking card), a computer keyboard, a computer mouse, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, an RF receiver, a radio antenna (e.g., for receiving inputs from a second slot machine), a thermometer, a pressure sensor, a biometric input device (e.g., a fingerprint or retinal scanner), a location sensor (e.g., a global positioning system card), a voice recognition module, a coin or bill acceptor, and a weight scale/pressure sensor. For game machines, examples of common input devices include: a button on a video poker machine, a lever on a slot machine, a touch screen on a video poker machine, a magnetic stripe reader to read a player tracking card inserted into a slot machine, and a motion sensor to determine if a player is standing in front of a game machine.

The term "output device" may refer to a device that is used to output information. An output device may communicate with or be part of another device (e.g., a gaming device, a point-of-sale terminal, a point-of-display terminal, a player device, a casino device, a controller, etc.). Some possible output devices include: a cathode ray tube (CRT) video monitor, liquid crystal display (LCD) screen, light emitting diode (LED), an LED screen, a printer, an audio speaker, an infrared transmitter/port (e.g., for communicating with a second slot machine), a radio transmitter, an electric motor, a coupon or product dispenser, a Braille computer monitor, a coin or bill dispenser. For game machines, examples of common output devices include: a cathode ray tube (CRT) monitor on a video poker machine; a bell on a slot machine (e.g., rings when a player wins); an LED display of a player's credit balance on a slot machine; an LCD display of a personal digital assistant (PDA) for displaying keno numbers; a printer to provide a cashless gaming receipt; and a progressive jackpot meter bolted onto the top of a game machine.

The terms "I/O device" and "input/output device" shall be synonymous and may refer to any combination of input and/or output devices.

The term "player tracking card" may refer to a device that may be capable of identifying and/or storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store player and/or membership and/or player preference information such as a player's desired rate of play. Alternatively information on the card may merely be a pointer to information stored on a server.

The term "gross winnings" may refer to a player's total winnings for a session or time period, without regard to the amounts wagered during the session.

The term "net winnings" may refer to a player's total winnings for a session or time period, less the total amount wagered during that time period.

The term "parameter" may refer to a physical characteristic of a gaming device, its displayed text, graphics, video, audio, games, features, options, or any aspect of the way in which a gaming device operates. For example, the amount of time the gaming device allows its reels to spin after a single handle pull may be a parameter of the gaming device. The sensitivity of a button of the gaming device may be another parameter. A third parameter may be the volume at which the gaming device produces sound. A fourth parameter may be a status of a player selectable mode of operation of the gaming device, e.g., whether a "Betting the Don't," "Auto-Play Mode," and/or a "Jackpot Only" feature is enabled. A "game play" parameter may refer to a parameter related to a characteristic of a gaming device specific to the experience of playing the game of the gaming device. For example, the pace of the game may be considered a game play parameter, whereas the clock speed of the gaming device's processor would likely not be considered a game play parameter.

The terms "feature" and "option" may be synonymous and may refer to a parameter that may affect how a game operates on a game machine. Features may affect processes like operating a game, displaying game play, determining outcomes, or outputting game results. Features may include modes of operation of a game machine.

The terms "reel resolution" and "resolution" shall be synonymous and may refer to the perceptible actions of a gaming device that are displayed to give the perception that the gaming device is working to generate an outcome. Modern gaming devices typically use very fast processors to generate outcomes almost instantaneously. The sounds and displays typically presented by such gaming devices are not actually related to the generation of the outcomes. In an attempt to enhance the gaming experience, modern gaming devices may create the perception that the sounds and displays must complete or "resolve" before the outcome may finally be presented. These "reel resolution" actions (including sounds, displays, animations, flashing lights, etc.) by the gaming device typically take orders of magnitude longer to complete than the processor of the gaming device takes to generate an outcome. However, in early slot machines, the time it took for the reels to stop spinning (or to "resolve") was the time it took for the gaming device to generate an outcome. Reel resolution may refer to any actions or displays by the gaming device between the time a player initiates a handle pull and the time the gaming device displays the outcome. In video poker and/or video blackjack type games, resolution may refer to actions or displays presented while the player waits to see the cards he is dealt. In a bonus round, reel resolution may refer to actions or displays presented while the player watches computation of bonus points or other outcomes.

The terms "reel resolution time" or "resolution time" shall be synonymous and may refer to the time it takes between a handle pull and final presentation of the resulting outcome.

Reel resolution time may be almost instantaneous or in the case of elaborate bonus round animations, for example, may take several minutes.

The terms "session," "gaming session," "gambling session," and "play session" shall be synonymous and may refer to a series of plays at one gaming device, a series of plays at multiple gaming devices, and/or a continuous period of time spent gambling in a casino or home PC location.

The terms "products," "goods," "merchandise," and "services" shall be synonymous and may refer to anything licensed, leased, sold, available for sale, available for lease, available for licensing, and/or offered or presented for sale, lease, or licensing including packages of products, subscriptions to products, contracts, information, services, and intangibles.

The term "merchant" may refer to an entity who may offer to sell, lease, and/or license one or more products to a consumer (for the consumer or on behalf of another) or to other merchants. For example, merchants may include sales agents, sales channels, individuals, companies, manufacturers, distributors, direct sellers, re-sellers, subsidizers, and/or retailers. Merchants may transact out of buildings including stores, outlets, malls, casinos, and warehouses, and/or they may transact via any number of additional methods including mail order catalogs, vending machines, online web sites, and/or via telephone marketing. Note that a producer or manufacturer may choose not to sell to customers directly and in such a case, a retailer may serve as the manufacturer's or producer's sales channel or agent.

The term "subsidizer" may refer to an entity that provides a subsidy to a casino or other party operating a controller (e.g., in exchange for the playerr's promise to perform an activity). A third-party subsidizer may be a merchant operating independently from a casino except that the casino may present offers to players that benefit the third-party subsidizer.

The term "message" may refer to any communication, in any form, intended to be presented to a player or other party. Messages may be of one or a combination of types. For example, message types may include status messages, promotional messages, instructive messages, hypothetical information messages, activity-benefit offer messages, and/or communication messages. Status message may include messages that inform a player of a condition or event that occurs. Examples of status messages may include reminders, updates, news alerts, and/or sports scores. Instructive messages may include messages that provide instructive information relating to a game machine and/or game play. Examples of instructive messages may include help messages, tips and tricks, demonstrations, and hypothetical information about past game play. Communication messages may include messages generated by one or more people that are intended for a player. For example, friends may send a communication message to a player at a game machine. Promotional messages may include messages that promote one or more products to a player. Examples of promotional messages may include advertisements, offers for free products, offers to sell products, and activity-benefit offers. Combination messages may include messages that fall into multiple categories and/or include multiple types of messages. For example, a message describing a feature may be both instructive message and a promotional message.

The term "activity-benefit offer" may refer to an offer that includes a description of an activity to be performed by a player (and/or may include player's promise to perform the activity) and a benefit to be received if this activity is performed. In some embodiments of the invention, an activity-benefit offer may be output to a player as a message and a player may have an opportunity to accept or reject the activity-benefit offer. The activity may be an action or task that may be performed by, or on behalf of, a player in exchange for the benefit. The benefit may be a product or other form of value provided to, or on behalf of, a player in exchange for performing the activity.

The term "response" may refer to an indication provided by a player that is based on a message. For example, a message may be a question. A player may provide a response of "yes" or "no" to the question.

The term "representation" may refer to a method of outputting a message and/or a format in which a message is presented. For example, a message may have a plurality of message representations (e.g., one in English, one in Spanish, one in green, one in yellow, one in audio, etc.).

The term "partition" may refer to a video screen or an area of a video screen that is used to display related information. Some common examples of partitions include windows, split-screen displays, sidebars, headers, and footers.

The term "category" may refer to a grouping of one or more messages. For example, all messages of a certain type may fall into a single category (e.g., all messages relating to food, all status messages).

The term "presenter" may refer to an entity that presents a message to a player via a game machine. For example, a celebrity in a video message may be a presenter, or a cartoon character may present a message to a player.

The term "visual cue" may refer to an aspect of a visual display of a message. Examples of visual cues include color, fonts, window borders, and location.

The term "queue" may refer to an ordered list of messages that may be output. For example, the first message in a queue may be output when a trigger condition occurs.

The term "outputting" may refer to presenting, displaying, revealing, and/or indicating information. Note that outputting a message may include outputting a representation of the message.

The term "trigger condition" may refer to a condition that, upon its occurrence or satisfaction, results in a controller outputting a message at a game machine. For example, a message may be output to a player when the player exits a bonus round on a game machine in a system where "exiting a bonus round" is specified as an occurrence of a trigger condition.

The term "factor" may refer to information that may affect a process. For example, various factors may affect whether a trigger condition occurs or whether a message is output to a player.

The term "suppressing" may refer to preventing, canceling, delaying, or not outputting information. For example, a message may be suppressed if it is no longer relevant to a player and should not be output.

The term "suppression condition" may refer to a condition that, upon its occurrence or satisfaction, results in a controller and/or a game machine suppressing a message. For example, a message may be suppressed if a player is currently playing a bonus round on a game machine in a system where "playing a bonus round" is specified as an occurrence of a suppression condition.

The term "payout" may refer to a prize that is provided to a player based on the outcome of a game. A payout may be any form of consideration, including money, products (e.g., a new car, a hotel room for the night, dinner, a shoe shine, tickets to a show), and alternate currencies (e.g., comp points, frequent flyer miles).

B. SYSTEM

Figure 2:
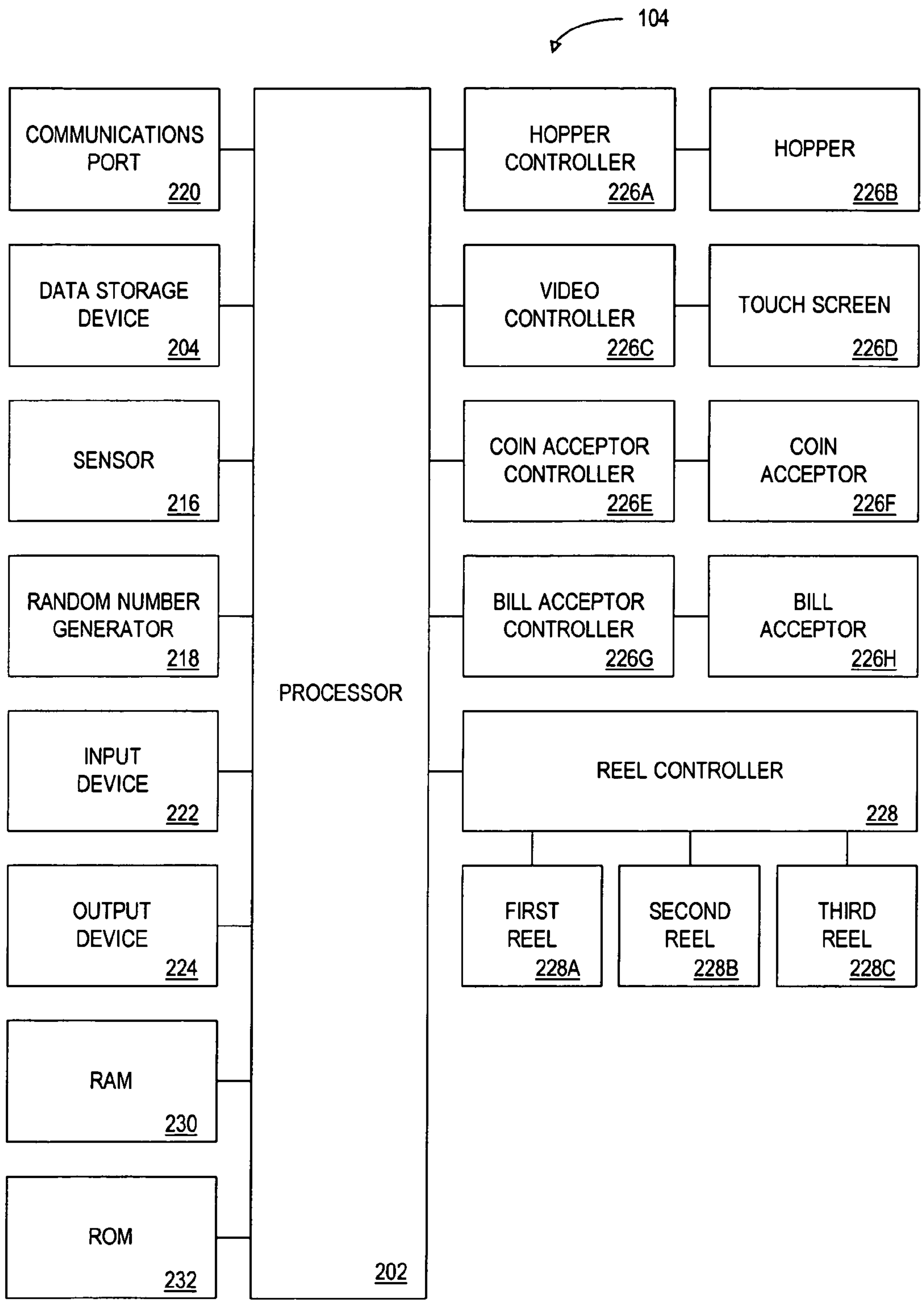
FIG. 2 is a block diagram illustrating an example of the details of a game machine 104 as depicted in FIG. 1 according to some embodiments of the present invention.
Figure 3:
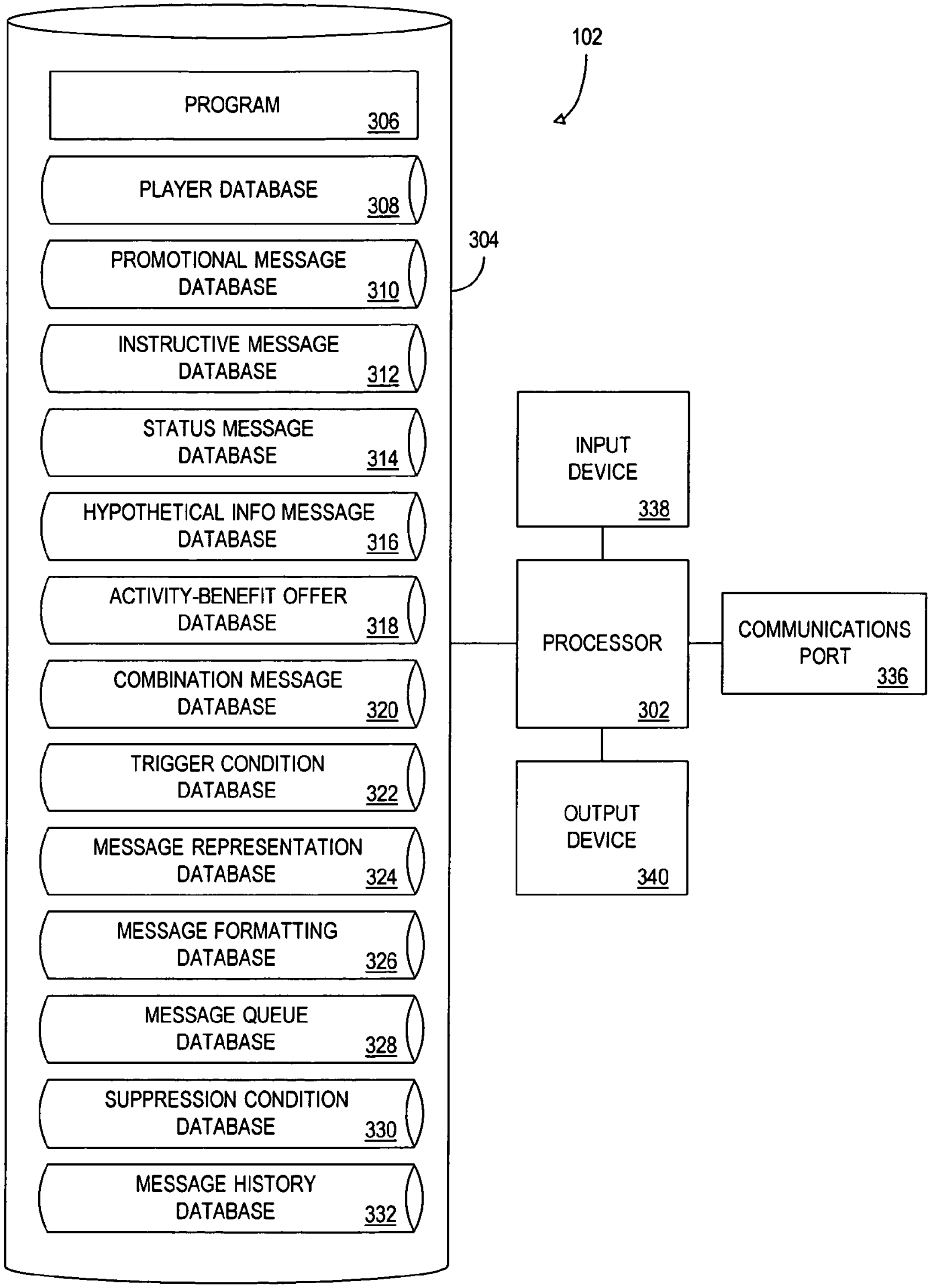
FIG. 3 is a block diagram illustrating an example of the details of a controller 102 as depicted in FIG. 1 according to some embodiments of the present invention.

An example embodiment of the system 100 of the present invention is depicted in FIG. 1. The system 100 according to some embodiments of the present invention may include one or more controllers 102 (an example of which is depicted in FIG. 3) in one or two-way communication with one or more game machines 104 (an example of which is depicted in FIG. 2) via a network such as, for example, the Internet or via another communications link. Although not pictured, other casino devices besides game machines 104 may be connected to the controller 102. Likewise, servers of other casinos and other establishments may be in direct or indirect communication with the controller 102. Note that in some embodiments, the system may consist of only a game machine 104.

In operation, the controller 102 may function under the control of a casino, merchant, subsidizer, or other entity that may also control use of the game machines 104. For example, the controller 102 may be a server in a merchant's network. In some embodiments, the controller 102 may also be a merchant's server.

In the embodiment pictured in FIG. 1, communication between the controller 102, the game machines 104, and/or third-party servers (not pictured), may be direct and/or via a network such as the Internet. Each of the controller 102 and the game machines 104 may comprise, for example, computers, such as those based on the Intel® Pentium® or Centrino™ processor, that are adapted to communicate with each other. Any number of third-party servers (not pictured), external casino servers (not pictured), and/or game machines 104 may be in direct or indirect, one or two-way communication with the controller 102. The controller 102 and/or the game machines 104 may each be physically proximate to each other or geographically remote from each other. The controller 102 and/or the game machines 104 may each include input/output devices.

As indicated above, communication between the controller 102 and the game machines 104 may be direct or indirect, such as over an Internet Protocol (IP) network such as the Internet, an intranet, or an extranet through a web site maintained by the controller 102 (and/or a third-party server) on a remote server or over an online data network including commercial on-line service providers, bulletin board systems, routers, gateways, and the like. In some embodiments, the nodes may communicate with each other over local area networks including any combination of Ethernet, Token Ring, FDDI Full Duplex Technology (FFDT), and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like. Communication between the controller 102 and the game machines 104 (and any other devices) may be encrypted to ensure privacy, provide security, and prevent fraud.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks or months at a time.

The controller 102 (and/or a third-party server) may function as a "Web server" that presents and/or generates Web pages which are documents stored on Internet-connected computers accessible via the World Wide Web using protocols such as, e.g., the hyper-text transfer protocol ("HTTP"). Such documents typically include one or more hyper-text markup language ("HTML") files, associated graphics, sound, and script files. A Web server allows communication with the controller 102 in a manner known in the art. The game machines 104 may use a web browser, such as NAVIGATOR® published by NETSCAPE® for accessing HTML forms generated or maintained by or on behalf of the controller 102 and/or a third-party server.

As indicated above, the controller 102 and/or a third-party server may include or be part of, e.g., processor based cash registers, telephones, interactive voice response (IVR) systems such as the ML400-IVR™ sold by Missing Link, Inc. of New Britain, Conn., cellular/wireless phones, vending machines, pagers, gaming devices including slot machines, personal computers, portable types of computers, such as a laptop computer, a wearable computer, a palm-top computer, a hand-held computer, a smart card, and/or a Personal Digital Assistant ("PDA"). Further details of the controller 102 and the game machines 104 are provided below with respect to FIGS. 2 and 3.

As indicated above, in some embodiments of the invention, the controller 102 (and/or a third-party server) may include game machines 104. In addition, the controller 102 may communicate with users directly instead of through the game machines 104. Although not pictured, the controller 102, a third-party server, and/or the game machines 104 may also be in communication with one or more consumer and/or merchant credit institutions to effect currency transactions and may do so directly or via a secure financial network such as the Fedwire network maintained by the United States Federal Reserve System, the Automated Clearing House (ACH) Network, the Clearing House Interbank Payments System (CHIPS), or the like.

In operation, the controller 102 and the game machines 104 may exchange information about the use of the game machines 104 by individual players, data about the players, messages, and the like. In embodiments with a third-party server, the controller 102 and/or the game machines 104 may exchange information about the use of the game machines 104 by individual players, data about the players, messages, and the like via the third-party server. The game machines 104 may, for example, provide information related to parameters and conditions to the controller 102 (and/or a third-party server). The game machines 104 may further provide gambling performance and player data to the controller 102 (and/or a third-party server). The controller 102 (and/or a third-party server) may provide messages for a player and/or historical information about the player to the game machines 104 in the casino location or to remote gaming devices.

It is worthwhile to note that the system 100 may be arranged into a variety of configurations, with functionality residing in various locations. Various information may be transmitted between different devices. For example, the controller 102 may control most aspects of outputting a message. It may determine a message to output, determine when to output the message, and determine how to output the message. The message may then be transmitted to a game machine 104 and output to the player by the game machine 104.

In some embodiments as indicated above, the controller 102 may reside in a game machine 104. For example, a game machine 104 may control most aspects of outputting a message. A game machine 104 may not even have a network connection. In some embodiments, a message may be determined by the controller 102, but a game machine 104 may control when to output the message. For example, a game machine 104 may suppress a message that is transmitted by the controller 102.

In some embodiments, a message may be determined by the controller 102, and the controller 102 may determine a representation for the message and a trigger condition. This information may be transmitted to a game machine 104 and then the game machine 104 may output the representation of the message when a trigger condition occurs. In some embodiments, a game machine 104 may determine that a trigger condition has occurred and query the controller 102 to determine a message to output. The controller 102 may then transmit a message to the game machine 104 for output by the game machine 104. Note that a wide variety of other configurations are possible. It should be understood that methods of the invention may be implemented by one or more game machines 104, one or more controllers 102, other devices, and/or any combination thereof.

C. DEVICES

FIG. 2 is a block diagram illustrating details of an example of a game machine 104 of FIG. 1. As indicated above, a game machine 104 may include all of the functionality and structure of a controller 102 in some embodiments of the invention. In the particular example embodiment depicted in FIGS. 2 and 3, the game machine 104 is shown as distinct from the controller 102 but at least includes hardware and software operable to respond to instructions from the controller 102 and includes one or more game machine programs (not pictured) to execute the methods of the present invention or portions thereof as indicated above in the text describing the system in operation.

FIG. 3 is a block diagram illustrating details of an example of the controller 102 of FIG. 1 (and/or an example of a third-party server). The controller 102 is operative to manage the system 100 and execute the methods of the present invention. The controller 102 may be implemented as one or more system controllers, one or more dedicated hardware circuits, one or more appropriately programmed general purpose computers, or any other similar electronic, mechanical, electro-mechanical, and/or human operated device.

The controller 102 (and/or a third-party server) may include a processor 302, such as one or more Intel® Pentium® processors. The processor 302 may include or be coupled to one or more clocks or timers (not pictured), an input device 338, an output device 340, and one or more communication ports 336 through which the processor 302 communicates with other devices such as the game machines 104 and/or a third-party server. The processor 302 is also in communication with a data storage device 304. The data storage device 304 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 302 and the storage device 304 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the controller 102 may comprise one or more computers (or processors 302) that are connected to a remote server computer operative to maintain databases, where the data storage device 304 is comprised of the combination of the remote server computer and the associated databases.

The data storage device 304 may store a server program 306 for controlling the processor 302. The processor 302 performs instructions of the server program 306, and thereby operates in accordance with the present invention, and particularly in accordance with the methods described in detail herein. The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The server program 306 may be stored in a compressed, uncompiled and/or encrypted format. The server program 306 furthermore may include program elements that may be generally useful, such as an operating system, a database management system and device drivers for allowing the processor 302 to interface with computer peripheral devices. Appropriate general purpose program elements are known to those skilled in the art, and need not be described in detail herein.

Further, the server program 306 is operative to execute a number of invention-specific, objects, modules and/or subroutines which may include (but are not limited to) one or more routines to identify a player at a game machine 104; one or more routines to retrieve messages from databases; one or more routines to receive information about a user; one or more routines to retrieve historical data regarding a player; one or more routines to send messages to a game machine 104; one or more routines to send signals to a game machine 104 to adjust a parameter; one or more routines for receiving information from a game machine 104; one or more routines to store player performance information; one or more routines to store player preference information; one or more routines to facilitate and control communications between game machines 104 and/or third-party servers; one or more routines to restore a game machine 104 to using its default parameter values; and/or one or more routines to control databases or software objects that track information regarding users, casinos, merchants supplying prizes, other third-parties, gambling results, game machines 104 and awarding prizes. Examples of some of these routines and their operation are described below in conjunction with the flowchart depicted in FIG. 17.

In addition to the server program 306, the data storage device 304 is operative to store any number of databases useful to execute the processes of the present invention. The particular embodiment depicted in FIG. 3 includes thirteen examples of databases including a player database 308; several types of message databases 310, 312, 314, 316, 318, 320; a trigger condition database 322; a message representation database 324; a message formatting database 326; a message queue database 328; a suppression condition database 330; and a message history database 332. The purpose and function of each of these databases are described in detail below with respect to FIGS. 4 through 16.

According to some embodiments of the present invention, the instructions of the server program 306 may be read into a main memory of the processor 302 from another computer-readable medium, such from a ROM to a RAM. Execution of sequences of the instructions in the server program 306 causes processor 302 to perform the process steps described herein. In alternative embodiments, hardwired circuitry or integrated circuits may be used in place of, or in combination with, software instructions for implementation of the processes of the present invention. Thus, embodiments of the present invention are not limited to any specific combination of hardware, firmware, and/or software.

Turning back to FIG. 2, a block diagram depicting an example game machine 104 may include a processor 202 coupled to a data storage device 204, a sensor 216, a random number generator 218, a communications port 220, an input device 222, an output device 224, a hopper controller 226A coupled to a hopper 226B, a clock (not pictured), a video controller 226C coupled to a touch screen 226D, a coin acceptor controller 226E coupled to a coin acceptor 226F, a bill acceptor controller 226G coupled to a bill acceptor 226H, a reel controller 228 coupled to reels 228A, 228B, 228C, RAM 230, ROM 232 and/or a player tracking card reader (not pictured).

A game machine may include a payment system 226A-H that performs two main functions: accepting payment from a player (e.g., a wager) and providing payment to a player (e.g., a payout). It should be noted that payment is not limited to money but may also include other types of consideration, including products, services, and alternate currencies (e.g., casino chips). Exemplary methods of accepting payment from a player include: receiving hard currency (i.e., coins or bills) via a coin or bill acceptor 226F, 226H; receiving an alternate currency (e.g., a paper cashless gaming voucher, a coupon, a casino token); receiving a payment identifier (e.g., a credit card number, a debit card number, a player tracking card number) and then debiting the account identified by the payment identifier accordingly; and/or determining/verifying that a player has performed a value-added activity (e.g. in fulfillment of a “activity-benefit offer” based agreement). Exemplary methods of providing payment to a player include: dispensing hard currency (i.e., coins or bills) via e.g., a hopper 226B; dispensing an alternate currency (e.g., a paper cashless gaming voucher, a coupon, a casino token); crediting a player account (e.g., a bank account or other financial account) identified by a payment identifier (e.g., a credit card number, a debit card number, a player tracking card number); and/or providing a product or service to the player (e.g., a jackpot may be a new car).

Note that while using the present invention, a player may operate multiple game machines 104. Examples include: a player may simultaneously play two side-by-side game machines; a player may play a slot machine and then continue his gambling session at a video poker machine; and a player may use a telephone or other device to remotely operate two or more game machines.

In some embodiments, a game machine 104 may allow a player to play a game of skill rather than a game of chance. Examples of games of skill include skill cranes, skee-ball, pinball, and some video games. Such an embodiment may be more appealing to certain players or may be permitted in areas where it is illegal to gamble on games of chance.

The data storage device 204 may store a game machine program (not pictured) for controlling the processor 202. The processor 202 performs instructions of the game machine program, and thereby operates in accordance with the present invention, and particularly in accordance with the methods described in detail herein. As with the casino server program 306 described above, the game machine program may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The game machine program may be stored in a compressed, uncompiled and/or encrypted format. The game machine program furthermore may include program elements that may be generally useful, such as an operating system, a database management system and device drivers for allowing the processor 202 to interface with computer peripheral devices. As stated above, appropriate general purpose program elements are known to those skilled in the art, and need not be described in detail herein.

Further, as with the server program 306 described above, the game machine program may be operative to execute a number of invention-specific, objects, modules and/or subroutines which may include (but are not limited to) one or more routines to identify a player at the game machine 104; one or more routines to output messages; one or more routines to receive information about a user; one or more routines to implement rules regarding adjusting parameters; one or more routines to adjust parameters; one or more routines to receive messages from a controller 102; one or more routines to receive signals from a controller 102 to adjust parameters; one or more routines to send information to a controller 102; one or more routines to store player performance information; one or more routines to store player preference information; one or more routines to facilitate and control communications between the game machine 104 and/or third-party servers; one or more routines to restore the game machine 104 to using its default parameter values; and/or one or more routines to control databases or software objects that track information regarding users, casinos, merchants supplying prizes, other third-parties, gambling results, other gaming devices, and awarding prizes. Examples of some of these routines and their operation are described below in conjunction with the flowchart depicted in FIG. 17.

As with the server program 306, according to some embodiments of the present invention, the instructions of the game machine program may be read into a main memory of the processor 202 from another computer-readable medium, such from a ROM 232 to a RAM 230. Execution of sequences of the instructions in the game machine program causes processor 202 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. In addition to the game machine program, the storage device 204 may also be operative to store databases.

Although the databases are depicted as residing on the controller 102 in the example embodiment of FIG. 3, it should be understood that these databases could just as easily be implemented on the game machine 104. Likewise, a game machine 104 may store a redundant copy of the controller’s databases to protect against data loss or for any number of other reasons. In embodiments in which, for example, the controller 102 serves/controls multiple casinos operated by different entities, a casino may wish to have a local copy of the portions of the databases that include entries related to that casino and exclude other casinos’ access to that casino’s information. Thus, in some embodiments of a game machine 104 according to the present invention there may be included local copies of some portions of the databases. Such a redundant configuration may provide enhanced system performance by reducing network communications. A game machine program may include one or more routines to respond to requests from other gaming devices for player data, message data, trigger condition data, representation data, formatting data, queue data, suppression condition data, and message history data. Such a distributed configuration may provide enhanced system security by allowing different casinos to store and maintain their own databases. In some embodiments, local versions of the databases are not stored on the game machines 104 at all and instead, the game machine program accesses casino server databases which are stored and maintained exclusively on the controller 102. Likewise, in some embodiments, the databases may only exist on a third-party server and thus, both the controller 102 and the game machines 104 may access a third-party server for the data.

D. DATABASES

As will be understood by those skilled in the art, the schematic illustrations and accompanying descriptions of the sample databases presented herein are exemplary arrangements for stored representations of information. Any number of other arrangements may be employed besides those suggested by the tables shown. For example, even though thirteen separate databases are illustrated, the invention could be practiced effectively using one, two, twenty, thirty, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIG. 17.

As indicated above, it should be noted that although the example embodiment depicted in FIG. 3 includes thirteen particular databases stored in storage device 304, other database arrangements may be used which would still be in keeping with the spirit and scope of the present invention. In other words, the present invention could be implemented using any number of different database files or data structures, as opposed to the thirteen depicted in FIG. 3. Further, the individual database files could be stored on different devices (e.g., located on different storage devices in different geographic locations, such as on a server or a game machine 104). Likewise, the programs 206, 306 could also be located remotely from the storage devices 204, 304 and/or on another server. As indicated above, the programs 206, 306 may include instructions for retrieving, manipulating, and storing data in the databases as may be useful in performing the methods of the invention as will be further described below.

1. Player Database

Turning to FIG. 4, a tabular representation of an embodiment of a player database 308 according to some embodiments of the present invention is illustrated. This particular tabular representation of a player database 308 includes six sample records or entries which each include information regarding a particular player. In some embodiments of the invention, a player database 308 is used to track information about players including identity, contact information, preferences, performance history, comp points, current activity, and demographics. Those skilled in the art will recognize that such a player database 308 may include any number of entries or additional fields.

The particular tabular representation of a player database 308 depicted in FIG. 4 includes five fields. The fields may include: (i) a player identifier field 400 that may store a representation uniquely identifying the player; (ii) a name field 402 that may store a representation of the player's name; (iii) comp points field 406 that may store a representation of the number of comp points a player has earned; (iv) a current activity field 406 that may store a description of what the player is doing and where he is doing it at the current time; and (v) a notes field 408 that may store further information regarding the player.

The example player database 308 depicted in FIG. 4 provides example data to illustrate the meaning of the information stored in this database embodiment. A player identifier 500 (e.g., "PLAYER-1-02834555") may be used to identify and index players listed in the player database 308. In this example, "PLAYER-1-02834555" identifies a player named "Anne Red" as indicated by the player name field 402. According to the database, Anne Red has 1,846 comp points, is operating slot machine #12, enjoys traveling, and has visited Mexico three times in the last year.

As will be described in detail below, a variety of different types of messages are possible, including promotional messages, instructive messages, status messages, communication messages, and activity-benefit offers, hypothetical information messages, and combination messages. Information about messages may be stored in one or more message databases.

Turning to FIG. 5, a tabular representation of an embodiment of a promotional message database 310 according to some embodiments of the present invention is illustrated. This particular tabular representation of a promotional message database 310 includes seven sample records or entries which each include information regarding a promotional message. In some embodiments of the invention, a promotional message database 310 is used to track information about promotional messages including message identity, use, and message content. Those skilled in the art will recognize that such a promotional message database 310 may include any number of entries or additional fields.

The particular tabular representation of a promotional message database 310 depicted in FIG. 5 includes two fields. The fields may include: (i) a promotional message identifier field 500 that may store a representation uniquely identifying the promotional message and (ii) a promotional message field 502 that may store a representation of a description of the message to be output or, in some embodiments, the actual message.

The example promotional message database 310 depicted in FIG. 5 provides example data to illustrate the meaning of the information stored in this database embodiment. A promotional message identifier 500 (e.g., "PROMO-1-85923475") may be used to identify and index promotional messages listed in the promotional message database 310. In this example, "PROMO-1-85923475" identifies a promotional message that reads "Get two steak dinners for the price of one at Alice's restaurant."

Turning to FIG. 6, a tabular representation of an embodiment of an instructive message database 312 according to some embodiments of the present invention is illustrated. This particular tabular representation of an instructive message database 312 includes five sample records or entries which each include information regarding an instructive message. In some embodiments of the invention, an instructive message database 312 is used to track information about instructive messages including message identity, use, and message content. Those skilled in the art will recognize that such an instructive message database 312 may include any number of entries or additional fields.

The particular tabular representation of an instructive message database 312 depicted in FIG. 6 includes two fields. The fields may include: (i) an instructive message identifier field 600 that may store a representation uniquely identifying the instructive message and (ii) an instructive message field 502 that may store a representation of a description of the message to be output or, in some embodiments, the actual message.

The example instructive message database 312 depicted in FIG. 6 provides example data to illustrate the meaning of the information stored in this database embodiment. An instructive message identifier 600 (e.g., "INSTR-1-642985152") may be used to identify and index instructive messages listed in the instructive message database 312. In this example, "INSTR-1-642985152" identifies an instructive message that reads "Press and hold the spin button for ten seconds to activate 'Auto-Play' mode."

Turning to FIG. 7, a tabular representation of an embodiment of a status message database 314 according to some embodiments of the present invention is illustrated. This particular tabular representation of a status message database 314 includes five sample records or entries which each include information regarding a status message. In some embodiments of the invention, a status message database 314 is used to track information about status messages including message identity, use, and message content. Those skilled in the art will recognize that such a status message database 314 may include any number of entries or additional fields.

The particular tabular representation of a status message database 314 depicted in FIG. 7 includes two fields. The fields may include: (i) a status message identifier field 700 that may store a representation uniquely identifying the status message and (ii) a status message field 702 that may store a representation of a description of the message to be output or, in some embodiments, the actual message.

The example status message database 314 depicted in FIG. 7 provides example data to illustrate the meaning of the information stored in this database embodiment. A status message identifier 700 (e.g., "STATUS-1-56189345") may be used to identify and index status messages listed in the status message database 314. In this example, "STATUS-1-56189345" identifies a status message that reads "You currently have X comp points" where X is filled in based on information regarding a targeted player from the player database 308.

Turning to FIG. 8, a tabular representation of an embodiment of a hypothetical information message database 316 according to some embodiments of the present invention is illustrated. This particular tabular representation of an hypothetical information message database 316 includes five sample records or entries which each include information regarding a hypothetical information message. In some embodiments of the invention, a hypothetical information message database 316 is used to track information about hypothetical information messages including message identity, use, and message content. Those skilled in the art will recognize that such a hypothetical information message database 316 may include any number of entries or additional fields.

The particular tabular representation of a hypothetical information message database 316 depicted in FIG. 8 includes two fields. The fields may include: (i) a hypothetical information message identifier field 800 that may store a representation uniquely identifying the hypothetical information message and (ii) a hypothetical information message field 802 that may store a representation of a description of the message to be output or, in some embodiments, the actual message.

The example hypothetical information message database 316 depicted in FIG. 8 provides example data to illustrate the meaning of the information stored in this database embodiment. A hypothetical information message identifier 800 (e.g., "HYP-1-093275126") may be used to identify and index hypothetical information messages listed in the hypothetical information message database 316. In this example, "HYP-1-093275126" identifies a hypothetical information message that reads "If you had only bet 1 coin instead of three coins last spin, you would have only won 10 coins instead of 40."

Turning to FIG. 9, a tabular representation of an embodiment of an activity-benefit offer database 318 according to some embodiments of the present invention is illustrated. This particular tabular representation of an activity-benefit offer database 318 includes nine sample records or entries which each include information regarding an activity-benefit offer. In some embodiments of the invention, an activity-benefit offer database 318 is used to track information about activity-benefit offers including message identity, use, and offer content including activities and benefits. Those skilled in the art will recognize that such an activity-benefit offer database 318 may include any number of entries or additional fields.

The particular tabular representation of an activity-benefit offer database 318 depicted in FIG. 9 includes three fields. The fields may include: (i) an activity-benefit offer identifier field 900 that may store a representation uniquely identifying the activity-benefit offer; (ii) an activity field 902 that may store a representation of a description of the activity to be output as part of the offeror, in some embodiments, the actual offer message or activity portion of the message; and (iii) a benefit field 904 that may store a representation of a description of the benefit to be output as part of the offer or, in some embodiments, the actual offer message or benefit portion of the offer message.

The example activity-benefit offer database 318 depicted in FIG. 9 provides example data to illustrate the meaning of the information stored in this database embodiment. An activity-benefit offer identifier 900 (e.g., "OFF-1-23480923") may be used to identify and index offers listed in the activity-benefit offer database 318. In this example, "OFF-1-23480923" identifies an offer where if the player can "Play at least 20 games on a Rascally Rabbit Slot Machine" he will receive "5 credits" in exchange for doing so.

Turning to FIG. 10, a tabular representation of an embodiment of a combination message database 320 according to some embodiments of the present invention is illustrated. This particular tabular representation of a combination message database 320 includes five sample records or entries which each include information regarding a combination message. In some embodiments of the invention, a combination message database 320 is used to track information about combination messages including message identity, use, and message content. Those skilled in the art will recognize that such an combination message database 320 may include any number of entries or additional fields.

The particular tabular representation of a combination message database 320 depicted in FIG. 10 includes two fields. The fields may include: (i) a combination message identifier field 1000 that may store a representation uniquely identifying the combination message and (ii) a combination message field 1002 that may store a representation of a description of the message to be output or, in some embodiments, the actual message.

The example combination message database 320 depicted in FIG. 10 provides example data to illustrate the meaning of the information stored in this database embodiment. A combination message identifier 1000 (e.g., "COMBO-1-84151451") may be used to identify and index combination messages listed in the combination message database 320. In this example, "COMBO-1-84151451" identifies a combination message that reads "The only way to win the maximum jackpot is by betting three coins per spin. Would you like to increase your bet size to 3 coins per spin?"

Turning to FIGS. 11A and 11B, tabular representations of an embodiment of trigger condition databases 322A, 322B according to some embodiments of the present invention are illustrated. These particular tabular representations of trigger condition databases 322A, 322B includes seven and six sample records or entries respectively, which each include information regarding a particular trigger condition. Each of the two databases 322A, 322B depicted represents a different set of trigger conditions. Note that a given set of trigger conditions (e.g., 322A) may be active only certain times, for certain players, and/or for certain messages. In some embodiments of the invention, a trigger condition database 322 is used to track information about triggers including conditions and messages to output. A trigger condition database 322 may be useful in determining when to output a message to a player. Those skilled in the art will recognize that such a trigger condition database 322 may include any number of entries or additional fields.

The particular tabular representation of a trigger condition database 322A depicted in FIG. 11A includes seven fields. The particular tabular representation of a trigger condition database 322B depicted in FIG. 11B includes six fields. The fields may include: (i) a trigger condition for outputting messages field 1100A, 1100B that may store a representation of an indication of the trigger condition (e.g., a Boolean expression) and (ii) a message(s) to output field 1102A, 1102B that may store a representation of an indication of what message(s) to output when the trigger condition occurs.

The example trigger condition databases 322A, 322B depicted in FIGS. 11A and 11B provide example data to illustrate the meaning of the information stored in these database embodiments. In the first example record of database 322A, the next message waiting in the queue (e.g. message queue database 328A of FIG. 14A) is output when the player reaches the end of a game and the priority of the next message in the queue is greater than or equal to "300."

Turning to FIG. 12, a tabular representation of an embodiment of a message representation database 324 according to some embodiments of the present invention is illustrated. This particular tabular representation of a message representation database 324 includes six sample records or entries which each include information regarding a particular message representation. In some embodiments of the invention, a message representation database 324 is used to track information about message representations including message identity and the different types of representations available for the message. Those skilled in the art will recognize that such a message representation database 324 may include any number of entries or additional fields.

The particular tabular representation of a message representation database 324 depicted in FIG. 12 includes five fields. The fields may include: (i) a message identifier field 1200 that may store a representation uniquely identifying the message with which the representation data is associated; (ii) a text representation field 1202 that may store a representation of an indication of whether a text representation of the message is available; (iii) a Spanish text representation field 1206 that may store a representation of an indication of whether a Spanish text representation of the message is available; (iv) an audio representation field 1206 that may store a representation of an indication of whether an audio representation of the message is available; and (v) a Spanish audio representation field 1208 that may store a representation of an indication of whether a Spanish audio representation of the message is available. In some embodiments, additional fields such as a video representation field or a picture-in-picture representation field might be included.

Turning to FIG. 13, a tabular representation of an embodiment of a message formatting database 326 according to some embodiments of the present invention is illustrated. This particular tabular representation of a message formatting database 326 includes six sample records or entries which each include information regarding a particular message formatting for a given player. In some embodiments of the invention, message formatting database 326 may be useful in generating a representation of a message to output to a player. Those skilled in the art will recognize that such a message formatting database 326 may include any number of entries or additional fields.

The particular tabular representation of a message formatting database 326 depicted in FIG. 13 includes five fields. The fields may include: (i) a player identifier field that may store a representation uniquely identifying the player; (ii) a message category field 1300 that may store a representation of the message category; (iii) a type of partition or window field 1302 that may store a representation of the type of partition or window to be used when the message is output; (iv) a color of message border field 1304 that may store a description of the color of the message border; (v) a message title field 1308 that may store a representation of a message title to be displayed; and (vi) a sound upon output field 1310 that may store a representation of a sound to be played when the message is output. This version of a message formatting database 326 shows how messages may be formatted according to their categories. For example, all messages about features may be formatted the same way. As shown, according to some embodiments, the controller 102 may store a different message formatting database 326 for each player.

Turning to FIGS. 14A and 14B, a tabular representation of an embodiment of a message queue database 328 according to some embodiments of the present invention is illustrated. These particular tabular representations include three and four sample records or entries respectively, which each include information regarding a particular message. A message queue database 328 may be useful in controlling the order that messages are output to a player. Those skilled in the art will recognize that such a message queue database 328 may include any number of entries or additional fields.

A message queue database 328 stores an ordered list of messages that may be output to a player at a game machine. As shown in these figures, the order of the list may be dependent on the priorities of the messages, which may be determined using a point system. For each message in the queue, the message queue database 328 may store an indication of the position in the queue 1400A, an indication of the message 1402A (e.g., a message identifier), and an indication of a point value for the message 1404A. Note that FIG. 14B shows how a higher priority message (e.g. "HYP-3-093275126") may be inserted into the queue while FIG. 14A shows the database before this message was inserted.

Turning to FIG. 15, a tabular representation of an embodiment of a suppression condition database 330 according to some embodiments of the present invention is illustrated. This particular tabular representation of a suppression condition database 330 includes eight sample records or entries which each include information regarding a particular suppression condition. In some embodiments of the invention, a suppression condition database 330 is used to determine when to suppress a message that would have been output to a player. Those skilled in the art will recognize that such a database may include any number of entries or additional fields. For each suppression condition, this version of the suppression condition database 330 stores an indication of the suppression condition 1500 (e.g., a Boolean expression); a result of suppression 1502 (e.g., delay the message, cancel the message, put the message in the queue); and a trigger condition for delayed output 1504 (if applicable).

Turning to FIG. 16, a tabular representation of an embodiment of a message history database 332 according to some embodiments of the present invention is illustrated. This particular tabular representation includes seven sample records or entries which each include information regarding a particular message. In some embodiments of the invention, a message history database 332 is used to track information about messages that have already been output to one or more players. Those skilled in the art will recognize that such a database may include any number of entries or additional fields. For each message that has been output, this database stores what message was output 1600 (e.g., a message identifier); what player received the message 1602 (e.g., a player identifier); the time when the message was output 1604; and the player's response to the message 1606 (if any).

The use of each of these databases is described in more detail below with respect to the methods of the present invention.

E. PROCESS DESCRIPTIONS

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the present invention's methods. The system described above is an example of a system that would be useful in practicing the invention's methods. For example, the status message database 314 described above with respect to FIG. 7 is useful for storing status messages, but it is not absolutely necessary to have such a database in order to perform the methods of the invention. In other words, the methods described below may be practiced using, for example, a game machine program that is able to create messages as needed without having to access a database.

Figure 17:
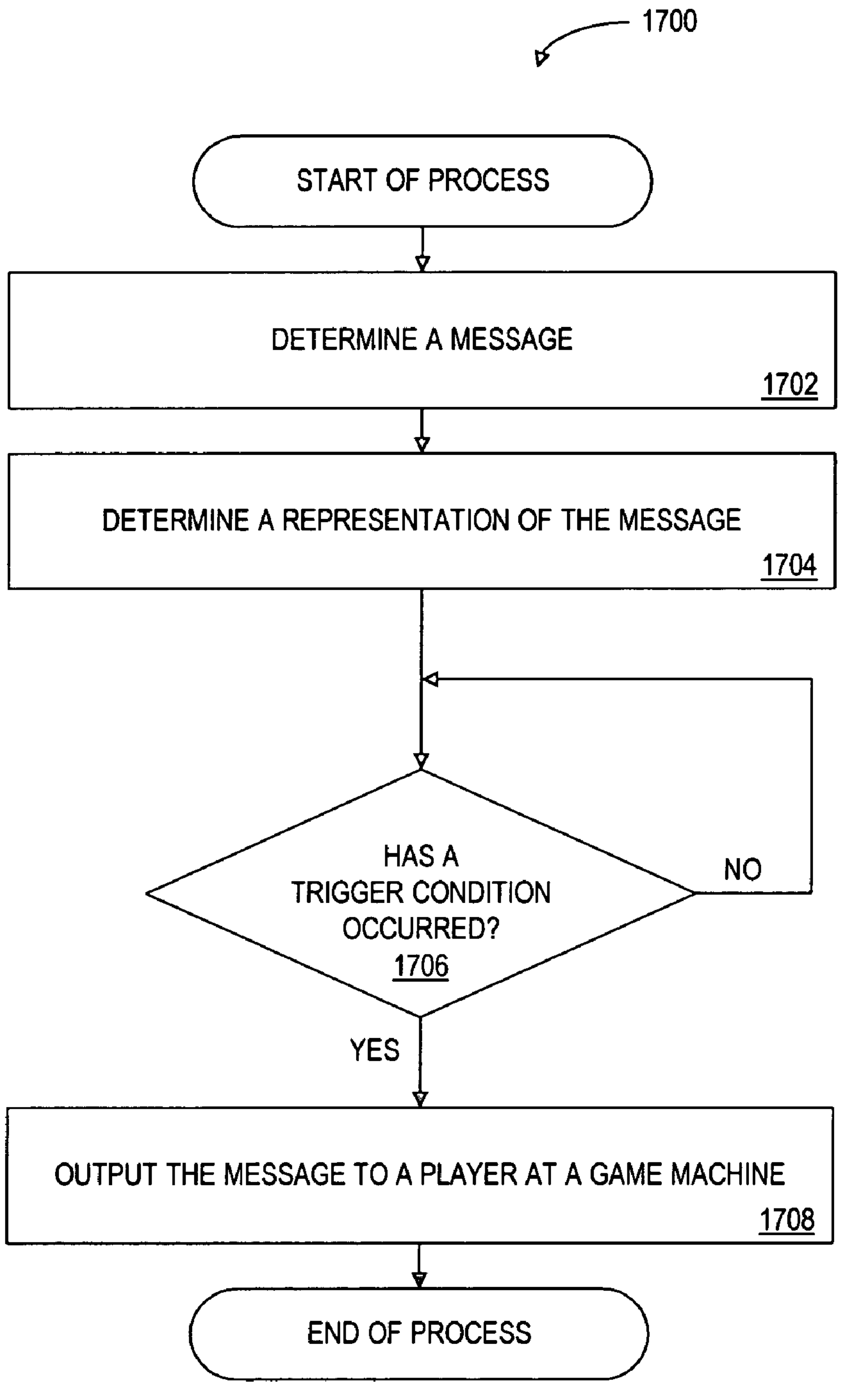
FIG. 17 is a flow diagram illustrating an exemplary process for outputting a message at a gaming machine according to and for use in some embodiments of the present invention.

Referring to FIG. 17, a flowchart is depicted that represent some embodiments of the present invention that may be performed by the controller 102, a game machine 104, and/or the casino. It must be understood that the particular arrangement of elements in the flowchart of FIG. 17, as well as the number and order of example steps of various methods discussed herein, is not meant to imply a fixed order, sequence, quantity, and/or timing to the steps; embodiments of the present invention can be practiced in any order, sequence, and/or timing that is practicable. Likewise, the labels used to reference the individual steps of the methods are not meant to imply a fixed order, sequence, quantity, and/or timing to the steps. In other words, for example, Step 1704 may be followed by Step 1702 in some situations and Step 1706 in others.

In general terms and referring to FIG. 17, method steps of an embodiment of the present invention may be summarized as follows. In Step 1702, a message is determined. In Step 1704, a representation of the message is determined. In Step 1706, the system 100 waits for a trigger condition to occur. In Step 1708, the message is output to a player at a game machine.

In the subsections that follow, each of these steps will now be discussed in greater detail. Note that not all of these steps are required to perform the methods of the present invention and that additional and/or alternative steps are also discussed below. Also note that the above general steps represent features of only some of the embodiments of the present invention and that they may be combined and/or subdivided in any number of different ways so that methods of the present invention include more or fewer actual steps. For example, in some embodiments many additional steps may be added to update and maintain the databases described above, but as indicated, it is not necessary to use the above described databases in all embodiments of the invention. In other words, the methods of the present invention may contain any number of steps that are practicable to implement the several different inventive processes described herein.

(1) Determine A Message

In Step 1702, a message is determined from among a variety of different types of messages. Examples of some message types include: (A) status messages, (B) instructive messages, (C) communication messages, (D) hypothetical information about past game play messages, (E) promotional messages, (F) activity-benefit offers, and (G) combination messages. Many other types of messages are possible. Each of the listed message types is described in detail below. Note that a message may be any information that may be output to a player using an output device on a game machine. Messages may be output in a variety of different forms, including text, audio, video, and images.

(A) Status Messages

A status message may be a message that informs a player of a condition or event that occurs. Different types of status messages include:

- (i) gaming-related messages
- (ii) messages about complimentaries (i.e., "comps")
- (iii) messages about enabled features on a game machine
- (iv) messages relating to a player's visit to a casino
- (v) reminders and alerts based on a player's digital calendar
- (vi) news alerts
- (vii) messages about other parties
- (viii) messages about processes in progress
- (ix) messages about waiting in line
- (x) messages about activities that a player may perform Examples of gaming-related messages include:

- (i) messages relating to events on the game machine (e.g., "You just won 100 coins!")
- (ii) messages relating to conditions of the game machine (e.g., "You only have 10 credits left.")
- (iii) messages relating to prizes (e.g., "The progressive jackpot is now up to $142,234")
- (iv) gaming statistics (e.g., "This slot machine has paid out over $13,345 in the last 24 hours.")
- (v) messages relating to other games, including games not played on the game machine. For example, a series of status messages may inform a player of numbers that are picked during a keno game.
- (vi) messages relating to games that a player is not playing. For example, a player who is operating a video poker machine may receive a message that informs him that 4 out of 5 seats are occupied at the progressive jackpot bank of slot machines behind him.
- (vii) offers to place bets (e.g., proposition bets). For example, a player may receive a message from another player asking him whether he'd like to bet $10 on whether Barry Bonds will hit a home run on his next at bat.

Examples of messages about comps include:

(i) "You currently have 2234 comp points."

(ii). "You have enough comp points to purchase a hotel room for the night."

(iii) "You just earned 10 comp points because your friend Bob signed up for a player tracking card."

Examples of messages about enabled features include:

(i) "Auto-Play Mode is engaged. Press any button to stop Auto-Play Mode."

(ii) "Your contract for Double Payouts will expire in 15 minutes."

(iii) "Balance Bonus is enabled. You earn 1 coin for every 15 minutes that you keep your credit balance above 100 coins."

(iv) "Auto-Play Mode has been cancelled."

Examples of messages relating to a player's visit to a casino include:

(i) "Your hotel room has been cleaned."

(ii) "Your table for two at the Blue Moon restaurant is ready."

(iii) "Your hotel room phone has one message. Press here to play the message."

(iv) "Checkout time for the hotel is 11:00 am. It is currently 10:03 am."

(v) "Your plane flight to Cleveland, Ohio leaves in 3 hours."

The controller 102 may store a digital calendar for a player. This digital calendar may be used to track information about a player's activities at a casino (including planned activities). Status messages may be output to a player based on his calendar. Examples include:

(i) "Your plane flight to Cleveland, Ohio leaves in 3 hours."

(ii) "You have a dinner reservation for 9 pm at the Blue Moon restaurant. It is currently 8:45 pm."

Examples of news alerts include:

(i) sports scores and events (e.g., "The US now leads Mexico 2-0 in World Cup soccer." or "Jerome Bettis just scored a touchdown for the Pittsburgh Steelers, bringing his total to 3 this year. This puts you in 3rd place in your fantasy football league.")

(ii) updates about current events (e.g., "Wildfire in Arizona continues to spread.")

(iii) gaming-related news (e.g., "John Smith just won $100,000 on a Rascally Rabbit video poker machine.")

(iv) weather predictions (e.g., It's going to be cool and windy tonight, with temperatures dropping into the mid-50's.")

Examples of messages about other parties (e.g., other players, friends of a player, family members of a player) include:

(i) "Your friend Bob just won 100 coins."

(ii) "Last hour, a player won 1000 coins at this game machine."

(iii) "Your friend Bob just started gaming on game machine #423 in the green room."

(iv) "Would you like to see a video (in picture-in-picture) of your friend Alice's bonus round?"

(v) "Press the yes button if you would like to see you husband (in a live full-motion video teleconference)"

The controller may store a "buddy list" (not shown) of other parties who are associated with a player. This buddy list may be useful in determining messages about other parties.

Examples of messages relating to processes in progress include:

(i) "Your purchase is pending."

(ii) "Your credit card application is being reviewed. Please wait . . . "

Examples of messages relating to a player waiting in line include:

(i) "You are 5th in line to play the Wheel of Riches game machine."

(ii) "There are only 3 people ahead of you in line for the breakfast buffet at Alice's Restaurant. Your name will likely be called within the next 5 minutes."

(iii) "You are 6th in line to receive tickets for the 'Broadway Bandits' musical."

Note that allowing a player to wait in line while he is operating a game machine may be particularly helpful to players. Players will no longer have to halt their gaming activities in order to wait in line, and may therefore enjoy their casino visit by spending more of their time gaming and less time standing around waiting in line.

Examples of messages about activities that a player may perform include:

(i) "You only need to play 68 more games to earn a your free dinner at Alice's restaurant."

(ii) "You have only 10 more minutes to earn double comp points." (e.g., in an example in which players only earn double comp points for a limited amount of time)

The controller may store status messages in a status message database 314, such as the one shown in FIG. 7.

(B) Instructive Messages

An instructive message may be a message that provides instructive information relating to a game machine. Examples of instructive messages include:

(i) instructions for operating a game machine (ii) descriptions of the rules of a game (iii) game strategies and tips for game play (iv) descriptions of features or options in a game (v) demonstrations (vi) hypothetical information about past game play Examples of instructions for operating a game machine include:

(i) "To select an item on the touch screen, touch it lightly with your finger."

(ii) "Press the 'spin' button to place your bet and see whether you win."

(iii) "Press the 'Cash out' button to end your gaming session and receive all the money in your credit balance."

(iv) "Press and hold the 'spin' button for 10 seconds to activate Auto-Play Mode."

(v) "To guess where the rascally rabbit is, use your finger to touch a rabbit hole on the touch screen."

Examples of game strategies and tips for game play include:

(i) "If you bet 3 coins per spin, then you get to use an improved payout table that increases the maximum jackpot value."

(ii) "The only way to win the maximum jackpot is by betting 3 coins per spin."

(iii) strategies for playing a bonus round on a game machine. For example, "If you build up a big stash of money, consider ending your bonus round. If you spin the wheel again, you might land on a Thief who will steal all your money."

(iv) descriptions of which outcomes are most favorable or least favorable to a player, even if these outcomes are determined by chance. For example, a tip for a bonus round might be, "To make the most money, you want to hatch all the chickens and then find the golden egg. This way, you get 10 coins for each chicken and 300 coins for the golden egg. If you crack open the golden egg first, you only get the 300 coins for the golden egg."

(v) "Plums are less common than cherries, so getting a plum-plum-plum outcome pays you more money."

(vi) recommending that a player activate or deactivate a feature on the game machine (vii) recommending that a player change a pattern of game play (e.g., "Don't discard your aces.")

Examples of descriptions of the rules of a game include:

(i) "A poker hand consists of 5 cards. The Ace is considered the highest card, followed by Kings, Queens, Jacks, etc. The lowest card is a two. The object of the game is to get the best hand possible. You wager a certain number of coins/credits, usually between 1 and 5. The machine then deals you five cards. You can keep or discard as many cards as you like. To keep a card, click the "hold" button underneath or on the card. Click on deal/draw to replace the cards you choose not to keep. The cards not being held are replaced with new cards. If your new set of cards contains a winning hand, you get paid."

(ii) "If you crack open an egg with an alligator in it, the bonus round ends."

(iii) "Your bonus round is over. At the end of the bonus round, you get 10 coins for each chicken that you hatched."

(iv) "If you line up 3 car icons while the green light is on, you win a new car!"

(v) "You're only allowed one guess as to where the rascally rabbit is."

(vi) explaining why a payout occurred or did not occur for given outcome. For example, an outcome on a 5 reel video slot machine may be "bar, cherry, lemon, lemon, lemon". Some players may be confused as to why this outcome does not provide a payout, so the video slot machine may output a message to the player, "A payout is only provided if you match 3 symbols using reels #1, 2, and 3. No payout is provided if you match 3 symbols on reels #3, 4, and 5."

Examples of demonstrations include:

(i) A video screen on a game machine may display a video of a player operating the game machine or a cartoon of an animated character operating the game machine.

(ii) A player may be prompted to provide a series of inputs to a game machine in an interactive demonstration (iii) A player may take a virtual tour of a game machine. See U.S. application Ser. No. 10/414,511 entitled "Method and Apparatus for Bonus Round Play" (which is incorporated herein by reference) for a description of an example method of introducing a player to a bonus round on a game machine.

Examples of descriptions of features or options in a game include:

(i) "3D Graphics Mode takes your gaming to a whole new level. With 3D Graphics Mode, the two-dimensional images that you see right now on your game machine are transformed into life-like three-dimensional images. They really jump out at you and make the game more exciting!"

(ii) "Speed-play Mode is great for players who don't like sitting around waiting for the reels on their slot machine to stop spinning. In speed-play mode, the reels on your slot machine spin faster, but for only half the time that they spin in normal mode. This means that you don't have to wait as long between spins and can increase your chances of winning a jackpot by placing bets more quickly. Speed-play mode is appropriate for intermediate and expert-level slot machine players."

(iii) "Auto-Play Mode lets you gamble without pressing lots of buttons. When you activate auto-play mode on a game machine, the game machine will place bets and generate outcomes for you automatically—you don't have to do a thing. The game machine will continue placing bets automatically until you win a jackpot, your credit balance falls below 10 coins, or you press any key on the game machine to signal it to stop."

A wide variety of features are possible on a game machine 104. Some instructive messages (e.g., descriptions of features on game machines) may also help to promote a product or service to a player. Therefore these messages may be both instructional messages and promotional messages.

The controller 102 may store instructive messages in an instructive message database 312, such as the one shown in FIG. 6.

(C) Communication Messages

A player may also receive a communication message at a game machine 104. A communication message may be any message generated by a person that is intended for a player. Examples include:

(i) A player at a casino in Las Vegas may receive an instant message from a friend who is logged onto the Internet in Miami, Fla.

(ii) A first player at a casino may receive a voice message (e.g., a telephone call) from a second player who is operating a game machine in another area of the casino.

(iii) A video phone on a game machine may display a video of a casino representative alerting a player that his bags have been packed for checkout of the hotel.

See U.S. application Ser. No. 10/655,969 entitled "Method and Apparatus for Player Communication" (which is incorporated herein by reference) for descriptions of various example methods of enabling a player to communicate with a casino representative.

Messages may be output in a variety of different forms, including text, audio, video, and images. Various parties may send communication messages to a player, including, for example:

(i) other players—For example, players at a casino may use telephones on game machines to speak with each other or send a video of a big win to another player via the game machine.

(ii) non-players (e.g., friends and family members)—For example, a friend of a player may log onto the Internet and send a player an instant message or email. The player may receive this instant message or email at his game machine.

(iii) casino employees—For example, a casino employee may instruct a player on how to operate a game machine, or enable a player to purchase products or services (e.g., show tickets) through the game machine.

(D) Hypothetical Information Based on Past Game Play Messages

In some embodiments, a type of message that describes "hypothetical information based on past game play" may be used to re-characterize past game play based on an altered parameter or variable. Examples of this type of message include:

(i) "If you didn't have Gambling Loss Insurance, you would have lost 500 coins in the last hour."

(ii) "If you had been using Betting the Don't Mode, you would have won your last 5 games."

(iii) "Congratulations, you won a 200 coin jackpot! Without your Double Jackpot Wild Card, this jackpot would have only been 100 coins."

(iv) "If you had been playing in Speed Play Mode, you could have won this jackpot in 45 minutes instead of 1.5 hours."

(v) "If you had only bet 1 coin instead of 3 coins last spin, you would have only won 100 coins instead of 400."

In order to generate such messages, the controller 102 may perform the following steps, which are described in detail below:

(a) tracking information about game play using at least one game machine.

(b) identifying at least one parameter of the game play.

(c) determining a hypothetical result or other information about game play that would have occurred if the at least one parameter were altered.

(d) generating a message describing the hypothetical result or other information.

The controller may store a hypothetical information message database 316 such as the one shown in FIG. 8.

(a) Tracking Game Play

Information about past game play may be stored by the controller 102 in a game tracking database (not shown). This information may in turn be useful for generating hypothetical information about past game play. Examples of information that may be stored in a game tracking database include:

(i) inputs to games (e.g., bet size, pay line selection, spin button pressed)

(ii) times of games (e.g., time that a bet was placed, time that a game started, times of rounds of a game, time that a game ended, time that a payout was provided, durations of various events)

(iii) payout tables for games (e.g., 10 coins for "cherry-cherry-cherry", 20 coins for "cherry-cherry-bar")

(iv) values of parameters of game play (see details below)

(v) which player plays a game (vi) which game machine a game is played on (vii) what game is played (viii) random numbers generated by a game machine (e.g., to determine results of a game)

(ix) outcomes of games (e.g., "full house" in video poker, "cherry-cherry-bar" on a slot machine, "19" in video blackjack)

(x) probabilities of outcomes (xi) payouts provided based out outcomes (e.g., 20 coins, $5, free spin)

As used herein, the term "game play" is used to refer to at least one game played on at least one game machine. Note that:

(i) Game play may refer to a single game or a plurality of games.

(ii) Game play may refer to games played by a single player or a plurality of players.

(iii) Game play may refer to games played at a single game machine or a plurality of game machines.

Note that a wide variety of parameters may affect game play on a game machine, including inputs by a player, variables in a computer program that controls a game machine, and random numbers generated by a random number generator. The controller may track the values of any or all of these parameters in the game tracking database.

(b) Identifying a Parameter of Game Play

In order to generate hypothetical information about game play, the controller may identify at least one parameter of game play. Various parameters may affect game play on a game machine, including:

(i) inputs provided by a player (e.g., bet size, pay line selection, feature selection, etc.)

(ii) features or options that are enabled during a game (iii) features or options that are disabled during a game (iv) parameters that may be altered by a player (v) random numbers generated by a game machine or the controller (vi) variables in a computer program that controls the game machine In some embodiments, one property of a parameter is that a parameter affects game play in some way. Examples of how parameters affect game play include:

(i) The size of a bet placed by a player (i.e., a parameter) may affect the value of a payout provided to the player.

(ii) A player may activate Speed-Play Mode on a game machine. This may decrease the amount of time that it takes to play a game.

(iii) A player may activate "Bet the Don't" Mode on a game machine. This may alter the payout table of the game machine.

(iv) A player may activate "Win or Whammy" Mode on a game machine. This may alter the payout table of the game machine and the way that bets are placed on the game machine.

(v) A player may select a pay line on a slot machine. This may affect an outcome on the slot machine.

(vi) A random number generated by a game machine may affect what outcome occurs on the game machine and thereby affect what payout is provided to a player (if any).

A parameter may be controllable by a player. Examples of players controlling the values of parameters include:

(i) A player may indicate the size of bet that he would like to place.

(ii) A player may activate a feature on a game machine.

(iii) A player may deactivate a feature on a game machine.

(c) Determining Hypothetical Information

One way for the controller to generate hypothetical information about past game play is to determine an alternate result of past game play that would have occurred if a parameter had a different value. For example, the game tracking database may show that a player won a payout of 100 coins for betting 1 coin and obtaining an outcome of "bar-bar-bar" on a slot machine. The controller may in turn determine that if the player had bet 3 coins on that spin (i.e., the bet size parameter was 3 instead of 1), the player would have won 400 coins for obtaining the outcome "bar-bar-bar."

The concept of hypothetical information is easily understood in contrast to "actual game play." Actual game play involves receiving a bet from a player, determining an outcome of a game, and providing a payout to a player contingent on the outcome of the game. In contrast, hypothetical information may involve determining the hypothetical values of bets, outcomes, or payouts, but there are no bets being placed and no payouts being provided. Hypothetical information answers the question, "What would have happened if . . . ?" Various different types of hypothetical information are possible, including:

(i) payouts that a player would have won if at least one parameter had a different value (ii) outcomes that would have occurred on a game machine if at least one parameter had a different value (iii) durations of games (iv) intermediate events in games (v) other events or conditions that may occur at a game machine (vi) aggregate information about a plurality of games (e.g., a total amount of money won or lost by a player, an average rate of play)

(vii) projections of potential future payouts

Note that the controller may determine hypothetical information about past game play based on both:

(i) past values of one or more parameters (e.g., including a random number generated by the game machine), and (ii) a new value of at least one parameter. For example, if a feature was enabled during actual play, then hypothetical information may be generated by determining what would have happened if the feature ad been disabled (i.e., the new value of the feature parameter may be "disabled").

The controller may use the same computer program to generate hypothetical information as was used to generate an actual outcome on a game machine. For example, to generate an actual outcome on a game machine, the controller may run a computer program with a first set of parameters. Then, to generate a hypothetical outcome on a game machine, the controller may run the same computer program with an altered set of parameters. For example, to determine the actual result of a game, the controller may run a computer program with the bet size parameter set to "1 coin". The controller may also determine a hypothetical result of the game by running the computer program with the bet size parameter set to "3 coins."

(d) Generate A Message

The controller may then generate a message including the hypothetical information. For example, a player may win a jackpot in just 1 hour when operating a game machine in Speed Play Mode. Based on this game play, the controller may determine that a player would have taken 4 hours to win the jackpot had he instead been operating the game machine in Regular Speed Mode. Based on this determination, the controller may generate a message, "Speed Play Mode saved you 3 hours of time! If you had been operating this game machine in regular mode instead of Speed Play Mode, it would have taken you 4 hours to win this jackpot!"

(E) Promotional Messages

A promotional message may be a message that promotes a product or service to a player. Examples of promotional messages include:

(i) advertisements
(ii) offers to give free products or services to a player
(iii) offers to sell products or services to a player
(iv) activity-benefit offers Examples of advertisements include:

(i) an advertisement for a feature on a game machine. For example, a message may display an image of a game machine operating in 3D Graphics Mode and ask a player if he would like to activate 3D Graphics Mode on his game machine.
(ii) an advertisement for a product or service. For example, a message may be a television commercial about fabric softener. In a second example, a message may be a banner advertisement describing a discount office furniture store.
(iii) an advertisement for a game that a player is currently playing. For example, a message may point out the entertainment value of a game that a player is currently playing: "There are over 100 different rabbit animations. See if you can view them all!" In a second example, a game machine with a bonus round may display a message, "This bonus round is all about pressing your luck. How daring are you? Are you willing to run the risk of having a thief steal your stash?"

Examples of messages that offer free products or services to a player include:

(i) Offers for free trials of products or services. For example, a message may offer a player a free 6-month trial subscription to a magazine (a $12 value).
(ii) Offers for free usage of a feature on a game machine. For example, a message may offer a player 30 free minutes of operating a game machine in double-jackpot mode (a $5 value).

Examples of offers to sell products or services to a player include:

(i) "Buy 2 tank tops from Acme, and get a third one for free"
(ii) "20% off all cellular telephones when you sign up for one year of mobile phone service."

The controller may store promotional messages in a promotional message database 310, such as the one shown in FIG. 5.

(F) Activity-Benefit Offers

An activity-benefit offer generally includes two components:

(i) an activity that should be performed by the player (or obligation to be completed)
(ii) a benefit to be provided to the player contingent on the performance of the activity As used herein, the term "activity-benefit offer" is used for convenience, since activities and benefits are often presented to a player simultaneously in a single message. For easier readability, the word "offer" will occasionally be used to refer to an activity-benefit offer. However, it should be clear to the reader that activity-benefit offers represent one specific type of offer and that a variety of other types of offers and messages are possible.

An activity-benefit offer may be output to a player, and the player may have an opportunity to respond by accepting or rejecting the offer. If the player accepts the offer, then he agrees to perform the activity and receive the benefit specified in the offer.

The controller 102 may store activity-benefit offers in an activity-benefit offer database 318, such as the one shown in FIG. 9.

(a) Activities

In order to earn a benefit, a player may be required to perform an activity. Examples of activities include:

(i) signing up for a new credit card
(ii) answering survey questions about a product or service In many cases, an activity has value to a subsidizer. For example, a credit card issuer may be willing to pay up to $50 to get a customer to sign up for a new credit card, since acquiring this customer will likely result in more than $50 of profits for the credit card issuer. A casino or other party may receive a subsidy from a subsidizer based on an activity-benefit offer.

Basic types of activities include:

(i) purchasing a product or service
(ii) using a product or service
(iii) selling a product or service
(iv) providing a product or service
(v) providing information
(vi) viewing information
(vii) performing an action
(viii) telling a friend about a product or service
(ix) gambling-related activities Note that there are many other types of activities and that some activities do not fit clearly into any one category. The discussion below provides examples of each of these basic types of activities.

Examples of purchasing a product or service:

(i) signing up for a magazine subscription
(ii) buying $20 worth of books from Amazon.com
(iii) signing up for a warranty Examples of using a product or service:

(i) receiving a new credit card
(ii) using a new long distance telephone provider
(iii) printing at least 100 pages per week from an HP laser printer
(iv) receiving 3 free issues of a magazine Examples of providing a product or service:
- (i) providing legal advice, medical advice
- (ii) donating an old television set Examples of selling a product or service:
- (i) selling a used product on eBay
- (ii) providing tax advice at a rate of $10 per hour Examples of providing information:
- (i) answering survey questions
- (ii) providing product ratings and reviews
- (iii) indicating demographic information, purchasing information Examples of viewing information:
- (i) watching a television commercial or other advertisement
- (ii) listening to an audio tape about the health dangers of smoking cigarettes
- (iii) reading a pamphlet that explains how to use a product Examples of performing an action:
- (i) playing a game of chance or a game of skill. Examples of gambling related activities are described in more detail below.
- (ii) applying for a credit card
- (iii) performing a repeated action (e.g. purchasing a product from a retailer at least once a month for the duration of an insurance policy, maintaining a minimum balance on a credit card)
- (iv) performing a customer-segmenting activity (i.e. an activity that allows a seller to segment its customer base). For example, a casino may segment its player base by asking a player to perform an activity over an extended period of time (since some players will not have the time to perform such activities). Note that if a customer-segmenting activity has no value to a subsidizer, then there may not be a subsidizer.
- (v) convincing another party (e.g., another player) to perform one or more activities. For example, a first player may perform an activity of convincing 3 of his friends to sign up for magazine subscriptions.

Examples of gambling-related activities include:
- (i) playing a game for a designated period of time
- (ii) playing a designated number of games (e.g., 200 handle pulls at a slot machine)
- (iii) placing a designated number, (or dollar value) of bets
- (iv) winning a designated number of games
- (v) winning a designated jackpot
- (vi) winning a designated amount of money
- (vii) playing a designated game
- (viii) playing a game at a designated slot machine
- (ix) playing a game in a designated fashion (e.g., always make the maximum bet, always hit with 16 in blackjack)
- (x) signing up for a player tracking card
- (xi) providing gambling-related information (e.g., inserting a player tracking card, answering survey questions)
- (xii) maintaining a credit balance on a game machine (e.g., always at least 100 credits)

In addition, an activity may include an expiration condition. Examples include:
- (i) an activity must be finished by a designated time (e.g., before 6 pm tonight)
- (ii) an activity must be started before a designated event (e.g., before the end of a baseball game)
- (iii) an activity must be performed before a designated occurrence (e.g., before another player wins a jackpot of $100 or more)
- (iv) an activity must be performed before a designated condition is true (e.g., while there are at least 4 players at a particular bank of slot machines)

An activity may include a time-based requirement. Examples include:
- (i) an activity must be finished by a designated time (e.g., before 6 pm tonight)
- (ii) an activity must be started after a designated event (e.g., after eating dinner)
- (iii) an activity must take place during a designated time period (e.g., between 4 am and 8 am)

In addition, there may be restrictions as to how and where an activity is performed. Examples include:
- (i) an activity must be performed while a player is at the casino Note that a player may have to perform multiple activities in order to receive a benefit. For example:
- (i) A player may have to play 100 hands of video blackjack today and eat lunch at the casino buffet tomorrow.
- (ii) A player have to perform a repeated activity (e.g., purchasing a product from a retailer at least once a month for the duration of an insurance policy, maintaining a balance on a credit card)

According to some embodiments, a player's completion of an activity may be based on activities of other players. Examples include:
- (i) a player may perform a competitive activity (i.e., an activity where success is determined relative to at least one other player). For example, a player may have to win a hand of poker or win a slot machine tournament.
- (ii) a player may perform a team activity (i.e., an activity where players work together to accomplish a common goal). For example, all the players at a bank of slot machines may have to work together to increase a progressive jackpot to be greater than $10,000.

According to some embodiments, the player may have to perform one of a plurality of activities. This means that the player may have a choice of what activity to perform. For example, a player may be required to either gamble continuously for the next hour or buy a ticket to a boxing match. If the player performs either activity, then he will receive a benefit.

According to some embodiments, a player may receive help in performing an activity. In this case, one or more other parties may perform an activity in the place of the player. Examples include:
- (i) A player may be required to perform an activity of playing a slot machine continuously for 4 hours. The player may enlist three friends to help him perform this activity—each person plays the slot machine for one hour, and then gives up his seat to the next person.
- (ii) A player may be required to perform an activity of signing up for 3 magazine subscriptions. As it turns out, the player is only interested in receiving two magazines: Scientific American and Soap Opera Digest. Fortunately, the player's friend also wants a subscription to Scientific American. Together, they sign up for 3 magazine subscriptions, and the player receives the benefit.
- (iii) A player may be required to perform an activity of completing a Tae-Bo workout. This player doesn't enjoy Tae-Bo, but his wife does. So the player's wife performs the activity of completing the Tae-Bo workout.

Alternatively, it may not be permissible for a player to receive help in performing an activity.

According to some embodiments, it may be permissible for an activity to have been performed in the past. For example, a player may be asked to perform an activity of placing at least $100 worth of bets at video poker. If the player has already placed $150 worth of bets at video poker, then this may constitute performance of the activity. Note that a player may be asked to provide evidence that he performed an activity in the past (e.g., by inserting his player tracking card or providing a receipt).

According to some embodiments, it may be permissible for a player to make a forward commitment to perform an activity. In some cases, the player completes the activity just by making the agreement (e.g., agreeing to purchase a product or service), and the benefit may be provided to the player almost immediately after making the agreement. According to some embodiments, a forward commitment is an agreement to perform an activity at some point in the future. For example, a player may be required to perform an activity of test-driving a Ford Escort. The player may agree to take the test drive later (e.g., once he returns home from visiting the casino), thereby completing the activity. A benefit may then be provided to the player. Note that forward commitments may include time-based requirements and expiration conditions.

According to some embodiments, a forward commitment may be penalty-secured. This means that a player may be penalized for not completing the activity specified in the forward commitment. For example, a player's credit card may be charged $100 if he does not complete an activity by a specified date. Examples of penalties include:

- (i) monetary penalties that may be charged to a player's credit card, debit card, player account or other financial account. According to some embodiments, a player may be required to provide a payment identifier (e.g., a credit card number) when signing up for a penalty-secured forward commitment.
- (ii) denial of products or services (e.g., the player may not be permitted use of the casino limousine). Penalties that involve denial of products or services may be temporary.
- (iii) the player may be required to perform one or more additional activities
- (iv) other forms of consideration Note that penalty-securing a forward commitment may be necessary to avoid a number of different methods of gaming or taking advantage of the system. For example, if a forward commitment was not penalty secured, then a player may promise to perform an activity, receive a benefit, and then never perform the activity as promised.

(b) Benefits

In exchange for performing an activity a player may receive a benefit. A variety of different benefits are possible, including:

- (i) money (e.g., money or slot machine credits)
- (ii) products (e.g., a souvenir watch, a sweatshirt, a magazine subscription)
- (iii) services (e.g., a free meal, a haircut)
- (iv) discounts on products or services (e.g., 50% off the list price of a hotel room)
- (v) alternate currencies (e.g., comp points, non-convertible casino chips)
- (vi) an entry into a game of chance (e.g., a lottery ticket, a free spin on a slot machine)
- (vii) other consideration Determining a benefit may also include determining the value of the benefit. For example, the controller may determine the value of a benefit based on factors like a player's current credit balance on a game machine, or an amount of money that a player has lost during a period of time. Money may be provided to a player in a variety of different ways, including:

- (i) as a lump sum payment (e.g., through a check)
- (ii) as a recurring payment (e.g., $100 a month for the next 3 months)
- (iii) by crediting a player's financial account (e.g., bank account, credit card account, casino player account)

According to some embodiments, a benefit may be provided using a game machine. Examples include:

- (i) A player may receive a benefit of 50 credits on a slot machine that he is operating.
- (ii) Additional functionality on a game machine may be enabled as a benefit. For example, a player may receive a benefit of being able to bet 5 coins per hand on a video poker machine that usually only lets players bet 3 coins per hand.
- (iii) Odds or payout tables for a game machine may be altered to provide a benefit to a player.
- (iv) A game machine may include a product dispenser that dispenses a product to a player (e.g., a coupon, a gift certificate, tickets to a show or sporting event).
- (v) A hopper on a game machine may dispense coins to a player.

According to some embodiments, a benefit may be provided using a communication device. Examples include:

- (i) A player may use a telephone on a game machine (i.e., a communication device) to make long distance phone calls to his friends and family.
- (ii) A broadcast of a championship boxing match may be transmitted to a closed circuit television that is operated by a player.
- (iii) A communication device may include a product dispenser that dispenses a product to a player (e.g., a coupon, a gift certificate, tickets to a show or sporting event).

According to some embodiments, a benefit may be provided to a party associated with the player (e.g., a friend of the player, a family member, a charity). While providing a benefit to a player's favorite charity may not provide a tangible benefit to the player, the player does receive an intangible benefit (e.g., he may feel altruistic and good-hearted). For this reason, benefits to friends of players may be particularly motivational for a player.

According to some embodiments, a benefit provided to a friend of a player may be contingent on the friend performing one or more activities. For example, a player's friend may be asked to perform an activity in order to receive a benefit. Activities that may be performed by friends are similar to those described above.

(c) Determining Whether an Activity is Performed

According to some embodiments, the controller may determine whether a player has performed an activity designated by an activity-benefit offer. This may be helpful when determining whether to provide a benefit to the player (since this benefit will typically not be provided if a player fails to perform the activity). The method of determining whether an activity is performed is often dependent on the type of activity that a player has been prompted to perform. For example, if a player is prompted to perform an activity of making 100 handle pulls at a slot machine, then the controller may monitor the number of handle pulls that the player has made at the slot machine. Different types of activities that a player may be prompted to perform are described above. Examples of ways that the controller may determine whether an activity has been performed include:

- (i) receiving information from a casino representative (e.g., a casino rep may indicate that a player has filled out an application for a new credit card or agreed to purchase a magazine subscription)
- (ii) receiving information from the player (e.g., when a player performs an activity of making a forward commitment to test drive an automobile)

(iii) receiving information from one or more other computer systems (e.g., if a player is required to perform an activity of signing up for a new credit card, then the controller may receive information from a credit bureau)

(iv) monitoring a player's activities at one or more slot machines (e.g., by communicating with a slot machine through a communication network)

(v) storing data regarding a player's gambling activities (e.g., in the player database 308 shown in FIG. 5)

(vi) receiving information from one or more slot machines (vii) receiving information from one or more point-of-sale terminals (e.g., for activities in which the player is required to purchase a product or service)

(viii) monitoring conditions related to the activity (e.g., monitoring the current time if the activity has an expiration date)

Note that in many cases, the activity to be performed by a player comprises making an agreement or forward commitment (e.g., agreeing to purchase a product or service). In this case, the player may complete the activity just by making the agreement, and have the benefit provided to him almost immediately.

According to some embodiments, a player may use an authentication code to prove that he performed one or more activities. This authentication code may be an alphanumeric code, password, or other information that provides the controller with a reasonable assurance that the player performed one or more activities as required. According to some embodiments, an authentication code is produced using a cryptographic algorithm (e.g., a cryptographic hash function). Typically an authentication code is produced by a device that has the ability to determine whether a player performed an activity. For example, a slot machine may output an authentication code indicating that a player made 100 handle pulls at that slot machine. An authentication code may be output using an output device (e.g. a printer, a video monitor).

According to some embodiments, the controller may have incomplete information as to whether a player performed an activity. For example, a dealer at a casino may be responsible for verifying that a player has gambled at least $300 at blackjack, but the dealer may forget to perform this job. In this case, the controller may resolve this situation in one of a variety of different ways, including:

(i) assume that the player did in fact complete the activity and provide the benefit to the player.

(ii) assume that the player did not complete the activity and not provide the benefit to the player.

(iii) provide a reduced or alternative benefit to the player (iv) offer to allow the player to perform a second activity to earn the benefit.

(v) ask other employees (or even other players) whether the activity was completed.

According to some embodiments, a player may be reminded of an activity-benefit offer while performing an activity. Examples include:

(i) a video screen on a slot machine may display a message to the player telling him how much longer he has to gamble before he earns a benefit.

(ii) an animated character in a video game may remind the player that if he continues to play the game well, he may be able to win a benefit.

(iii) A casino rep may use a communication device to communicate with a player and remind him to perform an activity. Similarly, a casino rep may remind player of a benefit that he may receive for performing the activity, or other terms of an accepted activity-benefit offer.

According to some embodiments, the controller may indicate to the player whether or not he has successfully performed an activity. Examples include:

(i) A slot machine that is being operated by the player may display a text message, "Nice work! You just won a subscription to People magazine."

(ii) A strobe light on top of a video poker machine may flash and an audio speaker may proclaim to a player, "Whoops! You just missed your opportunity to earn 100 comp points."

(iii) A video monitor on a slot machine may display a message, "You're not done yet! If you play 113 more handle pulls at this slot machine, then you'll win a pair of tickets to Wrestlemania."

(iv) The controller may prompt a casino rep to communicate with the player. For example, a casino rep may use a communication device to congratulate a player on performing an activity correctly.

(d) Providing a Benefit to a Player

According to some embodiments, if a player performs an activity specified in an activity-benefit offer, then he may receive a benefit. Possible benefits that may be provided to a player who performs activities are described below.

According to some embodiments, a benefit provided to a player may be determined based on the activity performed. Examples include:

(i) The benefit may be based on what activity is performed. For example, a player may be given a choice of gambling for 3 hours at a slot machine or gambling for 3 hours at a video poker machine. If the player gambles for 3 hours at the slot machine, then he earns tickets to a musical. If the player gambles for 3 hours at a video poker machine, then he earns tickets to a comedy show.

(ii) The benefit may be based on how well an activity is performed. For example, a player may be given the opportunity to earn 5 comp points for every survey question he answers. If the player answers 12 survey questions, then he earns 60 comp points.

Note that a benefit may be provided by a variety of different parties, including:

(i) the controller (e.g., by crediting a player's financial account)

(ii) the casino (e.g., a casino employee may mail a check)

(iii) the casino rep (e.g., the casino rep may give a player 500 credits)

(iv) another party (e.g., a subsidizer, a product manufacturer, a service provider, a fulfillment house)

While the above methods of providing benefits to a player may result from the acceptance by a player of one or more activity-benefit offers, it should also be noted that the casino may provide benefits to players without the requirement that they accept an activity-benefit offer. For example, a premium player on the floor who has been playing for more than two hours may trigger the controller to identify the player and have a casino rep communicate with the player and provide him a comp such as a free dinner or show.

According to some embodiments, a player may not perform the activity specified in an activity-benefit offer. The controller may respond to this occurrence in at least one of a variety of ways, including:

(i) not providing the benefit to the player (ii) providing a reduced or alternative benefit to the player (iii) offering to allow the player to perform a second activity to earn the benefit (iv) not presenting activity-benefit offers to that player in the future According to some embodiments, a player may be penalized if he does not perform an activity specified in an offer. For example, the controller may output an activity-benefit offer to the player in which the player gets $15 if he pulls the handle of a slot machine 100 times. However, if the player accepts this activity-benefit offer and does not spin the slot reel 100 times, then the player will be penalized $15. Similarly, a player's performance of an activity may be penalty-secured. A description of how forward commitments may be penalty-secured is provided above.

(G) Combination Messages

A wide variety of messages are possible, including messages that do not easily fit into one of the categories described above. For example, a message may fall into multiple categories. Examples include:

(i) "You have earned enough comp points for a hotel room. Would you like to cash in your comp points for a hotel room tonight?" Note that this message is both a status message (informing a player that he earned enough comp points for a hotel room) and a promotional message (asking the player if he would like to cash in his comp points).

(ii) "The only way to win the maximum jackpot is by betting 3 coins per spin. Would you like to increase your bet size to 3 coins per spin?" Note that this message is both an instructive message (instructing a player how to win the maximum jackpot) and a promotional message (asking the player whether he would like to bet 3 coins per spin).

(iii) "The only way to win the maximum jackpot is by betting 3 coins per spin. You are currently betting 2 coins per spin. Would you like to increase your bet size to 3 coins per spin?" Note that this message may be considered to fall into three categories: an instructive message (instructing a player how to win the maximum jackpot), a status message (informing the player that he is currently betting 2 coins per spin), and a promotional message (asking the player whether he would like to bet 3 coins per spin).

(iv) "Your plane flight to return home to Cleveland leaves in 3 hours. Would you like to check if you can catch a later flight?" Note that this message is both a status message and a promotional message.

(v) "If you had been playing in Speed Play Mode, you could have won this jackpot in 45 minutes instead of 1.5 hours. Speed Play Mode speeds up the operation of a slot machine (e.g., makes the reels stop spinning more quickly), thereby enabling you to play more games in a shorter period of time." Note that this message is both a hypothetical message about past game play and an instructive message describing how speed play mode works.

(vi) "Your contract for Double Payouts will expire in 5 minutes. If you agree to switch your long distance phone service provider to MCI, then your contract for Double Payouts will be extended for another 15 minutes." Note that this message is both a status message (informing a player that his contract for double payouts is about to expire) and an activity-benefit offer (offering the player a benefit of an extended contract if he switches his long distance phone service provider).

For clarity, messages that fall into multiple categories may be referred to collectively as combination messages. The controller may store a combination message database 320, such as the one shown in FIG. 10.

It is anticipated that players may be more receptive to promotional messages if they are accompanied by status messages, instructive messages, or hypothetical information about past game play (henceforth referred to as "informative messages" for convenience). This is because the informative message may help to show the player why a promotional message is appealing, interesting, or valuable. Promotional messages may be accompanied by informative messages in a variety of different ways, including:

(i) a combination message may be both a promotional message and an informative message (see examples above)

(ii) a promotional message may be output after an informative message is output (iii) a promotional message may be output before an informative message is output (iv) a series of informative messages may be followed by a promotional message (2) Determine A Representation of the Message In Step 1704, a representation of the message may be determined from among a variety of different representations and based upon many different factors. In other words, any given message may be output in a variety of different ways. For example, a message may be output in English or Spanish, in text or audio, or in green or blue. The term "representation" is used to refer to a method of formatting and outputting a message. A message may have one or more representations. For example, a message may have four representations:

(i) a text representation in English (ii) a text representation in Spanish (iii) an audio representation in English (iv) an audio representation in Spanish Outputting a message may include outputting a representation of a message. In addition, the method of the invention thus may include determining a representation for a message.

According to some embodiments, a plurality of representations of a message may be output. Examples include:

(i) For example, a text message, "You get a free spin each time you insert a $10 bill" may be displayed in a pop-up window (a first representation), and an audio recording describing the message may be played (a second representation).

(ii) A message may include a movie with an audio soundtrack that describes the message. In addition, a text version of the message (e.g., closed captioning) may be output along with the movie.

(iii) A message may be output on a plurality of game machines. For example, a text message may be output on both of two game machines that are right next to each other. In a second example, a first half of a message may be output on a first game machine and a second half of a message may be output on a second game machine.

Representations of a message may differ from each other in variety of ways, including:

(i) media format (e.g., text, audio, video)

(ii) language (e.g., English, Spanish, French)

(iii) presenter (e.g., a celebrity, a man with a Texas accent)

(iv) partitions (e.g., pop-up windows, sidebars)

(v) visual cues (e.g., color, font, animation)

(vi) categories (e.g., food messages, help messages, news messages)

(vii) output devices (e.g., CRT screen, LCD screen, audio speaker, on the video reels of a slot machine, on another are of a gaming device).

These variations on representations are described in detail below.

Different representations of a message may be stored in a database, such as the message representation database 324 shown in FIG. 12. Alternatively, or in addition, different representations of a message may be generated by a computer system (e.g., the controller 102, or a game machine 104).

A message may be represented in a variety of different media formats, including:

(i) text—For example, a text message may be displayed on a video screen.

(ii) audio—For example, a 'beep' sound may be output anytime a message is displayed on a video screen. In a second example, a recorded voice may describe a message to a player. According to some embodiments, a message may be output in audio form only and may not have a video component.

(iii) video—For example, a sequence of images (e.g., a movie) may be displayed to a player using a video screen. For example, an activity-benefit offer may be output to a player (iv) binary—For example, an LED on a slot machine may act as a warning light—lighting up to indicate a message to a player and turning off to indicate no message.

(v) icons—Messages may be represented by pictures. For example, a status message indicating that a player's table reservation is ready may be represented by a picture of a plate of food.

A message may be presented in a plurality of ways. For example, a message may include both a text component and an audio component.

A message may have a plurality of representations in different languages. For example, a message may have a first representation in English and a second representation in Spanish. In a second example, a message may have a text representation in English, a text representation in Chinese, an audio representation in English, and an audio representation in Chinese.

It may be particularly useful to have representations of messages for the disabled. Examples include:

(i) for the vision-impaired—For example, a message may be output in Braille or large font text.

(ii) for the hearing-impaired—For example, a video message may have closed-captioning text, or a message may be transmitted to a player's hearing aid using a Bluetooth radio channel. In a second example, a message may include a video of a presenter describing a message in sign language.

Examples of languages for a representation of a message include:

(i) spoken languages (e.g., English, Spanish, French, German, Chinese, Arabic, Hindi)

(ii) written languages (e.g., Braille, Latin)

(iii) computer languages (e.g., HTML, XML, binary)

Representing a message in multiple languages may be particularly helpful for foreign players who are visiting a casino.

A message may have a presenter (e.g., a character that presents the message to a player). Examples of presenters include:

(i) a person speaking in an audio message (ii) a synthesized voice in an audio message (iii) a person in a video message (iv) a plurality of speakers in an audio message (v) an animated character in a video message—For example, an avatar, virtual assistant, or other on-screen character may be displayed to a player in conjunction with a message. For example, an animated rabbit may be displayed on video screen and "talk" to a player, thereby outputting one or more messages. Indications from the rabbit may be provided as both text (e.g., displayed using a speech bubble as a partition), or as audio (e.g., an audio recording may be played, allowing the rabbit to "speak" to the player.)

(vi) A portion of a game may be modified to indicate a message. For example, icons on the reels of a slot machine may be modified to indicate a message. In a second example, a message may be output by changing the design of a deck of cards in video poker.

It is anticipated that players may pay more attention to representations of message that include certain presenters. For example, a player may pay extra attention to a message that is presented by his favorite celebrity.

According to some embodiments, a game machine may include multiple video screens or multiple "windows" represented on a single video screen. The term partition may refer to a video screen or an area of a video screen that is used to display related information. Some common examples of partitions include windows, split-screen displays, sidebars, headers, and footers.

According to some embodiments, a message may be output to using a partition. For example:

(i) A game machine may include a video screen, and a partition of the video screen may be used to output a message to a player.

(ii) A message may be output in a partition on a game machine.

(iii) A partition on a game machine may display a message.

(iv) A partition on a game machine may output a message.

Examples of partitioning include:

(i) A slot machine may have a single video screen that is split in half. The left side of the screen (i.e., a first partition) may shown a messages and information relating to messages and the right side of the screen (i.e., a second partition) may show an image of slot machine reels used in playing games on the slot machine.

(ii) A slot machine may have two video screens, each one corresponding to a partition. The first video screen displays slot machine reels and is used to indicate outcomes during games played on the slot machine. The second video screen is used to output messages to players.

(iii) A game machine may have a single video screen that is split into 3 partitions: a header, a sidebar, and a main window.

(iv) sidebar—For example, a portion of a video screen along the left or right side of the video screen may be designated as a partition.

(v) header—For example, a portion of a video screen along the top of the video screen may be designated as a partition.

(vi) footer—For example, a portion of a video screen along the bottom of the video screen may be designated as a partition. For example, a footer on a video screen may be reserved to display messages and alert to a player based on the player's current activities.

(vii) windows—A video screen may be subdivided into one or more movable partitions (a.k.a. "windows") and an immovable partition (a.k.a. "a desktop"). Each window may be a different partition, and it may be possible to have partitions overlap (i.e., a first partition may obscure some or all of a second partition).

(viii) picture-in-picture—A video screen may be divided into two partitions. The first partition may take up most of the video screen, except that a portion of the first partition may be obscured by the second partition, which is overlaid on top of the first partition. The second partition may be significantly smaller than the first partition.

(ix) pop-up-window—A new partition may be created on a video screen and this partition may display a message to a player.

(x) pay table—A game machine may include a pay table (e.g., that describes one or more payouts that may be provided to players based on. A message may be displayed to a player overlaid on the pay table or on a partition associated with the pay table (e.g., a header or footer).

(xi) on the reels of a slot machine.

(xii) in a bonus round.

(xiii) progressive meter—A game machine may include an auxiliary display screen like a progressive meter, which may be bolted onto the top of the game machine or built-into the game machine. This auxiliary display may be used to display a message to a player.

A partition may be created to output a message. That is, the following steps may be performed:

(i) creating a partition (ii) outputting a message in the partition

Creating a partition may include one or more of the following steps:

(i) determining a location for the partition (ii) determining a size and/or shape of the partition (iii) allocating memory for the partition A partition may be closed, removed, or hidden based on various factors and conditions. Examples of closing or hiding partitions include:

(i) A player may indicate that a partition should be closed.

(ii) A player may indicate that a partition should be hidden.

(iii) A partition may automatically be closed after a predetermined period of time.

Closing or hiding a partition may include one or more of the following steps:

(i) ceasing to display the partition (ii) freeing memory that was allocated for the partition Partitions may be on separate video screens. For example, a slot machine that has two video monitors may have three partitions: two partitions on the first monitor and a third partition on the second monitor.

Partitions may or may not be rectangular. For example, a video screen may display partitions that are shaped like pieces of a pie.

There may or may not be a visible border between partitions.

Partitions may or may not be movable. For example, a player may move a partition (a.k.a. "a window") by clicking and dragging. According to some embodiments, a partition may move on its own (e.g., to avoid obscuring a game result).

A first partition may obscure a portion of a second partition. For example, partitions may be organized into layers. A partition that is on layer #1 may be obscured by any partition on layer #2, which in turn may be obscured by any partition on layer #3. According to some embodiments, only the overlapping portions of partitions may be obscured.

There may or may not be a limit on the number of partitions allowable on one or more video screens.

The contents of separate partitions may be controlled by separate devices. For example, a slot machine may have two partitions: a first video screen and a second video screen. The first video screen may be controlled by the slot machine, whereas the second video screen by the controller.

A partition may be transparent, allowing a player to view portions of a video screen that would otherwise have been obscured by the partition.

A partition may have a background. This background may show a solid color, a pattern, or an image. Information displayed in the partition may be overlaid on the background.

According to some embodiments, processes involving partitions may be animated. For example, if a new partition is created by double-clicking on an icon, an animated sequence may be displayed showing the partition expanding from the icon.

A partition may have associated audio or sounds. For example, jungle noises may be output by a speaker on a video poker machine while a player is navigating a "Jungle Theme" category displayed in a partition.

If a message is output in a visual format (e.g., text, images, video), then a representation of the message may include various visual cues. Examples of visual cues that may vary between representations include:

(i) color—For example, promotional message may be output in red text and instructive messages may be output in blue text.

(ii) windows—For example, a first window may show messages relating to features, a second window may show communication messages from other players, and a third window may show activity-benefit offers. In a second example, a message may be output as a text overlay on spinning a video screen showing spinning slot machine reels.

(iii) titles—For example, a message may displayed in a window with a title bar that indicates the topic of the message.

(iv) fonts—For example, messages that offer supplementary benefits may be in bold, while messages relating to team play may be in italics.

(v) highlighting—For example, selected features may be highlighted, whereas unselected features may not be highlighted. In a second example, keywords in a message (e.g., "dinner", "movie", "credits", "bonus") may be highlighted.

(vi) order—For example, short messages may be listed first, followed by longer messages (vii) borders—For example, messages may be displayed in pop-up windows with colored borders. A red border may indicate that a message is an advertisement; a green border may indicate that a message is an instructive message.

(viii) backgrounds—For example, a message may be output in a partition with a green background, indicating that the message is a update on a World Cup soccer score.

(ix) location—For example, messages relating to features may be displayed in a first location, and advertisements for consumer products may be displayed in a second location.

(x) animation—For example, alerts about activity-benefit offers may be animated to bounce up and down. In a second example, messages that offer benefits to a player and may emit floating "$" signs.

(xi) audio—For example, whenever a status message relating to a baseball game is displayed, a crowd noise sound may be output by a game machine. In a second example, a voice synthesizer may say "Status Message" when a player selects a pop-up window containing a message.

(xii) overlay—For example, messages relating to payouts on a game machine may be displayed as text overlaid on the game machine's payout table.

A visual cue may be used to indicate a category for a message (e.g., an important message, a de-emphasized message, a message about a feature).

A representation of a message may include an indication of a category of the message. Examples of categories of messages include:

(i) promotional messages
(ii) instructive messages
(iii) status messages
(iv) communication messages
(v) messages relating to features
(vi) messages relating to activity-benefit offers
(vii) messages relating to hypothetical information about past game play
(viii) messages from a specific friend of a player
(ix) messages that offer benefits to a player
(x) short messages
(xi) long messages
(xii) reminders based on a player's digital calendar
(xiii) messages relating to food and meals (e.g., reminders, advertisements)
(xiv) messages relating to travel
(xv) urgent messages
(xvi) advertisements for consumer products
(xvii) messages that include the keyword "dinner"

Categories may be organized into a hierarchy. For example, messages may be divided into categories of promotional messages, communication messages, and status messages (many other categories are also possible). Within the "promotional messages" category, messages may be further subdivided into advertisements for consumer products, advertisements for services, promotional messages about features, and activity benefit offers (many other categories are also possible). Alternatively, there may be no hierarchy of categories.

A message may pertain to a plurality of categories. For example, a message may fall into both the "reminders" category and the "messages relating to features" category.

A message may be categorized based on a variety of criteria, including:

(i) a type of a message
(ii) content of a message
(iii) properties of a message
(iv) one or more indications by a player—For example, a player may indicate how he would like messages to be categorized (e.g., by creating his own categories).
(v) one or more indications by another party (e.g., a casino employee)
(vi) originator of a message
(vii) an importance of a message
(viii) a length of a message
(ix) a time that a message originated Categories may be indicated in a variety of different ways. For example, various visual cues may be used to indicate what category or categories a message belongs in. Examples include:

(i) Icons for important ("hot") messages may be shown in red, while less important ("cool") messages may be shown in blue.
(ii) A title bar on a partition may indicate a category of a message.
(iii) An indication of a plurality of categories may be output for a single message. For example, a red border on a pop-up window that displays a message may indicate that the message is urgent, and a title bar on the pop-up window may indicate that the message relates to a player's dinner reservation.
(iv) Messages that offer benefits to a player and may emit floating "$" signs.
(v) A status message describing a jackpot that was just awarded to a player at a nearby game machine may be displayed as text overlaid on a payout table of a game machine.
(vi) An unimportant message may be displayed in "grayed out" text so that it does not needlessly attract a player's attention.

A message may be output using an output device. Examples include:

(i) An LCD screen may display text representation of a message.
(ii) A CRT monitor may display a video message to a player.
(iii) An audio speaker may output an audio representation of a message.

A message may be output using a shared or public output device. Examples include:

(i) A bank of game machines may share a large display screen (e.g., for displaying information about a shared progressive jackpot). One or more messages may be output to players at the bank of game machines using this large display screen.
(ii) A message may be displayed on a 15 foot projection television that is viewable by everyone in the sports book section of a casino.
(iii) An audio speaker at a slot machine may play a message that can be heard by the player as well as other players and casino employees who are nearby.
(iv) On a television in the room of a player.
(v) Over a loud speaker system.

A message may be output to a player privately. Examples include:

(i) A message may be displayed on a small portion of a video screen that is only visible to a player.
(ii) An audio message may be output to a player who is wearing headphones.
(iii) Printed on the back of a cashless gaming receipt.

A player may carry an electronic device such as a cell phone, PDA (personal digital assistant), or laptop computer. This electronic device may display a message to a player. Examples include:

(i) A game machine may use a Bluetooth wireless connection to transmit a message to a player's PDA. Upon receiving the message from the game machine, the PDA may display the message to the player. For example, the PDA may beep and display the message on an LCD screen.
(ii) The controller may determine a message to be output to a player and transmit this message to a player's cell phone using a communication network (e.g., a 3G wireless network). The player's cell phone may then display the message to the player.
(iii) When visiting a casino, a player may rent or borrow a tablet computer, which he may then carry with him as he moves about the casino. Among other things, this tablet computer may output messages to the player. For example, the tablet computer may communicate with game machines and/or the controller to determine and output message to a player.
(iv) A game machine may be associated with a portable electronic device that a player may remove and carry with him throughout the casino. This portable electronic device may output messages to the player (e.g., messages relating to the game machine). For example, commonly owned application Ser. No. 08/774,487 entitled "Automated Play Gaming Device", now issued as U.S. Pat. No. 6,012,983, (which is incorporated herein by reference) and application Ser. No. 09/437,204, also entitled "Automated Play Gaming Device", now issued as U.S. Pat. No. 6,244,957 (which is also incorporated herein by reference) include examples of how a player may lock a game machine in "auto-play" mode and then receive updates (i.e., status messages) relating to game play on this game machine.

An electronic device that is used to output a message to a player may be a player device. Commonly owned application Ser. No. 10/655,154 entitled, "Method and Apparatus for Providing a Complimentary Service to a Player" (which is incorporated herein by reference) includes examples of a variety of different types of player devices and includes details about how a player device may be used to provide a service to a player. One type of service that may be provided by the player devices is a communications service. Outputting a message to a player may be a form of communications service. Commonly owned application Ser. No. 10/655,154 also includes details about how a player may rent or borrow a player device from a casino or other party.

A message may be output using an output device on a neighboring game machine. For example, a player may be operating slot machine #2 at a bank of slot machines. Slot machine #3, which may be immediately to the right of slot machine #2, may be unoccupied. A message for a player operating slot machine #2 may be output using slot machine #3. Outputting a message to a player using a neighboring game machine may be particularly useful in embodiments in which:

(i) A neighboring game machine includes an output device that is not present on a game machine that is being operated by a player. For example, a player may be operating a game machine that does not have an audio speaker, whereas a neighboring game machine may have stereo sound.

(ii) Screen space on a game machine is limited. For example, a neighboring game machine may be used to display messages that do not fit on the display screen of a game machine that a player is operating.

(iii) Outputting a message to a player using a neighboring game machine may help to attract the player's attention to the neighboring game machine. For example, a neighboring game machine may be more profitable to a casino than a game machine that a player is currently operating. In order to entice the player to switch game machines and play the neighboring game machine, a message may be output to the player using the neighboring game machine.

According to various embodiments, the method of the invention may include one or more of the following steps:

(i) determining a representation of a message
(ii) identifying a representation of a message
(iii) selecting a representation of a message
(iv) generating a representation of a message
(v) creating a representation of a message
(vi) determining how to present a message
(vii) determining what way to present a message
(viii) determining a manner of presenting a message Note that determining a representation of a message may include one or more of the following:

(i) determining a media format for the message (e.g., text, audio, video)
(ii) determining a language for the message (e.g., Chinese, German)
(iii) determining a presenter for the message (e.g., a celebrity, an animated character)
(iv) determining a partition for the message (e.g., a pop-up window, a sidebar)
(v) determining at least one visual cue the message (e.g., color, highlighting, font)
(vi) determining a category for a message A representation of a message that is output to a player may be determined based on a variety of factors. Some general categories of factors include:

(i) content of the message
(ii) characteristics of the player
(iii) other messages
(iv) indications provided by the player
(v) indications provided by other parties (e.g., a casino representative, a friend of a player)
(vi) other players associated with the player
(vii) time-related factors
(viii) activities of a player Note that these categories of factors are also factors listed for trigger conditions and are discussed in detail below in the text describing trigger conditions. To avoid repetition, these categories of factors are not discussed in detail here. However, examples of determining a representation of a message based on various factors are provided below.

A representation of a message may be determined based on content of the message. For example:

(i) Promotional messages may be output in green text, whereas status messages may be output in yellow text.
(ii) A message from a first advertiser may include the first advertiser's product logo; a message from a second advertiser may include the second advertiser's product logo.
(iii) The size of a window that displays a message may be proportional to the amount of benefit offered by the message or the amount of subsidy provided by a third party.
(iv) A message relating to food may be presented by a first animated character (e.g. a pot-bellied pig); a message relating to gaming may be presented by a second animated character (e.g., a tiger in a zootsuit).
(v) Messages with important content may be output in bold fonts and/or bright colors.

A representation of a message may be determined based on characteristics of a player. Examples include:

(i) A player who speaks Japanese may have a message output to him in Japanese.
(ii) Messages may be output to a blind player in audio format, whereas a deaf player may not receive audio messages at all, only text or video messages.
(iii) a player's preferences—For example, a player may prefer that a certain category of messages be output in a particular way. See below for further details about categories of messages and further details about a player customizing output of one or more messages.
(iv) a player's proclivity towards certain representations—For example, it may be determined that a player pays more attention to video messages than to text-only messages. Based on this determination, a video representation of a message may be output to a player.

A representation of a message may be determined based on other messages. Examples include:

(i) Contrasting colors may be used to differentiate between different messages. So if a first message is output in blue, a second message may be output in a different color than blue (e.g., red).
(ii) Two messages in the same category may be output in the same sidebar window.

(iii) The same presenter (e.g., a celebrity voice) may be used for all messages during a particular gaming session.

(iv) Messages from different categories may be displayed using different representations. For example, all status messages may be output with an animated rabbit as a presenter, and all promotional messages may be output with a banker character wearing a tuxedo and top hat as a presenter.

A representation of a message may be determined based on activities by a player. Examples of a player's activities that may affect a representation of a message include:

(i) a player's gaming activities—For example, a message may be output in a sidebar window if a player is in the middle of a bonus round on a game machine, whereas a message may be output in a pop-up window if a player has just won a jackpot on a game machine.

(ii) operation of a game machine by a player—For example, a message may be output in audio if a player is currently navigating a on-screen menu on a game machine, whereas a message may be output as text in a picture-in-picture window if a player is watching a television show on a game machine.

(iii) non-gaming activities by a player—For example, a food message from a restaurant may be output in a first window if a player has eaten at the restaurant before, whereas the food message may be output in a second window if the player not eaten at the restaurant before.

A representation of a message may be determined based on characteristics of a game machine. Examples of factors relating to characteristics of a game machine:

(i) an output device of the game machine—For example, a message may be output in video format if a game machine has a color video screen and audio speaker. Otherwise a message may be output in text format.

(ii) hardware of the game machine—For example, a message may be output in audio format if a game machine does not have a fast enough processor to decode a streaming video representation of the message.

The controller may store a message representation database 324, such as the one shown in FIG. 12. Note that, for any given message, one or more representations may be available. For example, PROMO-1-85923475 is available as an English text version, a Spanish text version, and an English audio version. Determining a representation for a message may include selecting a representation from the message representation database.

The controller may store a message formatting database 326, such as the one shown in FIG. 13. Information stored in the message formatting database may be useful in formatting a message to generate a representation of the message. For example, the message formatting database 326 in FIG. 13 shows that a preferred representation of features on game machines for player PLAYER-1-02834555 is to have the message output in a header with a green border and a message title of "Features". An audio signal may be output also. Note that a message formatting database 326 may be used independently or in conjunction with a message representation database 324 such as the one shown in FIG. 12. For example, a representation selected from the message representation database 324 may be formatted according to the message formatting database 326.

Note that there may only be one representation of a message, in which case the controller may simply output the representation of the message to a player at a game machine.

(3) Awaiting A Trigger Condition

In Step 1706, the system waits for a trigger condition associated with the message and/or the representation of the message to occur. Thus, one way to control the output of messages is to output a message based on a trigger condition. That is, for example:

(i) A message may be output when a trigger condition occurs.

(ii) A message may be output when a trigger condition is true.

(iii) A message may be output in response to a trigger condition.

(iv) A message may be output in response to a trigger condition occurring.

(v) A message may be output in response to a trigger condition being true.

(vi) A message may be output at substantially the same time that a trigger condition occurs.

(vii) A message may be output at substantially the same time that a trigger condition becomes true.

(viii) A message may be output because of a trigger condition.

(ix) A message may be output because a trigger condition occurred.

(x) A message may be output because a trigger condition is true.

A trigger condition may be a condition that causes a message to be output at a game machine.

Note that trigger conditions may be useful in enabling a variety of different functions, including:

(i) determining when to output a message (ii) determining an appropriate time to output a message (iii) determining what message to output (iv) determining how to output a message. For example, a trigger condition may be used to determine a representation of a message or categorize a message. See above for details about representations of messages, examples of determining a representation based on various factors, and categorizing messages.

(v) determining an order in which to output a plurality of messages (see message ordering below for details)

(vi) delaying output of a message until a trigger condition occurs. For example, it may be annoying to output a message to a player while he is in the middle of winning streak or busy configuring features on a game machine. Therefore, outputting a message to a player may be delayed until an appropriate time. See below for further details about delaying output of a message.

According to some embodiments, a trigger condition may be a Boolean expression. This Boolean expression may reference one or more variables (i.e., factors) and may include Boolean modifiers and conjunctions (e.g. AND, OR, XOR, NOT, NAND), comparators (e.g., >, <, =, >=, <=, !=), mathematical operations (e.g. +, −, *, /, mean, standard deviation, logarithm, derivative, integral), and constants (e.g. $10, 20 coins, 300 credits, 0.02, 15%, pi, TRUE, yellow, "raining"). Examples of Boolean expressions include:

(i) (fifty_dollar_bill_inserted) AND (player_tracking_card_inserted)

(ii) (time_of_day>6 pm) AND (empty_hotel_rooms>30) AND NOT (player_staying_at_hotel)

(iii) (help_button_pressed=TRUE)

(iv) (free_money_hotline_phone_on_hook=FALSE)

A trigger condition may be based on one or more factors. That is, for example:

(i) one or more factors may affect the occurrence of a trigger condition (ii) one or more factors may affect whether a trigger condition is true (iii) one or more factors may cause a trigger condition to occur
(iv) one or more factors may cause a trigger condition to become true
(v) one or more factors may affect the output of a message
(vi) a message may be output based on one or more factors General categories of factors include:
(i) activities by a player (including a player's gaming activities and non-gaming activities)
(ii) a player's visit to a casino (e.g., arrival, hotel stay, meals, entertainment)
(iii) characteristics of a player
(iv) other players associated with the player
(v) opportunities for revenue management of a casino
(vi) messages that may be output to a player (including the current message)
(vii) indications provided by the player
(viii) indications provided by other parties (e.g., a casino rep, a friend of a player)
(ix) time-related factors
(x) characteristics of a game machine The controller may store a trigger condition database 322, such as the one shown in FIG. 11A or the one in FIG. 11B. According to this database, a message may be output if a trigger condition is true. For example, "OFF-3-23480923" may be output if a nearby player wins a jackpot.

In some cases, the trigger condition database 322 indicates that the "NEXT MESSAGE IN QUEUE" should be output; this means that a message from the message queue database 328 shown in FIGS. 14A and 14B may be output.

According to some embodiments, a message may be output based on factors relating to a player's gaming activities. For example, a message may be output to a player if the player has played a certain number of games, or if he has maintained a certain rate of play.

Examples of factors relating to a player's gaming activities include:
(i) an amount of play
(ii) a rate of play
(iii) a credit balance
(iv) comp points earned
(v) events at a game machine that is operated by a player
(vi) statistics relating to usage of a game machine by a player
(vii) characteristics of a game machine
(viii) gaming activities not performed at a game machine (e.g., lottery tickets, keno, video games)
(ix) past, present, and anticipated gaming activities Examples of factors relating to an amount of play include:
(i) a duration of play (e.g., how many minutes a player has operated a game machine)
(ii) how many games a player has played
(iii) how many comp points a player has earned
(iv) how long a player uses a feature on the game machine (e.g., how long a player operates a game machine in 3D Graphics Mode)
(v) how long a condition has been true (e.g., How long has the player maintained a rate of play of more than 7 games per minute? For how many games has the player's credit balance been above 40 coins?)
(vi) how many spins in a row have been a winner.

Note that an amount of play may be measured in a variety of different units, including:
(i) time (e.g., seconds, minutes, hours)
(ii) occurrences (e.g., number of spins, number of games)
(iii) currency (e.g., number of coins, dollar value, comp points)

Examples of factors relating to a player's rate of play include:
(i) amount of currency per minute (e.g., coins per minute, dollars per minute)
(ii) average amount of currency per minute (e.g., on a game machine that he is currently operating, on all game machines that he has played since acquiring a player device)
(iii) average amount of currency per spin
(iv) average number of games per minute
(v) Whether a player is currently operating a game machine (i.e., is his rate of play greater than zero?)
(vi) reel resolution time as set by the casino or in some embodiments, by the player According to some embodiments, a rate of play may be measured as an amount of play per unit. For example, the controller may track an average amount of currency bet per spin (e.g., 2.3 coins/spin) or an average amount of currency bet per minute (e.g., 16.7 coins/minute). Examples of units for a rate of play include:
(i) per session
(ii) per game (e.g., a spin on a slot machine, a hand of video poker)
(iii) per minute (or other unit of time—seconds, hours, days, etc.)
(iv) per event (e.g., per spin, per usage of a feature, per card selection in video poker, per coin bet)

Examples of factors relating to a player's credit balance. Examples include:
(i) current credit balance on a game machine
(ii) a current credit balance on a plurality of game machines (e.g., in an embodiment in which a player may operate a plurality of game machines simultaneously, or store a credit balance on a game machine)
(iii) average credit balance (e.g., on a game machine that he is currently operating, on all game machines that he has played since acquiring a player device)

Commonly owned application Ser. No. 10/419,306 entitled "Method and Apparatus for Providing A Bonus to a Player Based On a Credit Balance" (which is incorporated herein by reference) includes a description of providing a benefit for a player based on his credit balance on a game machine.

According to some embodiments, a trigger condition may be based on a number of comp points earned by a player. Comp points may be provided to a player for a variety of different reasons, as are known to those skilled in the art.

Examples of factors relating to events at one or more game machines include:
(i) outcomes that are generated by a game machine
(ii) intra-game events (e.g., a player is dealt a card in video poker, a player discards a card in video poker, a player gains access to a bonus round on a slot machine)
(iii) payouts that are provided by a game machine (e.g., 10 coin payout, a $100 jackpot)
(iv) money is inserted into a game machine by a player (e.g., using a bill acceptor or a coin slot)
(v) money is removed from a game machine by a player (e.g., a player presses the 'cash out' button)
(vi) a bonus is provided to a player (e.g., a player may earn a 10 coin bonus for inserting a $20 bill into a game machine)
(vii) a player identifies himself (e.g., a player may insert a player tracking card into the game machine)
(viii) a feature is activated or deactivated. According to some embodiments, a player may receive a service as long as a feature is enabled. For example, a player may receive free telephone service as long as the player operates a game machine in auto-play mode. Note that "auto-play mode" is described in detail in cases like 96-154 "Walkaway Slots", 01-024 "Multiple Device Walkaway Slots" and 02-013 "Cruise Control".

(ix) a player operates an input device on a game machine (e.g., a player presses the 'spin' button on a slot machine, a player uses a touch screen to select a card on a video poker machine)

(x) information may be output to a player using an output device (e.g. a message may be displayed to a player on a video screen alerting him that he only has 10 coins left)

(xi) indications from sensors—For example, a game machine may have a weight sensor that determines when a player is standing in front of the game machine. In a second example, a game machine may have a microphone that may be used to determine when a player is speaking (e.g., with a friend).

(xii) navigation of menus on a game machine. For example, a player may use one or more menus on a game machine to select a feature or indicate his preferences.

In addition to events themselves, information about events may be factors that affect a trigger condition. Examples of information about events include:

(i) what event occurred (ii) when the event occurred (e.g., what date, what time of day, ordering of events)

(iii) how often an event occurred (e.g., 14 times, an average of 32.6 times per hour)

(iv) how much money was added/removed/involved in the event (e.g., How much money did a player insert into a game machine? How large was a payout provided to a player?)

(v) results of the event (e.g., What was a player's credit balance after he won a jackpot? What is the state of a program on a game machine after the game machine's software is upgraded?)

(vi) what caused an event to occur (e.g., why did a player win a jackpot of 100 coins?)

(vii) other information describing the event (e.g. what authentication code was provided, what activation code was provided)

Examples of statistics relating to usage of one or more game machines include:

(i) totals (ii) averages (iii) percentages and ratios (iv) revenues (i.e., "win")

(v) theoretical win (vi) total payouts won (vii) play patterns (events, times, order, speed of play, strategies used by players)

Examples of totals include:

(i) a total amount of time (e.g., how many hours a game machine is operated, how many minutes a feature is used)

(ii) a total number of occurrences of an event (e.g., a total number of offers accepted by players, a total number of times that a feature is activated)

(iii) a total value of a plurality of events (e.g., a total amount of money cashed out of a game machine, a total amount of payouts provided)

Examples of averages include:

(i) average credit balance (ii) average coin-in per spin (iii) an average number of occurrences of an event (e.g., an average number of spins per minute)

(iv) an average value of a plurality of events (e.g., an average credit balance, an average price of hotel rooms sold to players through a game machine)

Note that averages may be calculated on a 'per unit' basis. For example, the controller may calculate an average coin-in per game (e.g., 2.3 coins per game) or an average coin-in per session (e.g., 312 coins per session). Examples of units for averages include:

(i) per session (ii) per game (e.g., a spin on a slot machine, a hand of video poker)

(iii) per minute (or other unit of time—seconds, hours, days, etc.)

(iv) per event (e.g., per usage of a feature, per card selection in video poker)

Examples of percentages and ratios include:

(i) a percentage of time (e.g., what percentage of time a game machine spends waiting for an input from a player)

(ii) a percentage of events (e.g., what percentage of offers presented to a player are accepted)

(iii) a percentage of games (e.g., what percentage of games are played with a particular feature enabled)

(iv) a percentage of sessions (e.g., what percentage of sessions are longer than 3 hours)

Examples of characteristics of a game machine include:

(i) a location of the game machine (e.g., is a game machine located near an entrance to a casino) Note that a game machine may be portable.

(ii) which player or players are operating the gaming machine—For example, it may be possible for a plurality of players to operate a game machine simultaneously (e.g., as a team, or competitively).

(iii) output devices of the game machine (e.g., is an output device currently in use and therefore not available to output a message)

(iv) input devices of the game machine (e.g., is an input device currently in use and therefore not available for a player to use to respond to a message)

(v) hardware of the game machine (e.g., does the game machine have enough memory to store a message?)

Examples of factors relating to gaming activities that may not be performed at a game machine include:

(i) lottery tickets—For example, a message may be output to a player when a lottery drawing is about to occur.

(ii) sports betting—For example, a message may be output to a player based on a sporting event that the player has bet on.

(iii) bingo—For example, a message may be output to a player based on the start of a new round of bingo.

Note that factors may relate to a player's past, present, or anticipated future gaming activities. Examples include:

(i) past gaming activities—For example, a message may be output based on a player's average rate of play over the last hour.

(ii) present gaming activities—For example, a message may be output based on a current outcome achieved by the player.

(iii) anticipated future gaming activities—For example, a message may be output to a player if the player is standing in front of a game machine that is not in use. As discussed above, a game machine 104 may include one or more sensors that may assist it in determining that a player is standing nearby. In a second example, a message may be output to a player based on the player's indication that he plans to play games for the next 3 hours.

A message may be output based on factors relating to messages. For example, here are some exemplary trigger conditions relating to messages:

(i) (promotional_messages_last_hour<5) That is, only output a message to a player if the total number of promotional messages in the last hour is less than 5. Otherwise, delay outputting the message.

(ii) (current_time–time_of_last_message)=>5 minutes) That is, make sure that there are at least 5 minutes between messages being output to a player.

(iii) (NOT (buddy_list_has_received_message (message#14351, 24 hours))) That is, don't output a message to a player if somebody on his buddy list has already received the same message in the last 24 hours.

(iv) (queued_to_output (message #293457)) That is, output this message if message #293457 is already queued to output. For example, this trigger condition may be useful for outputting two messages at the same time or back-to-back.

(v) (related_topics (message #1234213, messages #4980524)) That is, two messages may be output simultaneously if their topics are related. For example, a promotional message relating to a restaurant may be output at the same time as a status message reminding a player about his dinner reservation at the restaurant.

Note that trigger conditions include factors relating to a variety of different types of messages. Examples of different types of messages include:

(i) the message to be output—For example, a trigger condition to output message PROMO-1-85923475 may be based on the content of message PROMO-1-85923475 (e.g., the amount of discount provided by the message). In a second example, a trigger condition to output a status message relating to the score of a baseball game may be based on the time of the message (e.g., when the score of the baseball game changed).

(ii) past messages—messages that have already been output to a player. For example, there may be a restriction that only one promotional message can be output to a player every 5 minutes. In a second example, an activity benefit offer may be output to a player based on his response to a previous promotional message. In a third example, a less detailed message promoting a product or feature may be output to a player if the player has already received a more detailed message about the product or feature.

(iii) future messages—messages that may be output to a player in the future. For example, if two promotional messages are already slated to be output to a player, then the controller may refrain from outputting additional promotional messages to the player. In a second example, if a player is scheduled to receive level 1 and level 2 instructive messages for the Golden Egg slot machine, then the player may additionally be scheduled to receive a level 3 instructive message for the Golden Egg slot machine.

(iv) current messages—messages that are currently being output to a player. For example, an instructive message describing how to operate a game machine may be being output to a player. If it appears that the player does not understand the message, then a second instructive message may be output to the player.

(v) messages output to other players, including past messages to other players, future messages to other players, and current messages to other players. For example, an activity-benefit offer may be output to a player if 3 of the 4 friends on his buddy list have already received activity-benefit offers themselves.

For example, it may be particularly beneficial to output a promotional message based on one or more other messages that may be output (e.g., past, current, or future messages). For example:

(i) An instructive message relating to Auto-Play Mode may be output to a player. Based on this instructive message, an activity-benefit offer relating to Auto-Play Mode may be output the player. For example, the activity benefit offer may be output in the same window as the instructive message.

(ii) A communication message including the word "dinner" may be queued to be output to a player in the future. In addition, an advertisement for a local restaurant may be queued to be output to a player. Based on the similar topics of these two messages, the order of the queue of messages may be modified so that the messages are output sequentially.

According to some embodiments, the invention may include a step of determining a promotional message based on one or more other messages that may be output. See below for details about determining a first message based on a second message.

As described above, the controller 102 may store a message history database 332. One example of a message history database is shown in FIG. 16. This database 332 may be useful in tracking messages that have already been output to players and thereby enable the controller 102 to output a message based on one or more past messages.

As described above, the controller 102 may store a message queue database 328. One example of a message queue database 328 is shown in FIGS. 14A and 14B. This database may be useful in tracking messages that may be output to players and thereby enable the controller to identify players based on future messages.

Examples of factors relating to messages include:

(i) statistics relating to messages
(ii) responses to messages
(iii) content of messages
(iv) outputting of messages Each of these factors is described in detail below.

Statistics relating to messages include:

(i) an amount of messages
(ii) a rate of messages
(iii) totals
(iv) averages
(v) percentages and ratios Note that statistics may relate to past, future, and current messages to a player or to other players. Information stored by the controller in various databases (e.g., a message history database) may be useful in determining statistics. Each of these different types of statistics is described in detail below.

Examples of factors relating to an amount of messages include:

(i) a number of messages (e.g., 10 messages)
(ii) a duration of one or more messages (e.g., how many seconds or messages a player has viewed)
(iii) an amount of information in one or more messages (e.g., 50 Mb of messages)
(iv) an amount of benefits offered by one or more messages (e.g., $30 worth of discounts)

Examples of factors relating to a rate of messages include:

(i) an amount of messages per unit time (e.g., 10 messages per hour, 5 minutes of messages per hour of gaming)
(ii) a duration between messages (e.g., 8 minutes)

(iii) a rate of messages per game play (e.g., 1 message every 20 spins, 0.05 messages per spin)

A rate of messages may be measured as an amount of messages per unit. For example, the controller may track an average number of messages output to a player per game play (e.g., 0.1 messages/spin) or a total value of messages per session (e.g., $52/session). Examples of units for a rate of messages include:

(i) per session
(ii) per game play (e.g., a spin on a slot machine, a hand of video poker)
(iii) per minute (or other unit of time—seconds, hours, days, etc.)
(iv) per event (e.g., per spin, per usage of a feature, per card selection in video poker, per coin bet)
(v) per bill inserted.
(vi) per room per night stayed in a hotel.

Examples of factors relating to a total of messages include:

(i) a total number of messages output to a player
(ii) a total duration of instructive messages output during a session
(iii) a total number of promotional messages output to all players
(iv) a total amount of benefits offered to friends of a player
(v) a total number of messages to a given bank of game machines (e.g. to ensure that all offers aren't output to the same bank of game machines)

Examples of factors relating to an average of messages include:

(i) an average duration between messages to a player.
(ii) an average number of messages from a specific sponsor output per hour
(iii) an average benefit offered to a player in one or more promotional offers Examples of factors relating to a percentage or ratio of messages include:

(i) a percentage of messages of a certain type
(ii) a percentage of messages that are status messages relating to a player's visit to a casino
(iii) a percentage of accepted activity-benefit offers that provide discounts on products
(iv) a ratio of promotional messages to other types of messages When a messages is output to a player, the player may respond or react to this message in various ways, including:

(i) acknowledging that the message was received (e.g., pressing an "OK" button on a touch screen)
(ii) removing, hiding, or deleting the message (e.g., closing or minimizing a pop-up window that displays the message)
(iii) accepting or declining an offer (e.g., pressing an "I accept, sign me up!" button on a touch screen)
(iv) performing or not performing an activity specified in a promotional message or activity-benefit offer
(v) accepting or receiving a benefit provided by a promotional message or activity-benefit offer
(vi) requesting additional information (e.g., "This was an useful instructive message, please give me more like it.")
(vii) indicating an opinion about the message (e.g., "I don't need to be reminded about my dinner reservation.")
(viii) storing the message for later review.

Responses or indications by a player (e.g., such as those described above) may be factors in outputting a message to a player. For example, if a player accepts an activity-benefit offer, then this may trigger an additional promotional offer to be output to the player. For future messages or current messages, anticipated responses by a player may be factors. Other players' responses to messages may also be considered as factors in outputting a message to a player.

Messages may be also be output based on the content of past, future, or current messages. Examples of factors relating to the content of messages include:

(i) similarities in the content of messages—For example, two messages with similar content may be output in the same partition. In a second example, two communication messages from the same party may be output in the same color.
(ii) differences in the content of messages—For example, promotional messages relating to food and beverages may be output in a first partition, and instructive messages about game play may be output in a second partition.
(iii) parameters of a message (e.g., what size discount is offered by an activity-benefit offer, what sort of instruction is provided by an instructive message)
(iv) a category of a message (e.g., a promotional messages from Acme, a communication message from player #124)
(v) a representation of a message (e.g., what partition or presenter is used to output a message, what language a message is in, visual cues in outputting a message). For example, a message may be output in a partition if no other message has been output in this partition during the last 5 minutes.
(vi) a length of a message
(vii) a time when a message originated
(viii) a time when a message is output
(ix) an originator of a message
(x) an importance of a message Messages may also be output based on output of other messages. As described above, messages may be output to a player in various different representations. Various factors relating to the output of past, future, or current messages may affect the output of a message. Examples of factors relating to outputting messages include:

(i) what output device is used to output a message (e.g., audio speaker or video screen; video screen #1 vs. video screen #2)
(ii) a representation of a message that is output (e.g., including media format, language, presenter, partition, visual cues, and category)
(iii) responses to messages—For example, a message may be output in green if previous messages output in green have elicited positive responses from a player.

As mentioned above, a message may be output based on factors such as:

(i) non-gaming activities by a player
(ii) events relating to a player's visit to a casino (e.g., arrival, hotel stay, meals, entertainment)
(iii) characteristics of a player
(iv) other players associated with the player
(v) opportunities for revenue management of a casino
(vi) time-related factors
(vii) indications by various parties
(viii) other gaming activities at a casino A message may be output based on a player's non-gaming activities. General categories of non-gaming activities include:

(i) communication (e.g., a player may talk with a friend or a casino representative)
(ii) food and beverages (e.g., a player may consume a complimentary beverage)
(iii) visit to a casino (e.g., a player may stay at a hotel associated with a casino)

(iv) entertainment (e.g., a player may watch a show or sporting event)
(v) arrival and departure (e.g., a player may fly to Las Vegas to visit a casino)

A message may be output based on communication by/with a player. Examples of communication by/with a player include:

(i) a player may talk with a friend who is sitting at a nearby game machine
(ii) a player may use a cellular telephone to talk with a friend
(iii) a player may communicate using a game machine (e.g., by using a keyboard to send instant messages to his friends)
(iv) a player may see gaming results of another player A message may be output based on food and beverages consumed by a player. Examples of factors relating to food and beverages consumed by a player include:

(i) the player receives a complimentary beverage
(ii) the player requests a complimentary product or service
(iii) the player receives a complimentary product or service
(iv) meals eaten by the player at restaurant associated with the casino
(v) whether the player has purchased a meal at restaurant associated with the casino
(vi) a player consumes a food or beverage item A message may be output based on a player's visit to a casino. Examples of factors relating to a player's visit to a casino include:

(i) when a player arrives at the casino
(ii) whether the player has reserved a hotel room at the casino
(iii) visits by a player to his hotel room
(iv) when a player checks into a hotel
(v) when a player checks out of a hotel
(vi) phone calls, voicemail, email, or faxes that a player receives at a casino (e.g., in his hotel room)
(vii) previous visits to the casino by the player A message may be output based on entertainment consumed by a player. Examples of factors relating to entertainment include:

(i) a player attends a show or sporting event
(ii) a player views a movie or other entertainment while using a game machine—For example, a partition or window on a game machine may display a television show to a player so that the player can continue gaming while still watching his favorite TV show. In a second example, a player may use a portable internet terminal to view entertaining web content while operating a game machine.
(iii) entertainers at a casino visit players at their game machines Examples of characteristics of players include:

(i) a player's preferences (e.g. hobbies, interests) See below for further details of how a player may indicate his preferences for receiving messages.
(ii) a player's demographic group
(iii) what language a player speaks
(iv) messages that have been output to the player in the past
(v) information stored in the player database 308
(vi) information determined by a casino representative (e.g., by talking to the player)
(vii) the player's hobbies and interests (e.g., sailing, golf)
(viii) physical characteristics of the player (e.g., age, height, weight, nationality, gender, dress and appearance)
(ix) psychological characteristics of the player (e.g., creativity, risk-aversion)
(x) the player's marital status
(xi) the player's occupation, income, work hours, credit report
(xii) the player's medical history According to some embodiments, the controller may output a message to a first player based on events or conditions relating to other players who are in some way associated with the first player. Conditions relating to other players are similar to the conditions listed above and elsewhere thought the specification. For example, a message may be output to a first player based on the gaming activities of a second player. Examples of other players associated with the player include:

(i) a player who is operating a nearby slot machine. For example, if a first player wins a jackpot, then the controller may output a message to a second player at a nearby slot machine.
(ii) a player who is sharing a room with the player
(iii) a player who arrived on the same bus as the player
(iv) family members, friends, and other associates of the player Conditions or events relating to revenue management of a casino may also be considered when outputting a message. Examples include:

(i) To maximize revenues, a casino may want to fill all of its hotel rooms on a Wednesday night. If it is 6 pm on Wednesday night and the casino hotel is only half full, then this may result in a trigger condition (e.g. offering a free or discounted room to the player if he agrees to perform some obligation).
(ii) To maximize revenue, a casino may desire to maximize the number of slot machines that are being played at any given time. A trigger condition may occur if only 10% of the slot machines in a casino are currently being played (e.g. play slots and get a pair of show tickets for the price of one).

Examples of time-related factors include:

(i) a duration of time since an event took place.
(ii) a duration of time since a condition occurred. For example, a message may be output 5 minutes after a condition occurs, thereby making it less obvious to a player that the message is being output based on the condition.
(iii) a time of the day, week, month, or year—For example, a message may be output on the first Tuesday of every month.
(iv) the current time of day is 6 pm, which is when the player usually eats dinner
(v) the current time of day is 8 am, and the player must check out of the hotel at 11 am Indications by various parties may be factors in outputting a message. Examples include:

(i) A player may provide an indication. For example, a player may press a button on a game machine to indicate that he would like to receive a message.
(ii) A casino employee may provide an indication. For example, a casino employee review information about a player that is stored in a database (e.g., the player database shown in FIG. 4). Based on this review, the casino employee may indicate that a player seems confused and may need assistance in learning how to play a game.
(iii) An associate of a player (e.g., a friend or relative) may provide an indication. For example, a player's friend may indicate that the player is about to cash out and should receive a reminder relating to his hotel room bill. In a second example, a friend of a player may indicate that the player just lost $50 at another casino and would be interested in earning the money back.

A message may be output based on a player's gaming activities. Alternatively, or in addition, a message may be output to a player based on gaming activities at a casino that are not necessarily performed by the player. For example, a message may be output to a player based on the average utilization of a game machine over the last month. Examples of factors relating to gaming activities at a casino include:

(i) overall usage of a game machine that a player is operating (i.e., including usage by other players) See below for examples of factors relating to usage of at least one game machine.

(ii) usage of other game machines at a casino (e.g., nearby game machines, game machines of the same type, game machines that share a progressive jackpot, game machines with a common theme, game machines that are associated with a game machine operated by the player). See below for examples of factors relating to usage of at least one game machine.

(iii) gaming activities at a casino that do not involve game machines (e.g., table games, betting on horse races and other sporting events)

Examples of factors relating to usage of one or more game machines include:

(i) whether a game machine is currently in use. For example, an unoccupied game machine may output a message to a nearby player (e.g., a player who is walking by the game machine). In a second example, a message relating to first game machine that is unoccupied may be output on a second game machine that is being operated by a player (e.g., a player who has been waiting to play the first game machine).

(ii) when a game machine was last used (e.g., a player just stopped using a game machine)

(iii) overall utilization of one or more game machine (e.g., measured as what percentage of time a game machine is in use). For example, a message may be output to a player if 90% of all the game machines on the floor of a casino are in use.

(iv) events at one or more game machines. For example, a message may be output to a player if a game machine near the player just awarded a jackpot.

(v) statistics relating to usage of one or more game machine. For example, a message may be output to a player if the average rate of play on a group of progressive jackpot game machines is greater than 15 coins/minute.

(vi) past, present, or anticipated usage of at least one game machine. For example, if a show at a casino just finished, then there may be large number of players entering the gaming floor of a casino. Based on this, a message may be output when the show finishes.

According to some embodiments, a plurality of messages may be output at a game machine.

(i) Two messages may be output simultaneously.

(ii) A first message may be output, and then a second message may be output.

According to various embodiments, the method of the invention may include one or more of the following steps:

(i) identifying a plurality of messages (ii) determining a plurality of messages (iii) selecting a plurality of messages (iv) outputting a plurality of messages According to some embodiments, the method of the invention may include determining an order in which to output the plurality of messages. Variations include:

(i) ordering the plurality of messages (ii) determining an order of the plurality of messages (iii) sorting the plurality of messages (iv) prioritizing the plurality of messages (v) determining priorities of the plurality of messages (vi) determining an index for each of the plurality of messages (vii) selecting a message to output first For example, the controller may use a point system to order messages. A scoring function may be used to determine a point value for each of a plurality of messages. Then the controller may sort the messages according to their point values (e.g., so that the messages with the highest point values are output first). For example, one scoring function might be:

point_value=(max_benefit_from_message)*2+(priority_of_message_originator)*3−(length_of_message)

According to this scoring function, a promotional offer from Joe's Flowers that offers a player $5 off any order of $10 or more may receive a point value of 15:

(i) (max_benefit_from_message=5)*2=10

(ii) (priority_of_message_originator=3)*3=9

(iii) length_of_message=4

(iv) total point value=10+9−4=15

In comparison, a status offer alerting a player that his restaurant table is ready may be scored as having a point value of 25. Therefore, the status offer about the player's restaurant table may be output before the promotional offer about Joe's Flowers.

Of course there are a variety of other ways to order messages. For example, the controller may use a rules-based system to order messages. These rules may guide the ordering of messages being output. For example, one set of rules for ordering messages might be:

(i) Status messages should always be output first.

(ii) If there are multiple status messages, the status messages should be output simultaneously.

(iii) After all status messages have been output, any communication messages should be output.

(iv) If there are multiple communication messages, they should be output in order of time, with messages from a player's friends and family output first.

(v) Promotional offers that do not provide benefits should be output last.

(vi) Messages describing promotional offers should be output based on the expected value of each message to the casino Messages may be ordered based on a variety of different criteria, including:

(i) one or more indications by a player—For example, a player may indicate that he would like to receive status messages first, followed by communication messages and promotional messages. According to various embodiment, a player may specify one or more rules for a rules system and/or a scoring function for a points system.

(ii) one or more indications by another party (e.g. a casino employee)—For example, a casino employee may adjust the weights of various parameters in a scoring function.

(iii) a type of a message (iv) content of a message (v) properties of a message (vi) originator of a message (vii) an importance of a message (viii) a length of a message (ix) a time that a message originated (x) expected value of messages—For example, messages may be ordered according to their expected value to a casino, with message that have the highest expected value being output first.

(xi) random numbers—For example, if two messages are of equal priority, the controller may randomly select one of the messages to be output first.

Messages may be output in order. Variations include:

(i) outputting a plurality of messages in order (ii) outputting a plurality of messages based on an order (iii) outputting a plurality of messages based on a sort (iv) outputting a plurality of messages based on one or more priorities The controller may store a message queue database 328, such as the one shown in FIGS. 14A and 14B. The message queue database may store an ordered list of messages to be output to a player. For example, the message queue 328 shown in FIGS. 14A and 14B is ordered according to priority, with higher priority messages to be output before lower priority messages.

Output of a message may be prevented or suppressed. For example, the controller or a game machine may prevent a message from being output to a player if the message would be distracting to the player.

Suppressing a message may include:

(i) preventing the message from being output (ii) not outputting the message (iii) canceling output of the message (iv) delaying output of the message (v) outputting a message through a different device A message may be suppressed for a variety of reasons, including:

(i) wrong time—For example, a player may currently be busy with another activity or enjoying a winning streak.

(ii) wrong content—For example, a message may be a duplicate of a previous message.

(iii) wrong representation—For example, a message may not be in the language of the player Benefits of suppressing a message include:

(i) Players may no longer be annoyed or bothered by inappropriate messages.

(ii) Players may not be distracted from their gaming as often.

(iii) Since inappropriate messages may be suppressed, players may pay closer attention to those messages that are output.

One way to control the suppression of messages is to suppress a message based on a suppression condition. That is, (i) A message may be suppressed when a suppression condition is true.

(ii) A message may be suppressed because of a suppression condition.

(iii) A message may be suppressed because a suppression condition is true.

Note that a suppression condition may be thought of as the opposite of a trigger condition:

(i) A message may be output when a trigger condition is true.

(ii) A message may be not output when a suppression condition is true.

According to some embodiments, a suppression condition may be a Boolean expression.

A suppression condition may be based on one or more factors. That is, (i) a message may be suppressed based on one or more factors (ii) one or more factors may cause a message to be suppressed (iii) one or more factors may affect whether a suppression condition is true General categories of factors that may cause a message to be suppressed include:

(i) a player's gaming activities (ii) a player's non-gaming activities (iii) characteristics of a player (iv) other players associated with the player (v) opportunities for revenue management of a casino (vi) other messages that have been presented or will be presented (vii) indications provided by the player (viii) indications provided by other parties (e.g., a casino representative, a friend of a player)

(ix) time-related factors

Note that these categories of factors are the same as the factors listed for trigger conditions discussed in detail above. A message may be suppressed based on any of the factors listed for trigger conditions. Some examples of suppressing messages based on various factors are provided below.

A message may be suppressed based on a player's gaming activities. Examples of factors relating to a player's gaming activities include:

(i) rate of play. For example, a message may be suppressed if a player's speed of play is faster than a threshold value, since this may indicate that the player is focused on gaming and should not be disturbed.

(ii) game content. For example, a message may be suppressed if a player is currently playing a bonus round, or if a player is faced with a particularly difficult decision in game play (e.g., in video poker). In a second example, a message may be suppressed while a player is waiting for the reels of a slot machine to stop spinning.

(iii) sensors on a game machine. For example, a game machine may include a microphone to determine whether a player is in the middle of a conversation with a friend. In a second example, a drink holder on a game machine may include a weight sensor to determine whether a player is currently sipping his drink.

(iv) operation of a game machine. For example, a message may be suppressed if a player is currently navigating menus on a game machine to activate a feature.

(v) events at a game machine. For example, all hypothetical info messages may be suppressed for 15 minutes after a player wins a payout of more than 100 coins.

(vi) indications by a player. For example, a message may be suppressed if a player presses the "cash out" button on a slot machine or inserts a dollar bill into a bill acceptor on a video poker machine.

A message may be suppressed based on characteristics of a game machine. Examples of factors relating to characteristics of a game machine:

(i) a location of the game machine—For example, a message may be suppressed if a game machine is located in an area where other players may be able to view the message.

(ii) output devices of the game machine—For example, a message may be suppressed if a game machine does not have a video screen suitable for outputting the message.

(iii) input devices of the game machine—For example, a message may be suppressed if a game machine does not have a touch screen that a player could use to respond to a message.

(iv) hardware of the game machine—For example, a message may be suppressed if a game machine does not have a fast enough processor to decode a streaming video.

A message may be suppressed based on a player's non-gaming activities. Examples of factors relating to a player's non-gaming activities include:

(i) communication—For example, a player may communicate with other players, friends, or relatives while operating a game machine (e.g., because they are nearby, or by using a cellular telephone, or a communication device on a game machine).

(ii) entertainment—For example, a player may watch a television show (e.g., a sporting event) while at a game machine. Messages may be output to the player during commercial breaks or other appropriate intermissions in the entertainment.

(iii) food and drinks—For example, a message may be suppressed if a player is currently busy ordering or consuming a complimentary drink.

A message may be suppressed based on messages that may be output to a player. Examples of factors relating to messages include:

(i) current, past, and future messages—For example, a message may be suppressed if a player has already received, is currently receiving, or is scheduled to receive the message or a similar message.

(ii) messages to other players—For example, a message may be suppressed if a friend of a player has already received, is currently receiving, or is scheduled to receive the message or a similar message.

(iii) statistics relating to messages—For example, there may be a limit on the number of messages that a player should receive during a certain period of time (e.g., a maximum of 5 messages per hour).

(iv) the message itself—For example, a communication message may be suppressed if the communication message contains profanity or vulgar language.

A message may be suppressed based on time-related factors. An example of a factor relating to time includes a duration of time since an event or condition occurred. For example, messages may be suppressed for the first 10 minutes that a player operates a game machine. In a second example, a message may be suppressed for 5 minutes after a player accepts an activity-benefit offer.

A message may be suppressed based on characteristics of a player. Examples of factors relating to characteristics of a player include:

(i) A status message that is only available in English may be suppressed if a player only speaks French.

(ii) A promotional message relating to cigarettes may be suppressed if a player is trying to quit smoking.

(iii) The audio portion of a movie message may be suppressed if a player is deaf or hard of hearing.

A message may be suppressed based on an indication from a player or another party. Examples of indications from various parties include:

(i) A player may indicate that he would rather not receive instructive messages when playing video poker.

(ii) A casino employee may indicate that a player should not receive any promotional messages relating to alcohol.

Suppressing a message may include delaying output of the message. Output of a message may be delayed until a trigger condition occurs. For example, the controller may determine that an advertisement for Acme laundry detergent should be output to a player. However, this message may be suppressed because the player is currently playing a bonus round on a game machine (i.e., a suppression condition). The advertisement may later be output after the bonus round is over (i.e., a trigger condition).

Suppressing a message may include canceling or deleting the message. That is, a suppressed message may be completely removed from a message queue database 328.

The controller may store a suppression condition database 330, such as the one shown in FIG. 15. In the depicted example version of the suppression condition database 330, a message will be suppressed if any of the listed suppression conditions are true. If a message is suppressed, it may be:

(i) delayed until a trigger condition occurs—For example, if a player is currently playing a bonus round on a game machine, a message may be suppressed. The message may later be output if the bonus round ends and the player wins a bonus payout of less than 100 coins.

(ii) cancelled—For example, if a player does not speak the language of a message (e.g., a message is in English, but the player only speaks French), then the message may be cancelled and not output at all.

(iii) put in the message queue—For example, a message may be put back into a message queue database 328 (as shown in FIGS. 14A and 14B). The message may then be output later (e.g., based on a trigger condition).

(4) Output The Message

In Step 1708, the message and/or the representation are output to the player at a game machine. The game machine may be operated by a player, who may or may not be identified. For example, a player may or may not have inserted a player tracking card into the game machine. Variations of outputting a message at a game machine may include:

(i) outputting an indication of a message
(ii) outputting a representation of a message
(iii) displaying a message
(iv) revealing a message
(v) indicating a message
(vi) outputting a message through a game machine
(vii) outputting a message on a game machine
(viii) outputting a message using a game machine
(ix) outputting a message using an output device at a game machine
(x) outputting a message by transmitting it to a game machine
(xi) a game machine outputs a message
(xii) outputting a message using a device associated with a game machine (e.g., a player tracking card reader)
(xiii) outputting a message using a device associated with a plurality of game machines (e.g., a central display for progressive jackpot)

A player may customize how messages are output to him, when messages are output to him, or what type of messages are output to him. For example, a player may indicate that he prefers to receive messages when he presses the cash out button on a game machine. In order to customize how messages are output to him, a player may indicate his preferences. Various ways that a player may indicate his preferences and thereby customize how messages are output to him are now described.

One way for a player to indicate a preference is by indicating a rule or condition for outputting one or more messages. A rule may be a trigger condition, a suppression condition, or an indication that is convertible to a trigger condition or suppression condition (e.g., a text phrase or a selection from a list of options).

A player may indicate a preference for at least one specific type of message. Examples include:

(i) A player may indicate that he only wants to receive promotional messages at the beginning or end of his gaming sessions.

(ii) A player may indicate that he that he would like status messages to be output to him in audio format.

(iii) A player may indicate that instructive messages should not be output to him after he has been playing a game machine for more than 10 minutes.

(iv) A player may request that she receive instructions any time she starts playing a game that she has never played before.

A player may indicate a preference for all messages. Examples include:

(i) A player may indicate that no messages of any type should be output to him while he is playing a bonus round.

(ii) "All messages should be output in pop-up windows."

A player may indicate a preference of when to output one or more messages. Examples include:

(i) "Output messages at the beginning of a gaming session when I insert my player tracking card."

(ii) "Output an instructive message the first time I win access to a bonus round on a game machine."

(iii) "Instructive messages should be output in between game plays (i.e., after the end of a game play and before the beginning of the next game play)."

(iv) A player may indicate that he would like to receive messages at the present time (e.g., "Now is a good time to output messages.")

A player may indicate a preference of when to not output one or more messages. In some cases, rules for when messages should not be output may be more common than rules for when messages should be output. Examples include:

(i) "Don't output a message in the middle of a winning streak."

(ii) A player may indicate, "It's okay to output messages anytime except when I'm in the middle of composing an instant message."

(iii) A player may operate an input device on a game machine to indicate that he would not like to receive any promotional messages until after he has won a payout of at least 10 coins on a game machine.

(iv) A player may indicate that he does not want to receive any messages at the present time (e.g., "Don't output any messages for the next 5 minutes." or "Postpone any messages for 5 minutes.") This feature may be particularly useful if a player is in the middle of a winning streak on a game machine, is busy conversing with a friend, or otherwise would not be able to devote his full attention to a message that is output.

A player may indicate a preference of how to output one or more messages. Examples include:

(i) "Status messages should be output in audio format."

(ii) "Instructive messages should be output in green text in the header window on my game machine."

(iii) "Pop-up windows that display messages should close automatically in 5 seconds."

(iv) "Please transmit all status messages to my PDA."

A player may indicate a preference of how not to output one or more messages. Examples include:

(i) "If a game machine that I'm operating has a music soundtrack, don't output messages in audio format."

(ii) "If a message is longer than 50 words, don't output it using the footer partition. Output it in a pop-up window."

A player may indicate a preference based on a message that is output to him. For example, a message may be output to a player and then the player may indicate whether he likes or dislikes the manner in which the message was output. Examples include:

(i) When a message is output in a manner that a player likes (e.g., an instructive message is displayed when the player is confused), the player may press a "thumbs up" button on a game machine. When a message is output in an inappropriate manner (e.g., a non-urgent status message is output right in the middle of a player's bonus round), the player may press a "thumbs down" button on the game machine.

(ii) A player may indicate what he likes or dislikes about the output of a message. For example, a player may indicate that the timing of the messages was good, but that he would prefer that the message be output in a pop-up window as opposed to a header partition. In second example, a player may indicate that he would prefer that a message be output in both audio and text form instead of just audio form.

An indication of a player's preference relating to at least one message may be stored in a database, such as the player database 306 shown in FIG. 4. For example, the player database may store an indication that a player prefers to receive instructive messages at the start of his gaming session, but not during the middle of his gaming session.

A player may indicate his preferences using an input device on a game machine. The game device may in turn transmit an indication to the controller. Examples include:

(i) A player may use a touch screen on a game machine to navigate one or more menus and select what types of messages he would like to receive and when he would like to receive these messages.

(ii) A player may press a button on a slot machine marked "Give me an offer."

(iii) A player may use a touch screen on a slot machine to indicate that he would like help in understanding how to play a game.

(iv) A player may pick up a telephone on the side of a game machine, thereby identifying himself and initiating a telephone call to check the phone messages in his hotel room.

A player may indicate his preferences using a computer terminal. Note that computer terminals may take various forms, including: a personal computer, a set-top box, a kiosk, a notebook computer, a tablet computer, a personal digital assistant (PDA), a cellular telephone. Examples include:

(i) A player may use a personal computer with a web connection to log onto a casino's web site and indicate what types of messages he would like to receive while operating a game machine.

(ii) A player may use a kiosk at a casino to indicate what messages he would like to receive.

(iii) A player may dial a toll-free number using his cellular telephone and navigate a series of audio menus to indicate that he would like to receive messages.

(iv) A player may use a set-top box in his hotel room at a casino to indicate that he would like to receive an alert when his bed is turned down and a 1-hour reminder before checkout.

(v) A casino employee may use a PDA to identify a player who should receive an activity-benefit offer. Commonly owned application Ser. No. 10/212,636 entitled "Method and Apparatus for Generating Directives for Personnel" (which is incorporated herein by reference) includes a more detailed description of this embodiment.

(vi) A friend of a player may use a personal computer to send a communication message to a player. The friend may indicate a player's email address or username when sending the communication message to the player.

A player may indicate his preferences by filling out a form. For example, a player may fill out a registration form at a casino's front desk. For example, a player may use a No. 2 pencil to check off his preferences on a multiple choice form. These preferences may then be entered into a computer system (e.g., the controller), so that messages may be output to the player based on the preferences. A player may indicate one or more preferences by selecting a preference from a multiple-choice menu. Examples include:

(i) A game machine or computer terminal may display a list of preferences on a touch screen. To indicate his preferences, a player may select preferences from the list using the touch screen.

(ii) A plurality of multiple-choice menus may be presented to a player. For example, a first menu may allow a player to select what type of messages he would like to make a rule for (e.g., status messages about sporting events), and a second menu may allow a player to indicate his preferences regarding outputting this type of message (e.g., delay messages until the end of my session, but not longer than 1 hour).

(iii) An interactive voice-recognition unit (IVRU) may offer a player a list of preferences (e.g., in audio) and the player may select his preferences by saying the name of at least one preference that is on the list.

Alternatively, a player may not be able to customize the output of messages. An indication of a player's preference may be stored in a trigger condition database 322 (e.g., FIGS. 11A and 11B), or a suppression condition database 330 (e.g., FIG. 15).

F. ALTERNATE EMBODIMENTS

Features or options may refer to any parameter that may affect how a game operates on a game machine. Features may affect the processes like operating a game, displaying game play, determining outcomes, or outputting game results. Game machines may have many features. Examples include:

(i) 3D Graphics Mode
(ii) Make Money on Losing Outcomes
(iii) Bet Allocation System
(iv) Auto-Play Mode
(v) Sponsor Offers
(vi) Jackpot Only
(vii) Customizable Speed of Play
(viii) Customizable Symbols on Slot Reels
(ix) Customizable Payout Table
(x) Virtual Assistant Provides Help
(xi) Tutorial on How to Use a Game Machine
(xii) Comp Points For Your Friends
(xiii) Group Jackpots
(xiv) Better Odds if Nearby Players Win Jackpots
(xv) Watch Video Clips While You Gamble
(xvi) "Rascally Rabbit" Bonus Round A variety of different types of features are possible, including:

(i) features that are only available for one game
(ii) features that are available for a plurality of games
(iii) features that are available for all games
(iv) features that are only available on one game machine
(v) features that are available for a plurality of game machines
(vi) features that are available for all game machines
(vii) features that are available for one player
(viii) features that are available for a plurality of players
(ix) features that are available for all players Examples include:

(i) According to some embodiments, "Auto-Play Mode" (a feature) may only be available on slot machines and pachinko machines, but not on video poker machines or video blackjack machines.

(ii) A particular bonus round feature may work on all types of machines, but be best suited for card games like video blackjack and video poker.

Note that a feature may be a feature of a game and/or a feature of a game machine. According to some embodiments, it may be possible to use multiple features simultaneously on a single game or game machine. For example, a player may play a video poker machine using a "Group Jackpot" feature and a "Virtual Assistant" feature.

According to some embodiments, a first feature may not be compatible with a second feature. For example, it may not be possible for "Make Money on Losing Outcomes" (a first feature) and "Jackpot Only" (a second feature) to operate simultaneously. Therefore, players may be prevented from using these features simultaneously.

According to some embodiments, a casino may provide a payment to a proprietor of a feature. For example, a casino may pay a licensing fee to a game manufacturer who builds game machines that include a feature. Commonly owned application Ser. No. 10/420,068 entitled "Method and Apparatus for Managing Features on A Gaming Device" (which is incorporated herein by reference) includes a method of tracking usage of features on a game machine and determining payments to be made to proprietors of features.

In some embodiments, after a message is output to a player, the player may respond or react to the message. Responding to a message may include:

(i) providing an indication
(ii) indicating a response
(iii) inputting a response
(iv) accepting an offer Examples of responses include:

(i) "Yes, I'd like to accept this activity-benefit offer"
(ii) "No, thank you"
(iii) "Please sign me up for a 3-month trial subscription to 'Speed Fishing' magazine"
(iv) "I don't understand" (e.g., as a response to an instructive message)
(v) "Tell me more" (e.g., as a response to a status message)
(vi) "Don't give me any more messages like this"
(vii) "Close window" (e.g., for a message that is output in a partition)

Accordingly, a method of the invention may include one or more of the following steps:

(i) determining a response by a player
(ii) receiving a response from a player
(iii) receiving an indication of a response from a player A player may respond to a message using a game machine. Examples include:

(i) A player may use an input device (e.g., a touch screen) on a game machine to indicate his response to a message.

(ii) A player may speak a response (e.g. by saying "Yes" or "No") and a voice recognition module on a game machine may process the response.

(iii) A game machine may present a list of possible responses to a player and a player may select at least one response from the list.

Various actions may be performed based on a player's response to a message, including:

(i) outputting a message
(ii) determining a message
(iii) activating or deactivating a feature on a game machine. For example, a player may indicate that he would like to activate a feature on a game machine.
(iv) hiding, removing, or otherwise concealing the message. For example, a player may indicate that he is finished reading a text message and that a window that is displaying the text message should be closed.
(v) transmitting an indication to another party. For example, an indication of a player's response to a message may be transmitted to a subsidizer, or to a computer terminal for review by a casino employee.
(vi) providing a benefit to a player (e.g., a player may get a free spin on a slot machine for responding to a message)
(vii) storing an indication in a database. For example, a player may indicate that he would like to accept an activity-benefit offer. An indication of this acceptance may be stored in database for future reference (e.g., to track whether the player performs the activity specified in the offer).
(viii) selling a product or service to the player. For example, a player may indicate that he would like to sign up for AT&T long distance telephone service.

A player may not respond to a message or may not respond in a manner the game machine 104 can interpret/understand. Various actions may be taken based on a player not responding to a message, including:

(i) outputting the message again
(ii) outputting the message again in a different representation
(iii) outputting a different message
(iv) hiding, removing, or otherwise concealing the message. For example, a pop-up window that displays a message may automatically be closed if a player does not respond to the message.

If a player does not respond to a message, an action (e.g., outputting a second message, closing a pop-up window) may be performed based on a trigger condition. Examples include:

(i) A pop-up window for a message may be closed automatically when a player starts a new game on a game machine (e.g., the player presses the spin button)
(ii) A message may be removed from a header on a video screen after 15 seconds (a time-based trigger condition)
(iii) A sidebar window on a game machine may display one message at a time.
(iv) A first message may be hidden from view when a second message is output.
(v) An audio message may be output again if a player does not respond to the message within 15 seconds.

In some embodiments, a player may respond to a message while the message is being output. For example, a player may interrupt an audio message by pressing a 'Cancel' button on a game machine. In some embodiments, an indication of a player's response to a message may be stored in a message history database 332, such as the one shown in FIG. 16.

Messages may be output to a player free of charge. Alternatively, a player may be compensated for receiving messages. Alternatively, a player may pay a fee or provide other consideration based on at least one message that is output to him. For example, a player may pay $0.02 for each message that is output to him. Examples of consideration that may be provided by a player include:

(i) money (e.g., in dollars)
(ii) alternate currencies (e.g., casino tokens, frequent flyer miles, credits on a game machine, comp points) Note that an alternate currency may or may not be interchangeable with money.
(iii) activities—For example, a player may agree to switch his long distance telephone service provider in exchange for receiving messages for free.

An amount of consideration that a player provides may be based a variety of different factors, including:

(i) a number of messages output to the player—For example, a player may pay 2 comp points per message for 35 messages, for a total of 70 comp points.
(ii) content of messages that are output—For example, a player may pay 1 comp point for each status message that is output and 5 comp points for each instructional message that is output. In a second example, a player may have to answer 1 survey question for every 5 communication messages he receives.
(iii) a duration of time receiving messages—For example, a player may pay $5 for a day's worth of messages, or $1 per hour for messages.
(iv) timing of messages—For example, real-time status messages relating to stock market prices may cost a player 5 frequent flyer miles per message, whereas delayed status messages relating to stock market prices may be free.

Receiving consideration from a player may include debiting an account associated with the player. Examples include:

(i) A credit balance on a game machine operated by a player may be decreased.
(ii) A player's credit card account may be charged based on one or more messages.
(iii) A balance of comp points associated with a player's casino account may be debited.
(iv) A player's bank account may be debited based on one or more messages.
(v) A charge may be added to a player's hotel bill at a hotel associated with a casino where a player is gaming.

Receiving a payment from a player may include receiving an indication of a payment identifier from the player. Examples of payment identifiers include:

(i) a credit card number
(ii) a debit card number
(iii) a financial account number
(iv) a billing address
(v) a player account number
(vi) a player's hotel room number—For example, any messages that a player receives may be charged to the player's hotel room.

A player may receive a benefit based on at least one message that is output to him. For example, a player may receive a bonus of $1 in credits if he agrees to have messages output to him during his gaming session. Providing a benefit to a player based on one or more messages may motivate him to pay closer attention to the one or more messages. Having players pay attention to messages may be beneficial for a variety of different parties, including:

(i) Advertisers—For example, advertisers and other parties may be willing to pay to have promotional messages output to players.
(ii) Players—For example, messages may provide useful information to players, including information about bonuses and offers.

(iii) Casinos—For example, messages may help to make player's gaming experience more enjoyable, or motivate players to player for longer periods of times or bet larger amounts of money.

Examples of benefits that may be provided to players based on messages that are output include:

(i) money (e.g., money or slot machine credits)

(ii) products (e.g., a souvenir watch, a sweatshirt, a magazine subscription)

(iii) services (e.g., a free meal, a haircut)

(iv) discounts on products or services (e.g., 50% off the list price of a hotel room)

(v) alternate currencies (e.g., comp points, non-convertible casino chips)

(vi) an entry into a game of chance (e.g., a lottery ticket, a free spin on a slot machine)

(vii) other considerations

In some embodiments, game play on a game machine may be affected by the output of a message. Examples include:

(i) At least a portion of a game may be delayed or paused based on output of a message. For example, a message may be output in a pop up window while the reels of a video slot machine are spinning. The reels of the video slot machine may continue spinning until the player finishes reading the message and closes the pop-up window.

(ii) A game machine may initiate "auto-play mode" based on output of a message. For example, a game machine may automatically play itself (i.e., place a bet, determine an outcome, provide a payout if appropriate, and repeat this process) while a player views or responds to a message. Commonly owned application Ser. No. 08/774,487 entitled "Automated Play Gaming Device", now issued as U.S. Pat. No. 6,012,983, (which is incorporated herein by reference), commonly owned application Ser. No. 09/437,204, also entitled "Automated Play Gaming Device", now issued as U.S. Pat. No. 6,244,957 (which is incorporated herein by reference), and commonly owned application Ser. No. 10/331,438 entitled "Method and Apparatus for Automatically Operating A Game Machine" (which is incorporated herein by reference) include various embodiments in which a game machine may automatically play itself, sometimes without any interaction from a player. Note that commonly owned application Ser. No. 10/331,438 includes examples of entering auto-play mode in response to a trigger (e.g., the output of a message on a game machine).

(iii) As mentioned earlier, a portion of a game may be modified to output a message to a player. For example, one or more symbols on the reels of a video slot machine may be altered to display a message to a player.

Altering game play based on output of a message may be helpful to players because:

(i) A player may view and respond to the message at his leisure. A player may no longer feel rushed to viewing a message in order to get back to his gaming activities.

(ii) A player may pay more attention to a message if it does not impede his game play.

(iii) A player may be able to view and/or respond to more messages while a game machine is in auto-play mode, since he is no longer encumbered by the process of operating the game machine.

A method to output a message based on an existing message is described above. Similarly, a message may be determined based on an existing message. According to some embodiments, the invention may include the following steps:

(i) determining a first message (ii) outputting the first message to a player at a game machine (iii) determining a second message based on the first message (iv) outputting the second message to the player at the game machine Note that the first message and the second message may be output in any order. For example, the second message may be output before the first message. Since the words. "first" and "second" may imply an ordering to the messages, the following phrases will be used in the discussion below:

(i) existing message—A message that has already been determined, and may or may not have already been output.

(ii) new message—A message that is determined based on the existing message. In the steps above, this would have been the "second message"

An indication of an existing message may be stored in a list of past messages, a list of future messages, or a list of current messages. For example, a new message may be determined based on an existing message stored in any of the following databases:

(i) a message history database 332

(ii) a message queue database 328

(iii) a current message database (e.g., corresponds to messages that are currently displayed in windows on the screen)

Note that a new message may be determined at various different times, including:

(i) after the message is output. For example, a status message may be output to a player and then an instructive message may be determined based on this status message.

(ii) before the first messages is output. For example, future messages (i.e., messages to be output in the future) may be stored in a queue to be output. A new message to be output may be determined based on one or more messages in this queue.

Examples include:

(i) A communication message may be transmitted to a player from his friend. This communication message may include the words "plane" or "airplane" indicating that the friend is discussing air travel with the player. Based on this communication message, the controller may determine an advertisement relating to air travel and output it to the player.

(ii) A status message may inform player that he needs to check out of his hotel room in the next 30 minutes or pay for an additional night at the hotel. Based on this status message, an activity-benefit offer relating to the player's hotel room may be output "If you sign up for a new credit card, then you can stay in your hotel room for an additional night for no extra charge."

(iii) A promotional and/or instructional message describing use and/or advantages of a feature may be transmitted to a player. For example, the message may describe "Auto-Play Mode" and detail its operation and advantages. Subsequent messages promoting "Auto-Play Mode" may be less detailed with respect to the first message (e.g., subsequent messages may simply remind the player that "Auto-Play Mode" is available) so as not to annoy the player with repetitive information. Of course, subsequent messages could also be more detailed.

In addition to outputting one or more messages to a player, a game machine 104 may also output additional information such as information about past messages. Outputting information about past messages may include displaying a list of information about one or more past messages. For example, a game machine may display a "message history" window that shows a list of messages that have been output to a player in the past. A list of information about past messages may include information about all past messages to a player, or a subset of past messages to a player (e.g., all messages output to a player in the last 1 hour, all instructive messages output to a player, offers that were output to a player and accepted by the player). Information about past messages may include:

(i) titles of one or more messages
(ii) representations of one or more messages
(iii) categories for one or more messages
(iv) indications of how or when one or more messages were output (e.g., a date and time)
(v) indications of a player's responses to one or more messages In some embodiments, a player may be able to search, sort, or otherwise navigate a list of information about past messages.

H. CONCLUSION

It is clear from the foregoing discussion that the disclosed systems and methods to facilitate outputting a message at a game machine represents an improvement in the art of gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method, comprising:

determining a message;

determining a first representation of the message and a second representation of the message;

outputting the first representation of the message to a first player at a game machine; and outputting the second representation of the message to a second player at a game machine;

wherein determining the first representation includes selecting a representation based upon a characteristic of the first player, and wherein determining the second representation includes selecting a representation based upon a characteristic of the second player.

2. The method of claim 1 wherein the first representation is different from the second representation.

3. A method, comprising:

determining a message;

determining a first representation of the message and a second representation of the message;

outputting the first representation of the message to a first player at a game machine; and outputting the second representation of the message to a second player at a game machine;

wherein determining the first representation includes selecting a representation based upon an indication by the first player, and wherein determining the second representation includes selecting a representation based upon an indication by the second player.

4. The method of claim 3 wherein the first representation is different from the second representation.

5. A method, comprising:

determining an occurrence of a trigger condition;

identifying a message in a database of messages based on the trigger condition;

identifying a game machine from among a plurality of game machines based on the message;

suppressing output of the message until a second trigger condition is satisfied; and displaying the identified message in a partition on the identified game machine upon satisfaction of the second trigger condition, wherein the partition is a pop-up window, and wherein the identified message includes a feature recommendation.

* * * * *

UNITED STATES PATENT AND TRADEMARK OFFICE

CERTIFICATE OF CORRECTION

PATENT NO. : 8,282,488 B2
APPLICATION NO. : 10/685143
DATED : October 9, 2012
INVENTOR(S) : Jay S. Walker et al.

It is certified that error appears in the above-identified patent and that said Letters Patent is hereby corrected as shown below:

IN THE CLAIMS

In Claim 5, Column 76, Line 34, between “the” and “message” insert --identified--.
In Claim 5, Column 76, Line 35, between “the” and “message” insert --identified--.

Signed and Sealed this
First Day of January, 2013

David J. Kappos
*Director of the United States Patent and Trademark Office*

UNITED STATES PATENT AND TRADEMARK OFFICE

CERTIFICATE OF CORRECTION

PATENT NO. : 8,282,488 B2
APPLICATION NO. : 10/685143
DATED : October 9, 2012
INVENTOR(S) : Walker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2225 days.

Signed and Sealed this
Eighth Day of October, 2013

Teresa Stanek Rea
*Deputy Director of the United States Patent and Trademark Office*